US006685762B1

(12) United States Patent
Brewster et al.

(10) Patent No.: US 6,685,762 B1
(45) Date of Patent: Feb. 3, 2004

(54) AEROSOL METHOD AND APPARATUS FOR MAKING PARTICULATE PRODUCTS

(75) Inventors: James H. Brewster, Rio Rancho, NM (US); David E. Dericotte, Albuquerque, NM (US); Mark J. Hampden-Smith, Albuquerque, NM (US); Toivo T. Kodas, Albuquerque, NM (US); Quint H. Powell, Albuquerque, NM (US)

(73) Assignee: Superior MicroPowders LLC, Albuquerque, NM (US)

( * ) Notice: Subject to any disclaimer, the term of this patent is extended or adjusted under 35 U.S.C. 154(b) by 0 days.

(21) Appl. No.: 09/786,999

(22) PCT Filed: Aug. 23, 1999

(86) PCT No.: PCT/US99/19163

§ 371 (c)(1),
(2), (4) Date: Feb. 11, 2002

(87) PCT Pub. No.: WO00/12278

PCT Pub. Date: Mar. 9, 2000

Related U.S. Application Data

(60) Provisional application No. 60/098,174, filed on Aug. 26, 1998.

(51) Int. Cl.[7] .................................................. B22F 9/06
(52) U.S. Cl. .............................. 75/331; 75/355; 75/370; 264/5; 264/9; 264/12
(58) Field of Search ......................... 75/331, 355, 370; 264/5, 9, 12

(56) References Cited

U.S. PATENT DOCUMENTS

| | | | |
|---|---|---|---|
| 4,801,411 A | | 1/1989 | Wellinghoff et al. .......... 264/7 |
| 4,871,489 A | | 10/1989 | Ketcham ....................... 264/9 |
| 5,269,980 A | | 12/1993 | Levendis et al. .............. 264/9 |
| 5,928,405 A | * | 7/1999 | Ranade et al. ................ 75/337 |
| 5,958,361 A | * | 9/1999 | Laine et al. ................. 423/592 |
| 6,338,809 B1 | * | 1/2002 | Hampden-Smith et al. .... 264/7 |
| 6,348,179 B1 | * | 2/2002 | Paine et al. ................. 423/277 |
| 6,508,855 B2 | * | 1/2003 | Gardner et al. ............... 75/330 |

* cited by examiner

*Primary Examiner*—George Wyszomierski
(74) *Attorney, Agent, or Firm*—Marsh Fischmann & Breyfogle LLP

(57) ABSTRACT

A process for making particles, the process including generating an aerosol stream which includes droplets of a precursor liquid dispersed in a carrier gas, the precursor liquid including a liquid vehicle and a precursor material, separating the precursor liquid into two portions during the generating step, a first portion exiting the generator in the droplets of the aerosol stream and a second portion exiting as effluent at least a portion of which is recycled to the generator, and also during the generating step adding additional liquid vehicle to at least one of the carrier gas supply, the precursor liquid supply, and the aerosol generator, to at least partially compensate for the tendency of the precursor liquid to become more concentrated in the precursor material over time, and then removing at least a portion of the liquid vehicle from the droplets and forming particles in the aerosol stream.

38 Claims, 50 Drawing Sheets

102 → AEROSOL GENERATOR 106 —108→ FURNACE 110 —112→ PARTICLE COLLECTOR 114 →116

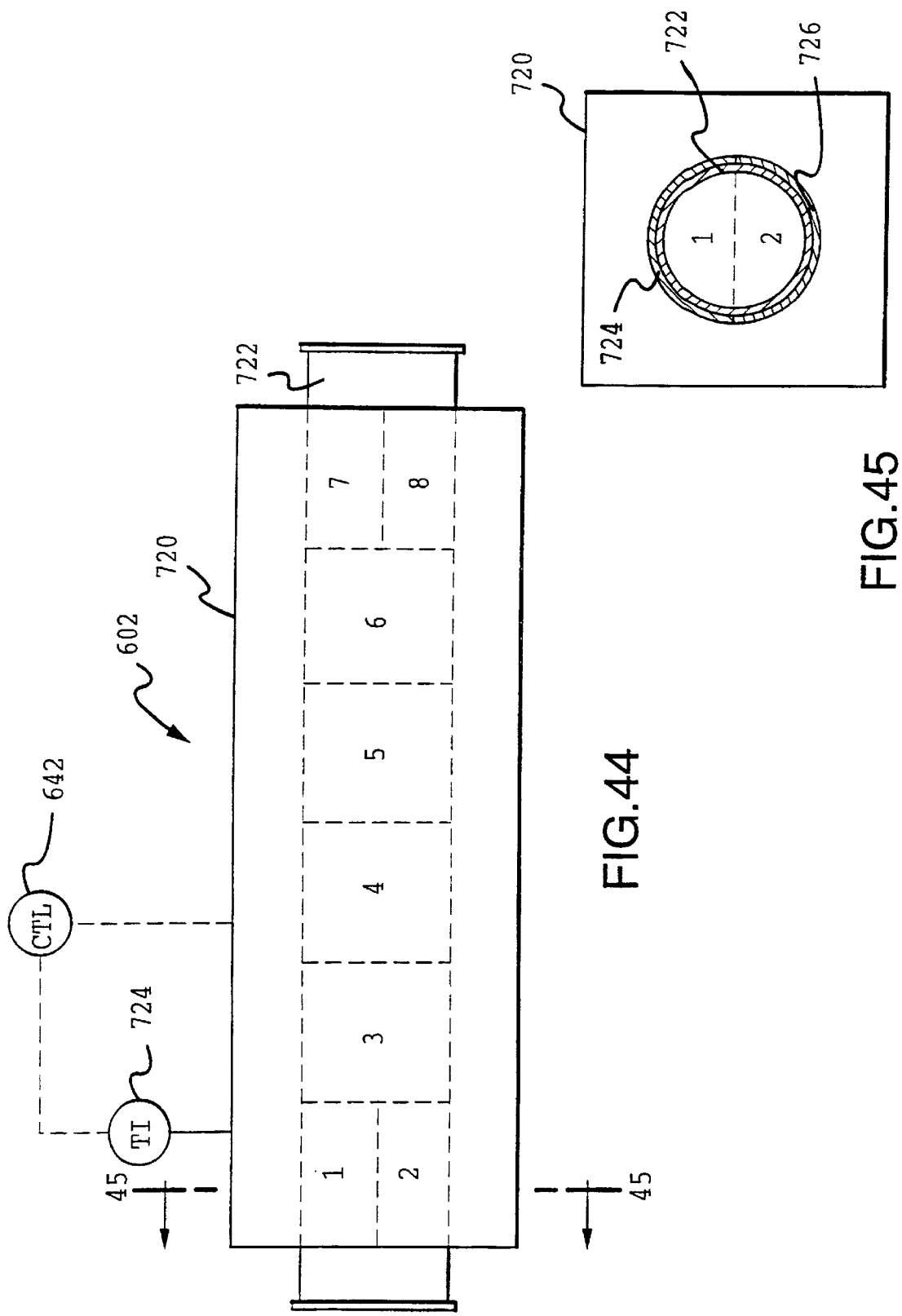

AEROSOL METHOD AND APPARATUS FOR MAKING PARTICULATE PRODUCTS

This application claims the benefit of provisional application Ser. No. 60/098,174 filed Aug. 26, 1998.

FIELD OF THE INVENTION

The present invention involves an aerosol manufacture facility, operation of that aerosol manufacture facility, and automated control of various operations involving the aerosol manufacture facility for producing a particulate product.

BACKGROUND OF THE INVENTION

Powdered materials are used in many manufacturing processes. One large use for powders is for thick film deposition to prepare films of a variety of materials. Some thick film applications include, for example, deposition of phosphor materials for flat panel displays, and patterning of electrically conductive features for electronic products.

For thick film applications, and for other applications, there is a trend to use powders of ever smaller particles. Generally desirable features in small particles include a small particle size; a narrow particle size distribution; a dense, spherical particle morphology; and a crystalline grain structure. Existing technologies for preparing powdered products, however, often could be improved with respect to attaining all, or substantially all, of these desired features for particles used in thick film applications.

One method that has been used to make small particles is to precipitate the particles from a liquid medium. Such liquid precipitation techniques are often difficult to control to produce particles with the desired characteristics. Also, particles prepared by liquid precipitation routes often are contaminated with significant quantities of surfactants or other organic materials used during the liquid phase processing.

Aerosol methods have also been used to make a variety of small particles. One aerosol method for making small particles is spray pyrolysis, in which an aerosol spray is generated and then converted in a reactor to the desired particles. Spray pyrolysis systems have, however, been mostly experimental and unsuitable for commercial particle production. Furthermore, control of particle size distribution is a concern with spray pyrolysis. Also, spray pyrolysis systems are often inefficient in the use of carrier gases that suspend and carry liquid droplets of the aerosol. Moreover, spray pyrolysis systems are frequently operated in batch mode, and there is a significant potential for inefficiency during transient periods during the early and late stages of particle production. During these periods, variations in particle properties may degrade the quality of the entire batch.

There is a significant need for improved manufacture techniques for making powders of small particles for use in thick film and other applications.

SUMMARY OF THE INVENTION

It is an object of the present invention to provide an aerosol method of manufacture suitable for commercial production of particles. Is also an object to provide an aerosol method to produce a particulate product at a high yield and of a high quality. It is also an object to provide an aerosol method involving significant process control for efficient operation, especially for batch processing. It is another object of the present invention to provide an aerosol method that is at least partially automated, to improve efficiency and yield. It is a further object to provide an aerosol manufacture facility in which the aerosol method may be conducted. These and other objects of the present invention are addressed by the present invention as described herein.

In one aspect, the present invention provides an automated aerosol method for processing batches of precursor liquid to manufacture batches of particles of a selected composition. The method involves automation of at least a portion of the process, with automated features being controlled at the direction of an electronic processor that processes instructions for manufacture of the particles of the selected composition. The method is often operated in batch mode. In that case, the batch processing begins with batch initiation operations, during which aerosol generation is commenced, proceeds through intermediate operations, during which the bulk of particle production occurs, and ends with batch termination operations, during which aerosol generation is terminated. As used herein, batch mode refers to processing of a discrete quantity, or batch, of a precursor liquid prepared in a single preparation. The batch mode processing of the present invention includes processing which might be considered as semi-batch or semi-continuous operation because of the length of the batch run involved and/or the manner of product removal. Batch mode processing includes, during the intermediate operations, generating, in an aerosol generator, an aerosol stream from carrier gas supplied and precursor liquid supplied to the aerosol generator and processing the aerosol stream through an aerosol heater to form particles of the selected composition. In a preferred embodiment, droplets of the aerosol are produced, in the aerosol generator, from a reservoir of circulating precursor liquid that overlies a plurality of ultrasonic transducers, which energize precursor liquid in the reservoir to produce the droplets.

In one embodiment of the automated aerosol method of the present invention, an operator instructs the electronic processor to direct processing of a precursor liquid batch to prepare particles of a selected composition. The electronic processor then processes instructions concerning manufacture of particles of the selected composition and, based on the instructions, the electronic processor directs, during batch initiation operations, automatic control in the aerosol manufacture facility of one or more of commencement of precursor liquid supply to the aerosol generator, commencement of carrier gas supply to the aerosol generator, commencement or increase of heat input into the aerosol heater, and activation of ultrasonic transducers in the aerosol generator. During intermediate operations, the electronic processor directs automatic control of one or more of carrier gas supply to the aerosol generator, precursor liquid supply to the aerosol generator, and heat input into the aerosol heater. During batch termination operations, the electronic processor directs automatic control of one or more of deactivation of the ultrasonic transducers, termination of carrier gas supply to the aerosol generator, termination of precursor liquid supply to the aerosol generator, and reduction or termination of heat input into the aerosol heater. In a preferred embodiment, all of these noted operations are automatically controlled at the direction of the electronic processor.

The method of the present invention includes significant flexibility to accommodate automation in a variety of different processing embodiments. For example, the method may include automated cooling of one or more process stream or piece of equipment during the method. In one embodiment, the aerosol stream, after passing through the aerosol heater, passes to an aerosol cooler where a cooling gas is mixed into the aerosol stream to lower the temperature of the aerosol stream, to permit subsequent collection of the particles, the supply of the cooling gas to the aerosol cooler being automatically controlled at the direction of the electronic processor. In one embodiment, the aerosol generator includes a pathway for circulation of a cooling liquid adjacent to ultrasonic transducers to cool the ultrasonic transducers during operation. The cooling liquid pathway is typically interposed between the reservoir of precursor liquid and the ultrasonic transducers, so that ultrasonic signals energizing the precursor liquid first pass through the cooling liquid. Supply of the cooling liquid is automated at the direction of the electronic processor. In another embodiment, a cooling liquid is supplied to the vicinity of electronic driver circuits driving the ultrasonic transducers to cool the circuits, with the supply of the cooling liquid being automatically controlled at the direction of the electronic processor. In another embodiment, a cooling liquid is supplied to end caps adjacent entrance and exit ends of the aerosol heater, with supply of the cooling liquid being automatically controlled at the direction of the electronic processor.

In one aspect, the present invention addresses a significant problem of precursor liquid tending to become more concentrated over time when aerosol generation is from a recirculating precursor liquid. The precursor liquid includes at least one precursor material dissolved or suspended in a liquid vehicle, typically water. Over time, the precursor liquid tends to become more concentrated in the precursor material. This concentration of the precursor liquid over time can result in an undesirable lack of uniformity in properties of particles that are produced. The present invention addresses this problem through the addition of additional liquid vehicle to the aerosol manufacture facility, during generation of the aerosol stream, in a manner to at least partially counteract the tendency of the precursor liquid to otherwise become more concentrated. The additional liquid vehicle may be added, for example, to the aerosol generator to the liquid supply system and/or to the carrier gas supply system.

In one embodiment, the liquid supply system includes two liquid containment tanks, or vessels, to facilitate control of the precursor liquid concentration in the liquid supply system and regulation of supply of the precursor liquid to the aerosol generator. A first, larger vessel acts as the primary supply vessel for the precursor liquid, and a second, smaller vessel acts as a control vessel. During generation of the aerosol stream, precursor liquid is transferred from the first vessel to the second vessel. Precursor liquid is then supplied to the aerosol generator from the second vessel. Effluent precursor liquid from the aerosol generator is returned to the second vessel for recirculation. Additional liquid vehicle may be added to the second vessel to at least partially offset the tendency of the precursor liquid to become more concentrated in the precursor material over time.

Furthermore, in one embodiment control of the concentration of the precursor material in the precursor liquid is automated. For example, the electronic processor may monitor, at some location in the precursor liquid supply system, a property or properties of precursor liquid indicative of the concentration of the precursor material in the precursor liquid at that location. Based at least in part on the monitored property or properties, the electronic processor then directs automatic addition, as necessary, of additional precursor liquid to the precursor liquid supply system to at least partially offset the tendency of the precursor liquid to become more concentrated over time. A convenient location to monitor the property or properties is in the second vessel or in the precursor liquid stream being supplied from the second vessel to the aerosol generator.

In another aspect, the aerosol manufacture method of the present invention addresses detrimental effects on particle quality of transient conditions that may occur during manufacture, and especially during initial stages of particle production during batch processing. The effects of process transients occurring during the initial stages of particle manufacture are, at least in part, addressed with the present invention by conditioning equipment of the manufacture facility during batch initiation operations, prior to particle manufacture. During the conditioning, the temperature of certain equipment is increased to simulate conditions that will exist later during steady state particle manufacture during intermediate operations. The conditioning involves flowing a carrier gas, prior to particle production, through the aerosol heater at an elevated temperature to simulate temperature and flow conditions that will exist when the aerosol stream is flowing through the aerosol heater during steady state particle manufacture. In a preferred embodiment, the heated carrier gas exiting the aerosol heater then passes through the aerosol cooler, where it is mixed with cooling gas and conditions the aerosol cooler. Following the aerosol cooler, the mixture of cooling gas and carrier gas then flows through the particle collector to condition the particle collector. With respect to the aerosol generator, conditioning may include, in addition to flow of the carrier gas, heating the precursor liquid supplied to the aerosol generator prior to commencement of aerosol generation. The heating of the precursor liquid simulates heating that occurs during aerosol generation due to operation of the ultrasonic transducers.

In one aspect, the present invention provides an automated facility for aerosol manufacture of particles according to the method of the present invention. The facility includes an aerosol generator, capable of producing an aerosol stream from carrier gas and precursor liquid, a carrier gas supply system capable of supplying carrier gas to the aerosol generator, a precursor liquid supply system capable of supplying precursor liquid to the aerosol generator, an aerosol heater capable of heating the aerosol stream to form particles of the desired composition, and an electronic processor capable of processing instructions concerning manufacture of particles of the selected composition and capable of communicating, for the purpose of automated control, with one or more of the aerosol generator, the carrier gas supply system, the precursor liquid supply system and the aerosol heater during manufacture of particles in the facility.

BRIEF DESCRIPTION OF THE DRAWINGS

FIG. 1 is a process block diagram showing one embodiment of the process of the present invention.

DETAILED DESCRIPTION OF THE INVENTION

Figure 2:
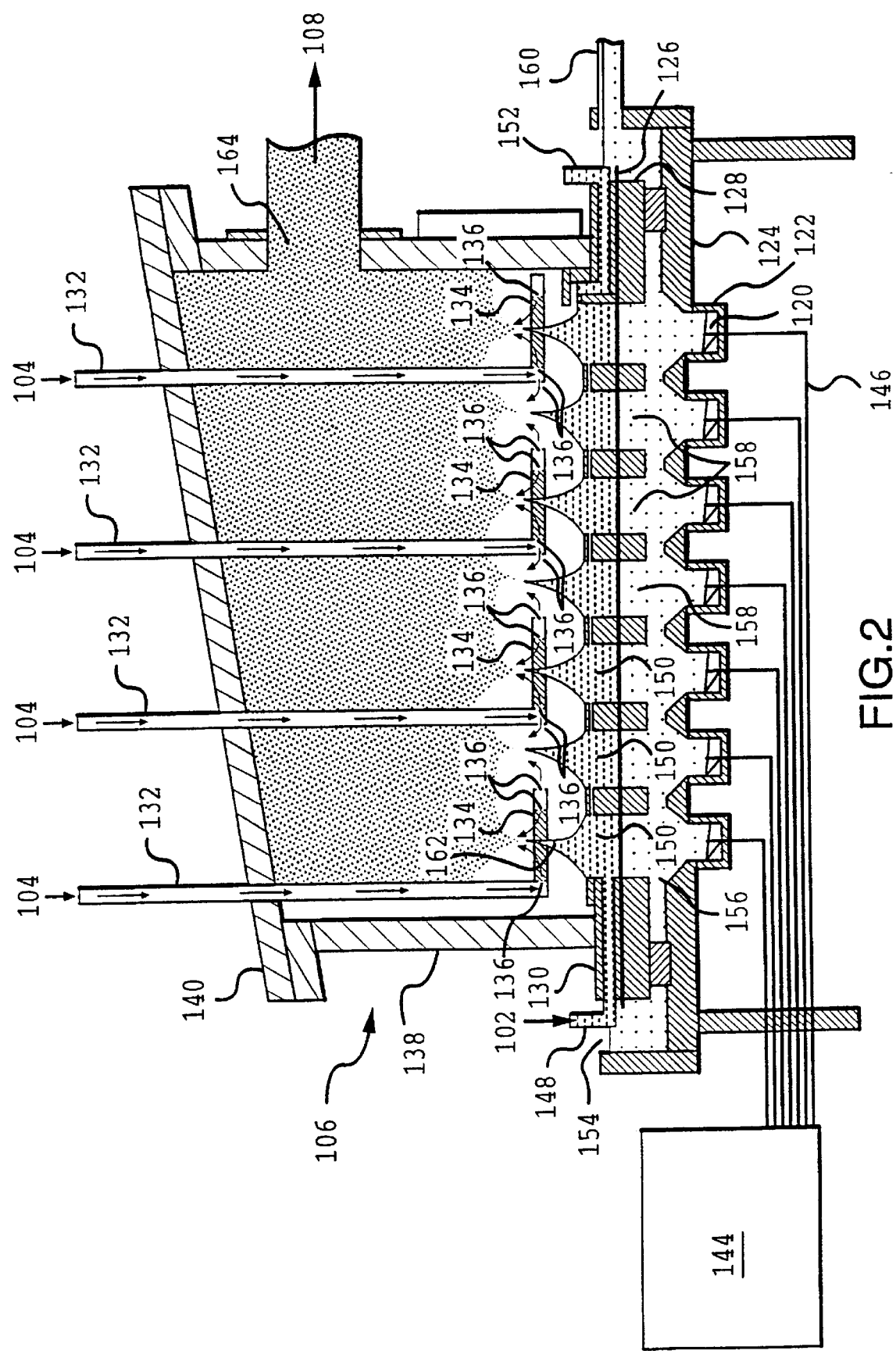
FIG. 2 is a side view in cross section of one embodiment of aerosol generator of the present invention.

In one aspect, the present invention provides a method for preparing a particulate product. A feed of liquid-containing, flowable medium, including at least one precursor for the desired particulate product, is converted to aerosol form, with droplets of the medium being dispersed in and suspended by a carrier gas. Liquid from the droplets in the aerosol is then removed to permit formation in a dispersed state of the desired particles. Typically, the feed precursor is pyrolyzed in a furnace to make the particles. In one embodiment, the particles are subjected, while still in a dispersed state, to compositional or structural modification, if desired. Compositional modification may include, for example, coating the particles. Structural modification may include, for example, crystallization, recrystallization or morphological alteration of the particles. The term powder is often used herein to refer to the particulate product of the present invention. The use of the term powder does not indicate, however, that the particulate product must be dry or in any particular environment. Although the particulate product is typically manufactured in a dry state, the particulate product may, after manufacture, be placed in a wet environment, such as in a slurry.

The process of the present invention is particularly well suited for the production of particulate products of finely divided particles having a weight average size, for most applications, in a range having a lower limit of about 0.1 micron, preferably about 0.3 micron, more preferably about 0.5 micron and most preferably about 0.8 micron; and having an upper limit of about 4 microns, preferably about 3 microns, more preferably about 2.5 microns and more preferably about 2 microns. A particularly preferred range for many applications is a weight average size of from about 0.5 micron to about 3 microns, and more particularly from about 0.5 micron to about 2 microns. For some applications, however, other weight average particle sizes may be particularly preferred.

In addition to making particles within a desired range of weight average particle size, with the present invention the particles may be produced with a desirably narrow size distribution, thereby providing size uniformity that is desired for many applications.

In addition to control over particle size and size distribution, the method of the present invention provides significant flexibility for producing particles of varying composition, crystallinity and morphology. For example, the present invention may be used to produce homogeneous particles involving only a single phase or multi-phase particles including multiple phases. In the case of multi-phase particles, the phases may be present in a variety of morphologies. For example, one phase may be uniformly dispersed throughout a matrix of another phase. Alternatively, one phase may form an interior core while another phase forms a coating that surrounds the core. Other morphologies are also possible, as discussed more fully below.

Referring now to FIG. 1, one embodiment of the process of the present invention is described. A liquid feed 102, including at least one precursor for the desired particles, and a carrier gas 104 are fed to an aerosol generator 106 where an aerosol 108 is produced. The aerosol 108 is then fed to a furnace 110 where liquid in the aerosol 108 is removed to produce particles 112 that are dispersed in and suspended by gas exiting the furnace 110. The particles 112 are then collected in a particle collector 114 to produce a particulate product 116.

As used herein, the liquid feed 102 is a feed that includes one or more flowable liquids as the major constituent(s), such that the feed is a flowable medium. The liquid feed 102 need not comprise only liquid constituents. The liquid feed 102 may comprise only constituents in one or more liquid phase, or it may also include particulate material suspended in a liquid phase. The liquid feed 102 must, however, be capable of being atomized to form droplets of sufficiently small size for preparation of the aerosol 108. Therefore, if the liquid feed 102 includes suspended particles, those particles should be relatively small in relation to the size of droplets in the aerosol 108. Such suspended particles should typically be smaller than about 1 micron in size, preferably smaller than about 0.5 micron in size, and more preferably smaller than about 0.3 micron in size and most preferably smaller than about 0.1 micron in size. Most preferably, the suspended particles should be able to form a colloid. The suspended particles could be finely divided particles, or could be agglomerate masses comprised of agglomerated smaller primary particles. For example, 0.5 micron particles could be agglomerates of nanometer-sized primary particles. When the liquid feed 102 includes suspended particles, the particles typically comprise no greater than about 25 to 50 weight percent of the liquid feed.

As noted, the liquid feed 102 includes at least one precursor for preparation of the particles 112. The precursor may be a substance in either a liquid or solid phase of the liquid feed 102. Frequently, the precursor will be a material, such as a salt, dissolved in a liquid solvent of the liquid feed 102. Typical precursor salts include nitrate, chloride, sulfate, acetate and oxalate salts, and the like. The precursor may undergo one or more chemical reactions in the furnace 110 to assist in production of the particles 112. Alternatively, the precursor material may contribute to formation of the particles 112 without undergoing chemical reaction. This could be the case, for example, when the liquid feed 102 includes, as a precursor material, suspended particles that are not chemically modified in the furnace 110. In any event, the particles 112 comprise at least one component originally contributed by the precursor.

The liquid feed 102 may include multiple precursor materials, which may be present together in a single phase or separately in multiple phases. For example, the liquid feed 102 may include multiple precursors in solution in a single liquid vehicle. Alternatively, one precursor material could be in a solid particulate phase and a second precursor material could be in a liquid phase. Also, one precursor material could be in one liquid phase and a second precursor material could be in a second liquid phase, such as could be the case when the liquid feed 102 comprises an emulsion. Different components contributed by different precursors may be present in the particles together in a single material phase, or the different components may be present in different material phases when the particles 112 are composites of multiple phases.

When the liquid feed 102 includes a soluble precursor, the precursor solution should be unsaturated to avoid the formation of precipitates. Solutions of salts will typically be used in concentrations in a range to provide a solution including from about 1 to about 50 weight percent solute. Most often, the liquid feed will include a solution with from about 5 weight percent to about 40 weight percent solute, and more preferably to about 30 weight percent solute. Preferably the solvent is aqueous-based for ease of operation, although other solvents, such as toluene or other organic solvents, may be desirable for specific materials. The use of organic solvents, however, can sometimes lead to undesirable carbon contamination in the particles. The pH of the aqueous-based solutions can be adjusted to alter the solubility characteristics of the precursor or precursors in the solution.

The carrier gas 104 may comprise any gaseous medium in which droplets produced from the liquid feed 102 may be dispersed in aerosol form. Also, the carrier gas 104 may be inert, in that the carrier gas 104 does not participate in formation of the particles 112. Alternatively, the carrier gas may have one or more active component(s) that contribute to formation of the particles 112. In that regard, the carrier gas may include one or more reactive components that react in the furnace 110 to contribute to formation of the particles 112.

The aerosol generator 106 atomizes the liquid feed 102 to form droplets in a manner to permit the carrier gas 104 to sweep the droplets away to form the aerosol 108. The droplets comprise liquid from the liquid feed 102. The droplets may, however, also include nonliquid material, such as one or more small particles held in the droplet by the liquid. For example, when the particles 112 are composite, or multi-phase, particles, one phase of the composite may be provided in the liquid feed 102 in the form of suspended precursor particles and a second phase of the composite may be produced in the furnace 110 from one or more precursors in the liquid phase of the liquid feed 102. Furthermore the precursor particles could be included in the liquid feed 102, and therefore also in droplets of the aerosol 108, for the purpose only of dispersing the particles for subsequent compositional or structural modification during or after processing in the furnace 110.

An important aspect of the present invention is generation of the aerosol 108 with droplets of a small average size, narrow size distribution. In this manner, the particles 112 may be produced at a desired small size with a narrow size distribution, which are advantageous for many applications.

The aerosol generator 106 is capable of producing the aerosol 108 such that it includes droplets having a weight average size in a range having a lower limit of about 1 micron and preferably about 2 microns; and an upper limit of about 10 microns, preferably about 7 microns, more preferably about 5 microns and most preferably about 4 microns, a weight average droplet size in a range of from about 2 microns to about 4 microns is more preferred for most applications, with a weight average droplet size of about 3 microns being particularly preferred for some applications. The aerosol generator is also capable of producing the aerosol 108 such that it includes droplets in a narrow size distribution. Preferably, the droplets in the aerosol are such that at least about 70 percent (more preferably at least about 80 weight percent and most preferably at least about 85 weight percent) of the droplets are smaller than about 10 microns and more preferably at least about 70 weight percent (more preferably at least about 80 weight percent and most preferably at least about 85 weight percent) are smaller than about 5 microns. Furthermore, preferably no greater than about 30 weight percent, more preferably no greater than about 25 weight percent and most preferably no greater than about 20 weight percent, of the droplets in the aerosol 108 are larger than about twice the weight average droplet size.

Another important aspect of the present invention is that the aerosol 108 may be generated without consuming excessive amounts of the carrier gas 104. The aerosol generator 106 is capable of producing the aerosol 108 such that it has a high loading, or high concentration, of the liquid feed 102 in droplet form. In that regard, the aerosol 108 preferably includes greater than about $1 \times 10^6$ droplets per cubic centimeter of the aerosol 108, more preferably greater than about $5 \times 10^6$ droplets per cubic centimeter, still more preferably greater than about $1 \times 10^7$ droplets per cubic centimeter, and most preferably greater than about $5 \times 10^7$ droplets per cubic centimeter. That the aerosol generator 106 can produce such a heavily loaded aerosol 108 is particularly surprising considering the high quality of the aerosol 108 with respect to small average droplet size and narrow droplet size distribution. Typically, droplet loading in the aerosol is such that the volumetric ratio of liquid feed 102 to carrier gas 104 in the aerosol 108 is larger than about 0.04 milliliters of liquid feed 102 per liter of carrier gas 104 in the aerosol 108, preferably larger than about 0.083 milliliters of liquid feed 102 per liter of carrier gas 104 in the aerosol 108, more preferably larger than about 0.167 milliliters of liquid feed 102 per liter of carrier gas 104, still more preferably larger than about 0.25 milliliters of liquid feed 102 per liter of carrier gas 104, and most preferably larger than about 0.333 milliliters of liquid feed 102 per liter of carrier gas 104.

This capability of the aerosol generator 106 to produce a heavily loaded aerosol 108 is even more surprising given the high droplet output rate of which the aerosol generator 106 is capable, as discussed more fully below. It will be appreciated that the concentration of liquid feed 102 in the aerosol 108 will depend upon the specific components and attributes of the liquid feed 102 and, particularly, the size of the droplets in the aerosol 108. For example, when the average droplet size is from about 2 microns to about 4 microns, the droplet loading is preferably larger than about 0.15 milliliters of aerosol feed 102 per liter of carrier gas 104, more preferably larger than about 0.2 milliliters of liquid feed 102 per liter of carrier gas 104, even more preferably larger than about 0.25 milliliters of liquid feed 102 per liter of carrier gas 104, and most preferably larger than about 0.3 milliliters of liquid feed 102 per liter of carrier gas 104. When reference is made herein to liters of carrier gas 104, it refers to the volume that the carrier gas 104 would occupy under conditions of standard temperature and pressure.

The furnace 110 may be any suitable device for heating the aerosol 108 to evaporate liquid from the droplets of the aerosol 108 and thereby permit formation of the particles 112. For most applications, maximum average stream temperatures in the furnace 110 will generally be in a range of from about 500° C. to about 1500° C., and preferably in the range of from about 900° C. to about 1300° C. The maximum average stream temperature refers to the maximum average temperature that an aerosol stream attains while flowing through the furnace. This is typically determined by a temperature probe inserted into the furnace.

Although longer residence times are possible, for many applications, residence time in the heating zone of the furnace 110 of shorter than about 10 seconds is typical. The residence time should be long enough, however, to assure that the particles 112 attain the desired maximum average stream temperature for a given heat transfer rate. In that regard, with extremely short residence times, higher furnace temperatures could be used to increase the rate of heat transfer so long as the particles 112 attain a maximum temperature within the desired stream temperature range. That mode of operation, however, is not preferred. Also, it is noted that as used herein, residence time refers to the actual time for a material to pass through the relevant process equipment. In the case of the furnace, this includes the effect of increasing velocity with gas expansion due to heating.

Typically, the furnace 110 will be a tube-shaped furnace, so that the aerosol 108 moving into and through the furnace does not encounter sharp edges on which droplets could collect. Loss of droplets to collection at sharp surfaces results in a lower yield of particles 112. More important, however, the accumulation of liquid at sharp edges can result in re-release of undesirably large droplets back into the aerosol 108, which can cause contamination of the particulate product 116 with undesirably large particles. Also, over time, such liquid collection at sharp surfaces can cause fouling of process equipment, impairing process performance.

The furnace 110 may be any suitable furnace reactor, which typically includes a tubular furnace through which the aerosol flows. Also, although the present invention is described with primary reference to a furnace reactor, which is preferred, it should be recognized that, except as noted, any other thermal reactor, including a flame reactor or a plasma reactor, could be used instead. A furnace reactor is, however, preferred, because of the generally even heating characteristic of a furnace for attaining a uniform stream temperature.

The particle collector 114, may be any suitable apparatus for collecting particles 112 to produce the particulate product 116. One preferred embodiment of the particle collector 114 uses one or more filter to separate the particles 112 from gas. Such a filter may be of any type, including a bag filter. Another preferred embodiment of the particle collector uses one or more cyclone to separate the particles 112. Other apparatus that may be used in the particle collector 114 includes an electrostatic precipitator. Also, collection should normally occur at a temperature above the condensation temperature of the gas stream in which the particles 112 are suspended. Also, collection should normally be at a temperature that is low enough to prevent significant agglomeration of the particles 112.

The process and apparatus of the present invention are well-suited for producing commercial-size batches of extremely high quality particles. In that regard, the process and the accompanying apparatus provide versatility for preparing powder including a wide variety of materials, and easily accommodate shifting of production between different specialty batches of particles.

Figure 3:
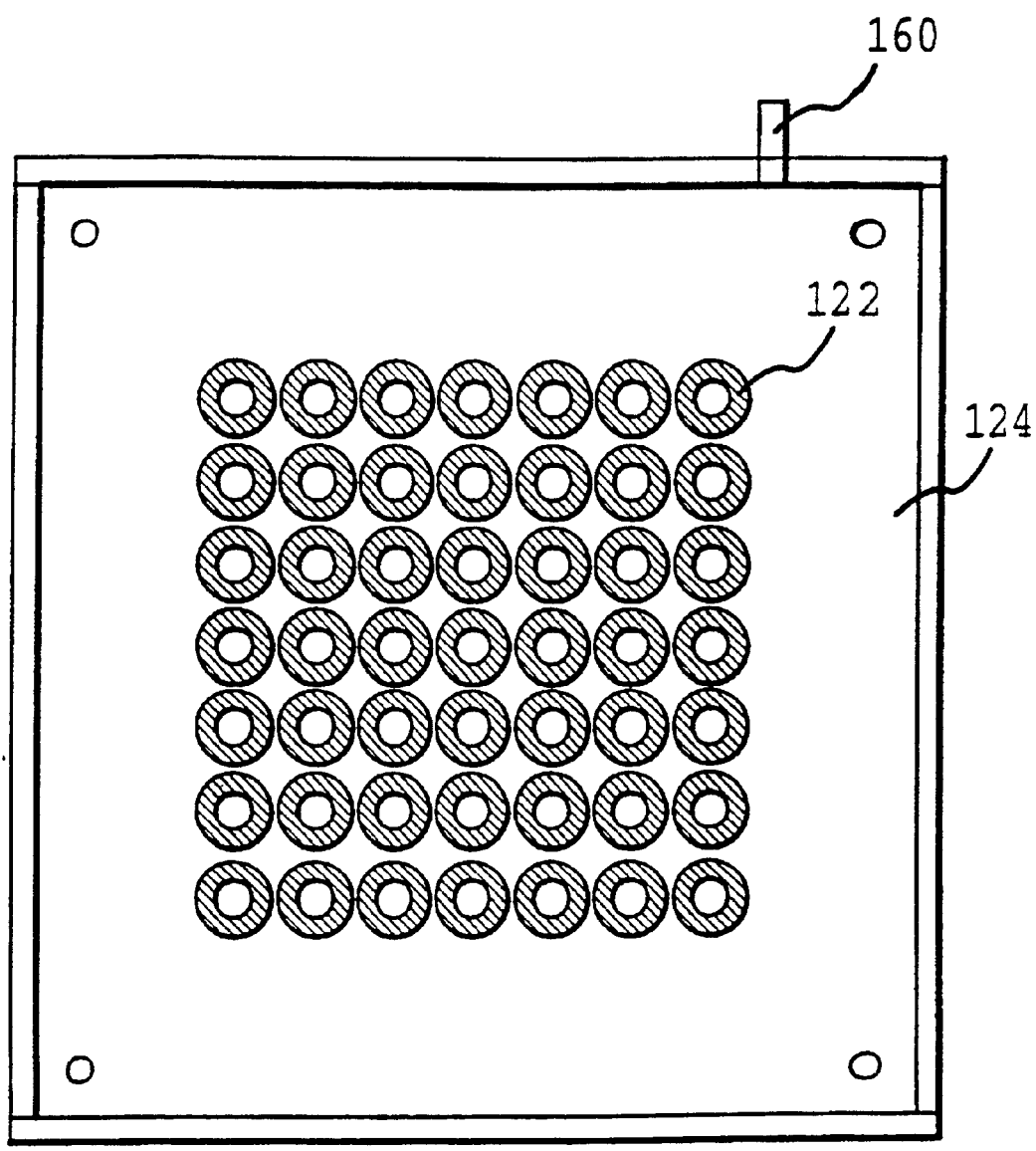
FIG. 3 is a top view of a transducer mounting plate showing a 49 transducer array for use in an aerosol generator of the present invention.

Of significant importance to the operation of the process of the present invention is the aerosol generator 106, which must be capable of producing a high quality aerosol with high droplet loading, as previously noted. With reference to FIG. 2, one embodiment of an aerosol generator 106 of the present invention is described. The aerosol generator 106 includes a plurality of ultrasonic transducer discs 120 that are each mounted in a transducer housing 122. The transducer housings 122 are mounted to a transducer mounting plate 124, creating an array of the ultrasonic transducer discs 120. Any convenient spacing may be used for the ultrasonic transducer discs 120. Center-to-center spacing of the ultrasonic transducer discs 120 of about 4 centimeters is often adequate. The aerosol generator 106, as shown in FIG. 2, includes forty-nine transducers in a 7×7 array. The array configuration is as shown in FIG. 3, which depicts the locations of the transducer housings 122 mounted to the transducer mounting plate 124.

With continued reference to FIG. 2, a separator 126, in spaced relation to the transducer discs 120, is retained between a bottom retaining plate 128 and a top retaining plate 130. Gas delivery tubes 132 are connected to gas distribution manifolds 134, which have gas delivery ports 136. The gas distribution manifolds 134 are housed within a generator body 138 that is covered by generator lid 140, a transducer driver 144, having circuitry for driving the transducer discs 120, is electronically connected with the transducer discs 120 via electrical cables 146.

During operation of the aerosol generator 106, as shown in FIG. 2, the transducer discs 120 are activated by the transducer driver 144 via the electrical cables 146. The transducers preferably vibrate at a frequency of from about 1 MHz to about 5 MHz, more preferably from about 1.5 MHz to about 3 MHz. Frequently used frequencies are at about 1.6 MHz and about 2.4 MHz. Furthermore, all of the transducer discs 110 should be operating at substantially the same frequency when an aerosol with a narrow droplet size distribution is desired. This is important because commercially available transducers can vary significantly in thickness, sometimes by as much as 10%. It is preferred, however, that the transducer discs 120 operate at frequencies within a range of 5% above and below the median transducer frequency, more preferably within a range of 2.5%, and most preferably within a range of 1%. This can be accomplished by careful selection of the transducer discs 120 so that they all preferably have thicknesses within 5% of the median transducer thickness, more preferably within 2.5%, and most preferably within 1%.

Liquid feed 102 enters through a feed inlet 148 and flows through flow channels 150 to exit through feed outlet 152. An ultrasonically transmissive fluid, typically water, enters through a water inlet 154 to fill a water bath volume 156 and flow through flow channels 158 to exit through a water outlet 160. A proper flow rate of the ultrasonically transmissive fluid is necessary to cool the transducer discs 120 and to prevent overheating of the ultrasonically transmissive fluid. Ultrasonic signals from the transducer discs 120 are transmitted, via the ultrasonically transmissive fluid, across the water bath volume 156, and ultimately across the separator 126, to the liquid feed 102 in flow channels 150.

The ultrasonic signals from the ultrasonic transducer discs 120 cause atomization cones 162 to develop in the liquid feed 102 at locations corresponding with the transducer discs 120. Carrier gas 104 is introduced into the gas delivery tubes 132 and delivered to the vicinity of the atomization cones 162 via gas delivery ports 136. Jets of carrier gas exit the gas delivery ports 136 in a direction so as to impinge on the atomization cones 162, thereby sweeping away atomized droplets of the liquid feed 102 that are being generated from the atomization cones 162 and creating the aerosol 108, which exits the aerosol generator 106 through an aerosol exit opening 164.

Efficient use of the carrier gas 104 is an important aspect of the aerosol generator 106. The embodiment of the aerosol generator 106 shown in FIG. 2 includes two gas exit ports per atomization cone 162, with the gas ports being positioned above the liquid medium 102 over troughs that develop between the atomization cones 162, such that the exiting carrier gas 104 is horizontally directed at the surface of the atomization cones 162, thereby efficiently distributing the carrier gas 104 to critical portions of the liquid feed 102 for effective and efficient sweeping away of droplets as they form about the ultrasonically energized atomization cones 162. Furthermore, it is preferred that at least a portion of the opening of each of the gas delivery ports 136, through which the carrier gas exits the gas delivery tubes, should be located below the top of the atomization cones 162 at which the carrier gas 104 is directed. This relative placement of the gas delivery ports 136 is very important to efficient use of carrier gas 104. Orientation of the gas delivery ports 136 is also important. Preferably, the gas delivery ports 136 are positioned to horizontally direct jets of the carrier gas 104 at the atomization cones 162. The aerosol generator 106 permits generation of the aerosol 108 with heavy loading with droplets of the carrier liquid 102, unlike aerosol generator designs that do not efficiently focus gas delivery to the locations of droplet formation.

Another important feature of the aerosol generator 106, as shown in FIG. 2, is the use of the separator 126, which protects the transducer discs 120 from direct contact with the liquid feed 102, which is often highly corrosive. The height of the separator 126 above the top of the transducer discs 120 should normally be kept as small as possible, and is often in the range of from about 1 centimeter to about 2 centimeters. The top of the liquid feed 102 in the flow channels above the tops of the ultrasonic transducer discs 120 is typically in a range of from about 2 centimeters to about 5 centimeters, whether or not the aerosol generator includes the separator 126, with a distance of about 3 to 4 centimeters being preferred. Although the aerosol generator 106 could be made without the separator 126, in which case the liquid feed 102 would be in direct contact with the transducer discs 120, the highly corrosive nature of the liquid feed 102 can often cause premature failure of the transducer discs 120. The use of the separator 126, in combination with use of the ultrasonically transmissive fluid in the water bath volume 156 to provide ultrasonic coupling, significantly extending the life of the ultrasonic transducers 120. One disadvantage of using the separator 126, however, is that the rate of droplet production from the atomization cones 162 is reduced, often by a factor of two or more, relative to designs in which the liquid feed 102 is in direct contact with the ultrasonic transducer discs 102. Even with the separator 126, however, the aerosol generator 106 used with the present invention is capable of producing a high quality aerosol with heavy droplet loading, as previously discussed. Suitable materials for the separator 126 include, for example, polyamides (such as Kapton™ membranes from DuPont) and other polymer materials, glass, and plexiglass. The main requirements for the separator 126 are that it be ultrasonically transmissive, corrosion resistant and impermeable.

One alternative to using the separator 126 is to bind a corrosion-resistant protective coating onto the surface of the ultrasonic transducer discs 120. thereby preventing the liquid feed 102 from contacting the surface of the ultrasonic transducer discs 120. When the ultrasonic transducer discs 120 have a protective coating, the aerosol generator 106 will typically be constructed without the water bath volume 156 and the liquid feed 102 will flow directly over the ultrasonic transducer discs 120. Examples of such protective coating materials include platinum, gold, TEFLON™, epoxies and various plastics. Such coating typically significantly extends transducer life. Also, when operating without the separator 126, the aerosol generator 106 will typically produce the aerosol 108 with a much higher droplet loading than when the separator 126 is used.

The design for the aerosol generator 106 based on an array of ultrasonic transducers is versatile and is easily modified to accommodate different generator sizes for different specialty applications. The aerosol generator 106 may be designed to include a plurality of ultrasonic transducers in any convenient number. Even for smaller scale production, however, the aerosol generator 106 preferably has at least nine ultrasonic transducers, more preferably at least 16 ultrasonic transducers, and even more preferably at least 25 ultrasonic transducers. For larger scale production, however, the aerosol generator 106 includes at least 40 ultrasonic transducers, more preferably at least 100 ultrasonic transducers, and even more preferably at least 400 ultrasonic transducers. In some large volume applications, the aerosol generator may have at least 1000 ultrasonic transducers.

Figure 4:
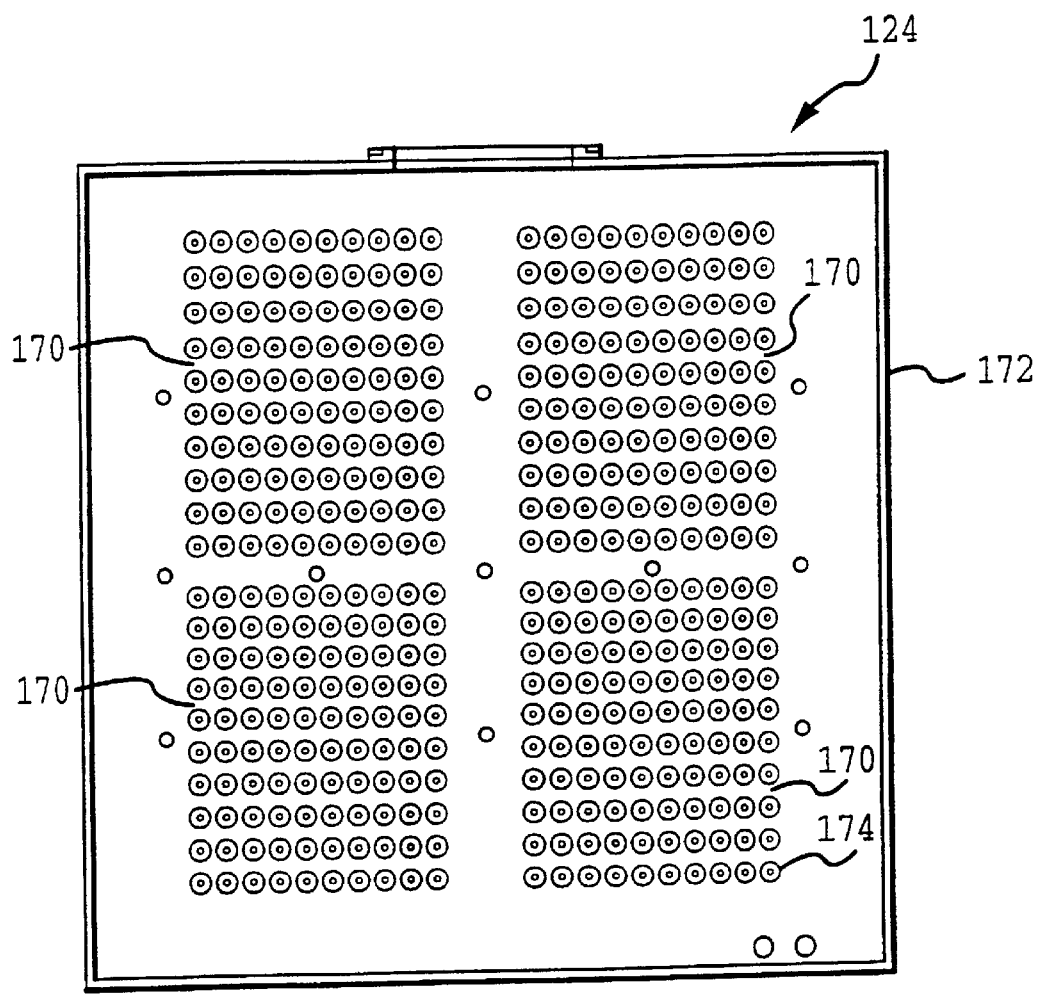
FIG. 4 is a top view of a transducer mounting plate for a 400 transducer array for use in an ultrasonic generator of the present invention.
Figure 5:
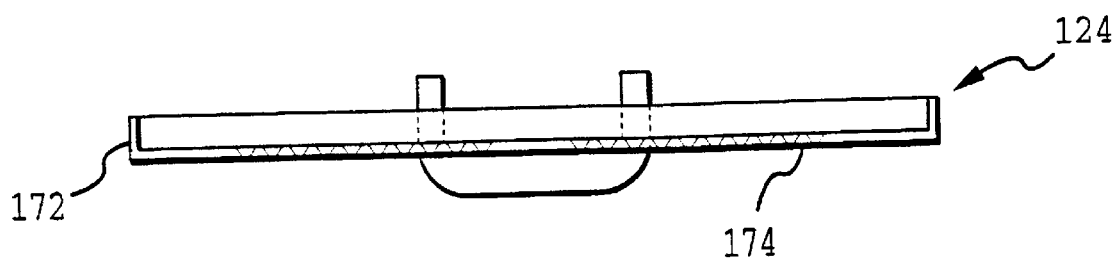
FIG. 5 is a side view of the transducer mounting plate shown in FIG. 4.

FIGS. 4–21 show component designs for an aerosol generator 106 including an array of 400 ultrasonic transducers. Referring first to FIGS. 4 and 5, the transducer mounting plate 124 is shown with a design to accommodate an array of 400 ultrasonic transducers, arranged in four subarrays of 100 ultrasonic transducers each. The transducer mounting plate 124 has integral vertical walls 172 for containing the ultrasonically transmissive fluid, typically water, in a water bath similar to the water bath volume 156 described previously with reference to FIG. 2.

Figure 6:
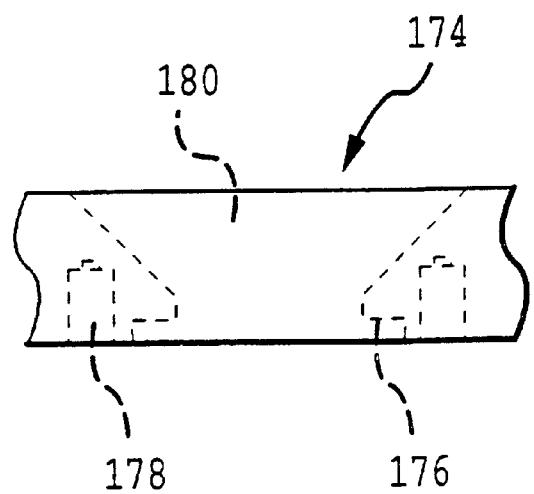
FIG. 6 is a partial side view showing the profile of a single transducer mounting receptacle of the transducer mounting plate shown in FIG. 4.

As shown in FIGS. 4 and 5, four hundred transducer mounting receptacles 174 are provided in the transducer mounting plate 124 for mounting ultrasonic transducers for the desired array. With reference to FIG. 6, the profile of an individual transducer mounting receptacle 174 is shown. A mounting seat 176 accepts an ultrasonic transducer for mounting, with a mounted ultrasonic transducer being held in place via screw holes 178. Opposite the mounting receptacle 176 is a flared opening 180 through which an ultrasonic signal may be transmitted for the purpose of generating the aerosol 108, as previously described with reference to FIG. 2.

Figure 7:
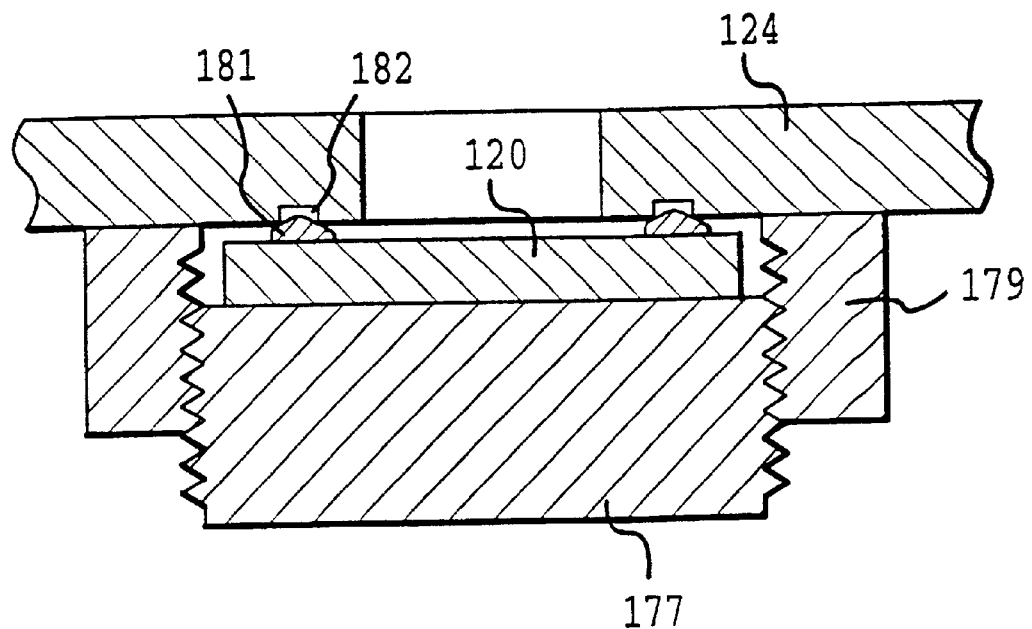
FIG. 7 is a partial side view in cross-section showing an alternative embodiment for mounting an ultrasonic transducer.

A preferred transducer mounting configuration, however, is shown in FIG. 7 for another configuration for the transducer mounting plate 124. As, seen in FIG. 7, an ultrasonic transducer disc 120 is mounted to the transducer mounting plate 124 by use of a compression screw 177 threaded into a threaded receptacle 179. The compression screw 177 bears against the ultrasonic transducer disc 120, causing an o-ring 181, situated in an o-ring seat 182 on the transducer mounting plate 124, to be compressed to form a seal between the transducer mounting plate 124 and the ultrasonic transducer disc 120. This type of transducer mounting is particularly preferred when the ultrasonic transducer disc 120 includes a protective surface coating, as discussed previously, because the seal of the o-ring to the ultrasonic transducer disc 120 will be inside of the outer edge of the protective seal, thereby preventing liquid from penetrating under the protective surface coating from the edges of the ultrasonic transducer disc 120.

Figure 8:
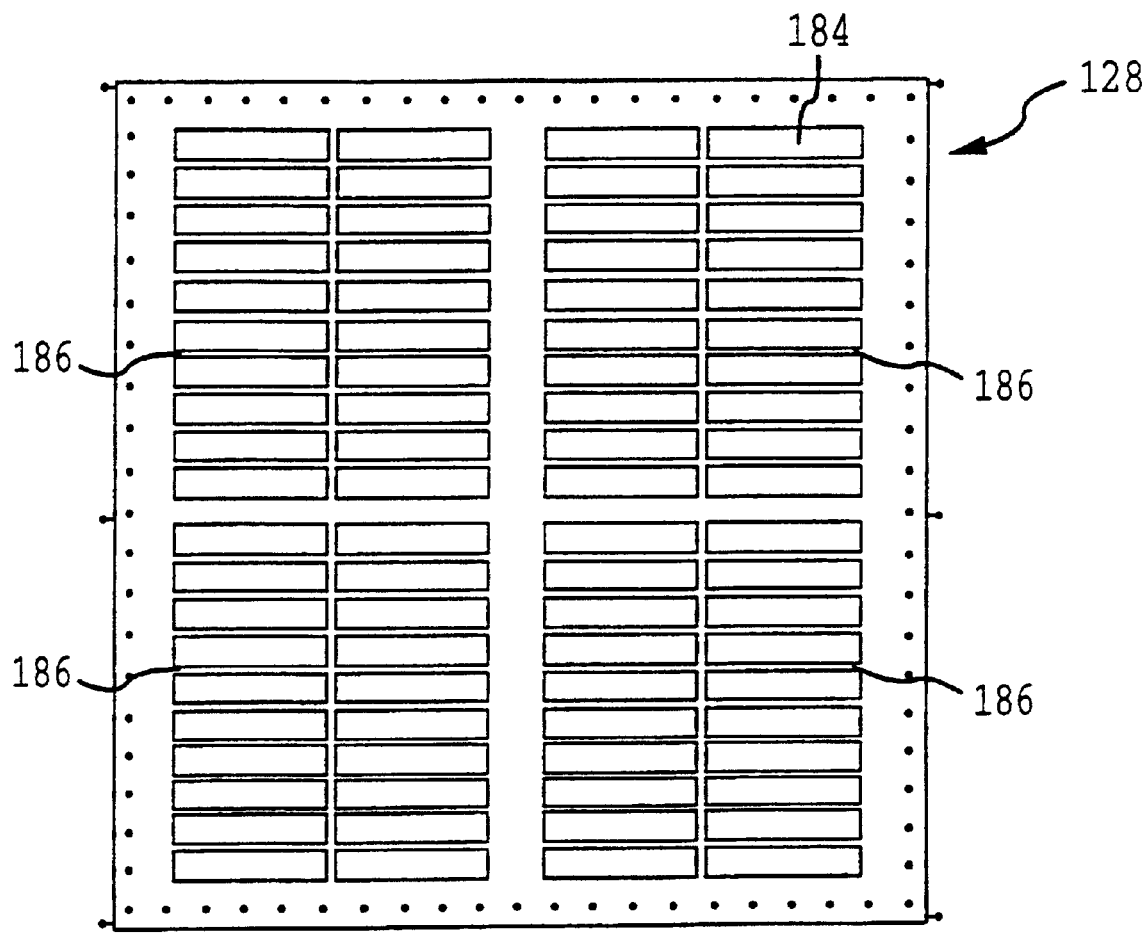
FIG. 8 is a top view of a bottom retaining plate for retaining a separator for use in an aerosol generator of the present invention.

Referring now to FIG. 8, the bottom retaining plate 128 for a 400 transducer array is shown having a design for mating with the transducer mounting plate 124 (shown in FIGS. 4–5). The bottom retaining plate 128 has eighty openings 184, arranged in four subgroups 186 of twenty openings 184 each. Each of the openings 184 corresponds with five of the transducer mounting receptacles 174 (shown in FIGS. 4 and 5) when the bottom retaining plate 128 is mated with the transducer mounting plate 124 to create a volume for a water bath between the transducer mounting plate 124 and the bottom retaining plate 128. The openings 184, therefore, provide a pathway for ultrasonic signals generated by ultrasonic transducers to be transmitted through the bottom retaining plate.

Figure 9:
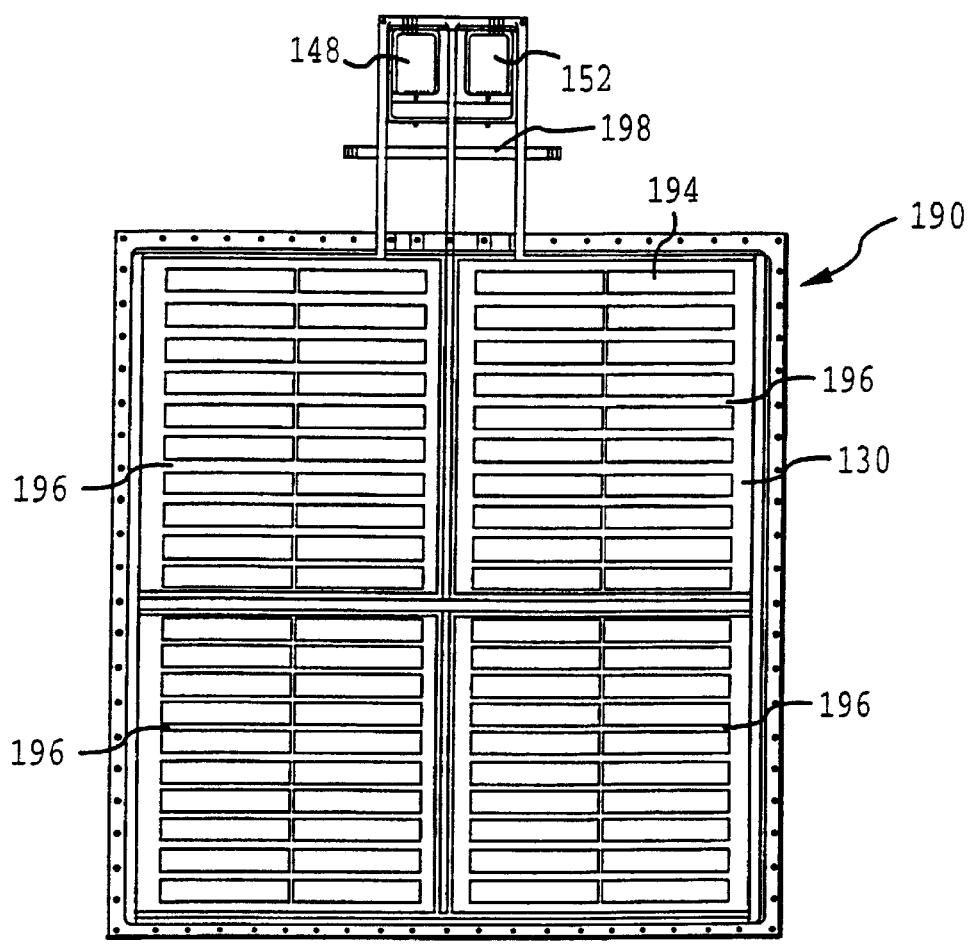
FIG. 9 is a top view of a liquid feed box having a bottom retaining plate to assist in retaining a separator
Figure 10:
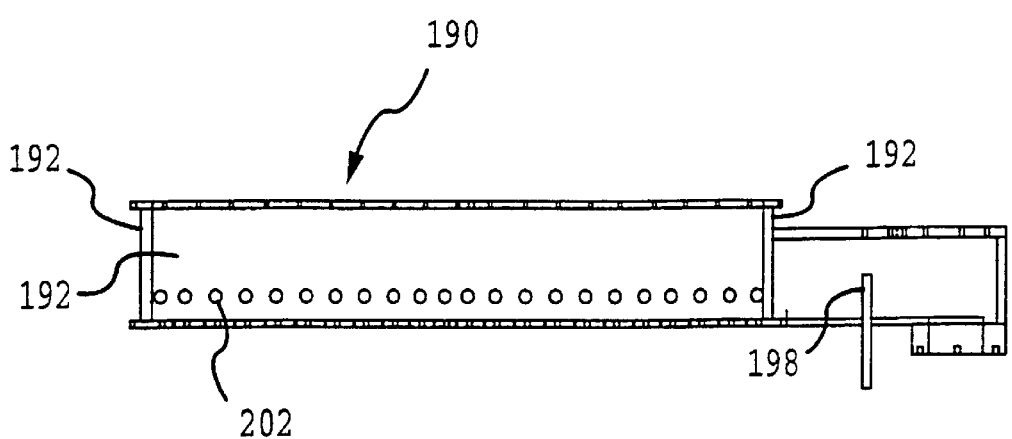

Referring now to FIGS. 9 and 10, a liquid feed box 190 for a 400 transducer array is shown having the top retaining plate 130 designed to fit over the bottom retaining plate 128 (shown in FIG. 8), with a separator 126 (not shown) being retained between the bottom retaining plate 128 and the top retaining plate 130 when the aerosol generator 106 is assembled. The liquid feed box 190 also includes vertically extending walls 192 for containing the liquid feed 102 when the aerosol generator is in operation. Also shown in FIGS. 9 and 10 is the feed inlet 148 and the feed outlet 152. An adjustable weir 198 determines the level of liquid feed 102 in the liquid feed box 190 during operation of the aerosol generator 106.

The top retaining plate 130 of the liquid feed box 190 has eighty openings 194 therethrough, which are arranged in four subgroups 196 of twenty openings 194 each. The openings 194 of the top retaining plate 130 correspond in size with the openings 184 of the bottom retaining plate 128 (shown in FIG. 8). When the aerosol generator 106 is assembled, the openings 194 through the top retaining plate 130 and the openings 184 through the bottom retaining plate 128 are aligned, with the separator 126 positioned therebetween, to permit transmission of ultrasonic signals when the aerosol generator 106 is in operation.

Figure 11:
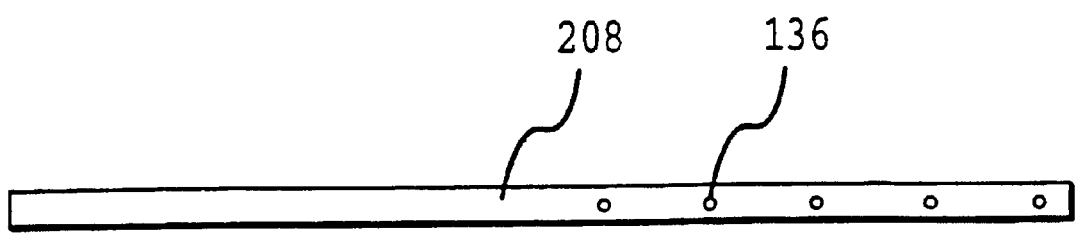

Referring now to FIGS. 9–11, a plurality of gas tube feed-through holes 202 extend through the vertically extending walls 192 to either side of the assembly including the feed inlet 148 and feed outlet 152 of the liquid feed box 190. The gas tube feed-through holes 202 are designed to permit insertion therethrough of gas tubes 208 of a design as shown in FIG. 11. When the aerosol generator 106 is assembled, a gas tube 208 is inserted through each of the gas tube feed-through holes 202 so that gas delivery ports 136 in the gas tube 208 will be properly positioned and aligned adjacent the openings 194 in the top retaining plate 130 for delivery of gas to atomization cones that develop in the liquid feed box 190 during operation of the aerosol generator 106. The gas delivery ports 136 are typically holes having a diameter of from about 1.5 millimeters to about 3.5 millimeters.

Figure 12:
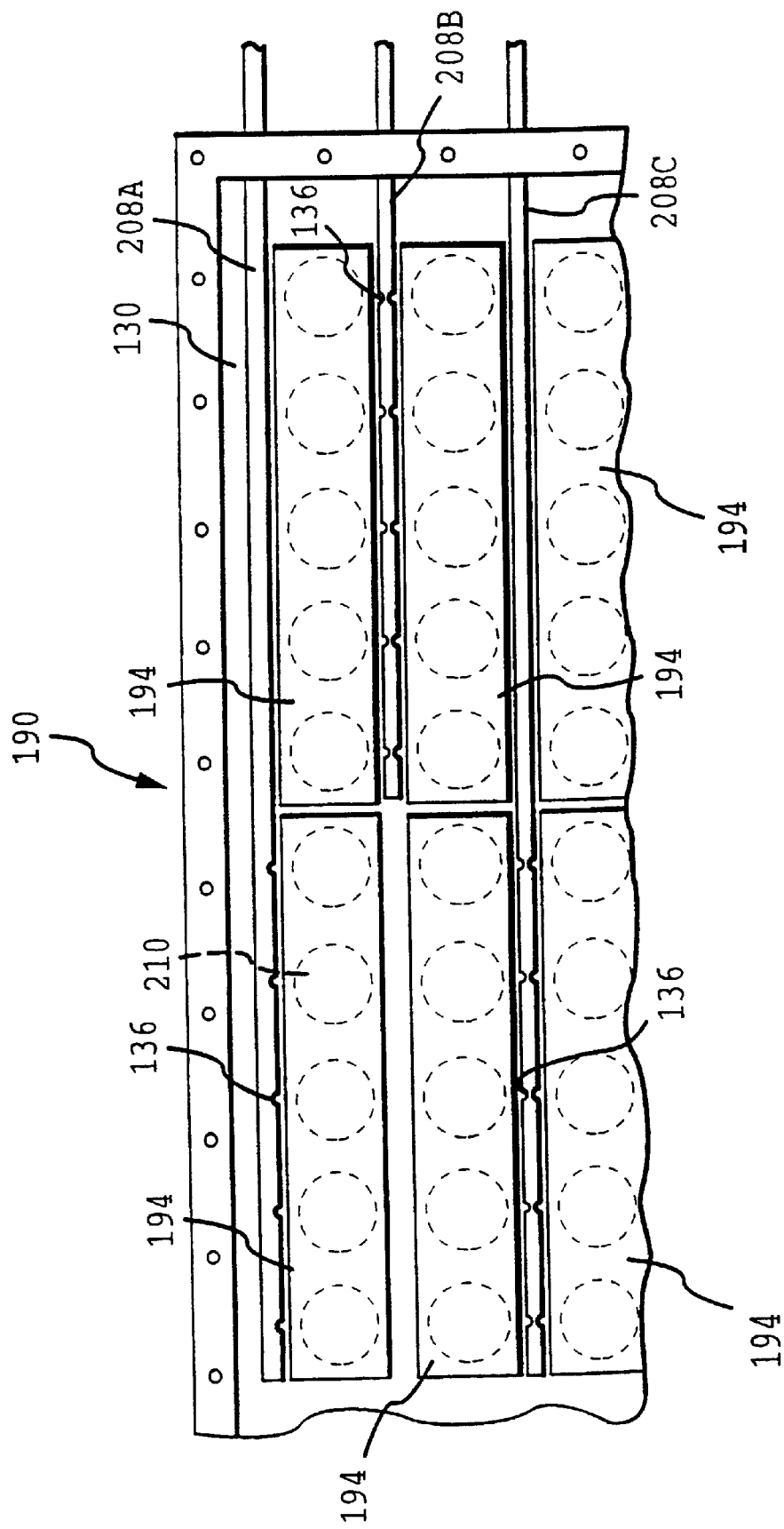

Referring now to FIG. 12, a partial view of the liquid feed box 190 is shown with gas tubes 208A, 208B and 208C positioned adjacent to the openings 194 through the top retaining plate 130. Also shown in FIG. 12 are the relative locations that ultrasonic transducer discs 120 would occupy when the aerosol generator 106 is assembled. As seen in FIG. 12, the gas tube 208A, which is at the edge of the array, has five gas delivery ports 136. Each of the gas delivery ports 136 is positioned to divert carrier gas 104 to a different one of atomization cones that develop over the array of ultrasonic transducer discs 120 when the aerosol generator 106 is operating. The gas tube 208B, which is one row in from the edge of the array, is a shorter tube that has ten gas delivery ports 136, five each on opposing sides of the gas tube 208B. The gas tube 208B, therefore, has gas delivery ports 136 for delivering gas to atomization cones corresponding with each of ten ultrasonic transducer discs 120. The third gas tube, 208C, is a longer tube that also has ten gas delivery ports 136 for delivering gas to atomization cones corresponding with ten ultrasonic transducer discs 120. The design shown in FIG. 12, therefore, includes one gas delivery port per ultrasonic transducer disc 120.

Although this is a lower density of gas delivery ports 136 than for the embodiment of the aerosol generator 106 shown in FIG. 2, which includes two gas delivery ports per ultrasonic transducer disc 120, the design shown in FIG. 12 is, nevertheless, capable of producing a dense, high-quality aerosol without unnecessary waste of gas.

Figure 13:
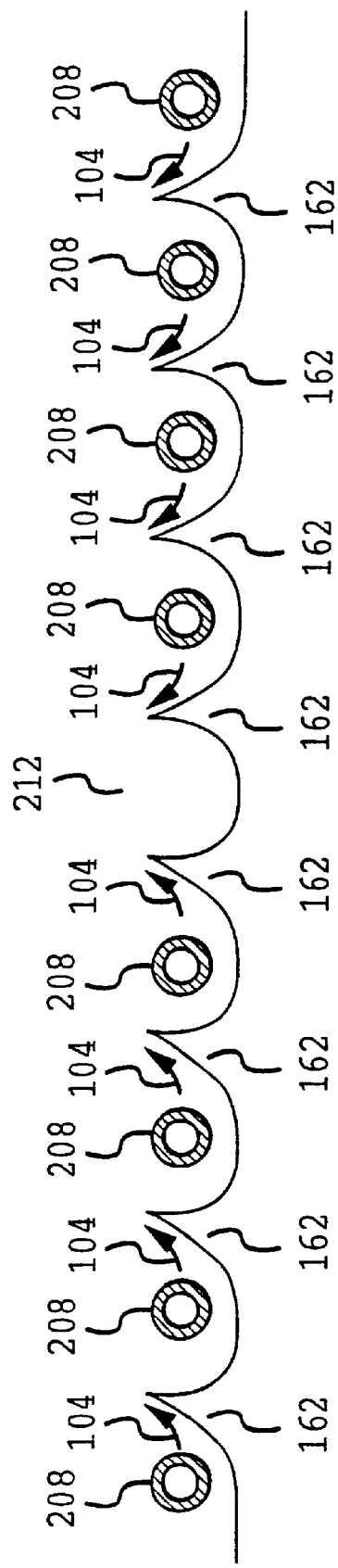

Referring now to FIG. 13, the flow of carrier gas 104 relative to atomization cones 162 during operation of the aerosol generator 106 having a gas distribution configuration to deliver carrier gas 104 from gas delivery ports on both sides of the gas tubes 208, as was shown for the gas tubes 208A, 208B and 208C in the gas distribution configuration shown in FIG. 11. The carrier gas 104 sweeps both directions from each of the gas tubes 208.

Figure 14:
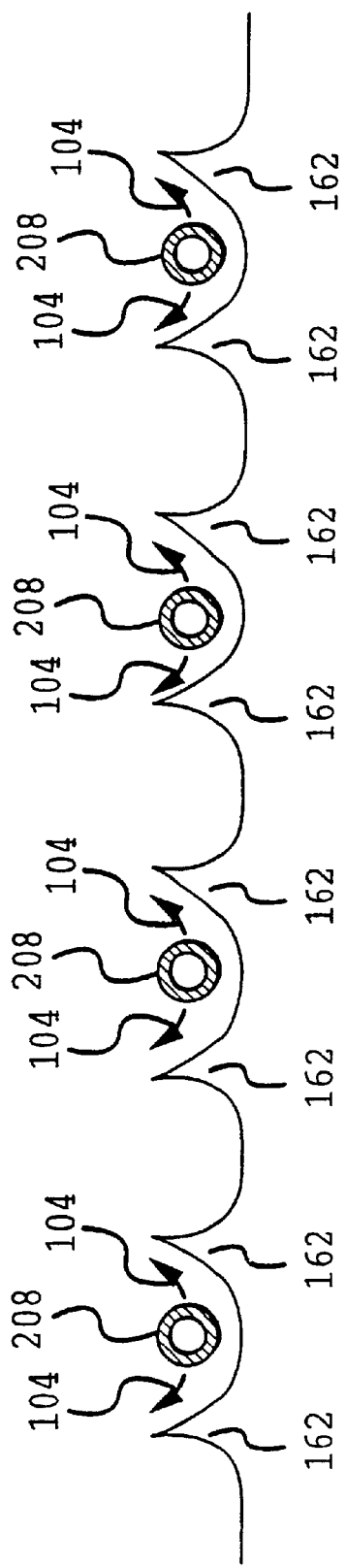

An alternative, and preferred, flow for carrier gas 104 is shown in FIG. 14. As shown in FIG. 14, carrier gas 104 is delivered from only one side of each of the gas tubes 208. This results in a sweep of carrier gas from all of the gas tubes 208 toward a central area 212. This results in a more uniform flow pattern for aerosol generation that may significantly enhance the efficiency with which the carrier gas 104 is used to produce an aerosol. The aerosol that is generated, therefore, tends to be more heavily loaded with liquid droplets.

Figure 15:
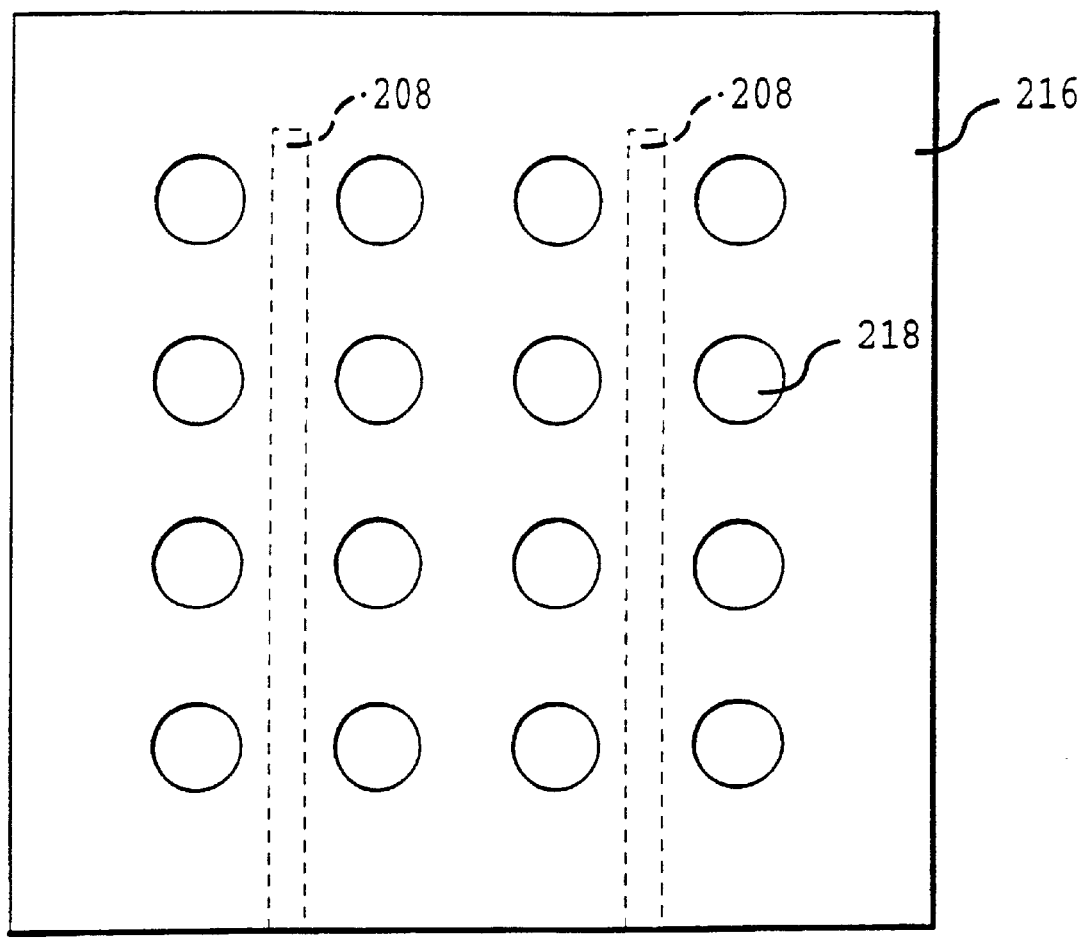
Figure 16:
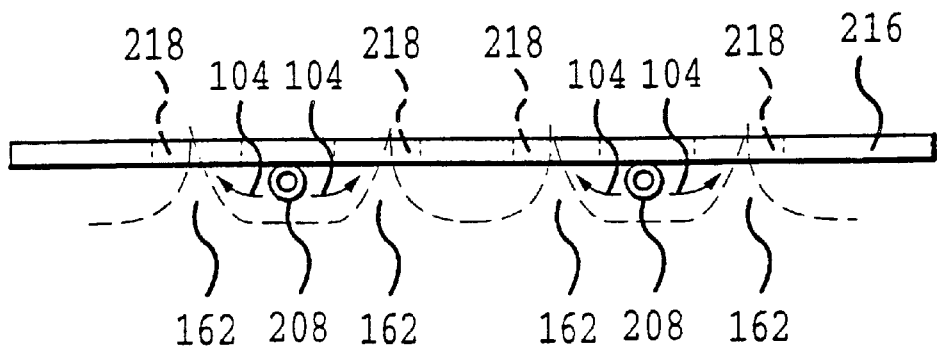

Another configuration for distributing carrier gas in the aerosol generator 106 is shown in FIGS. 15 and 16. In this configuration, the gas tubes 208 are hung from a gas distribution plate 216 adjacent gas flow holes 218 through the gas distribution plate 216. In the aerosol generator 106, the gas distribution plate 216 would be mounted above the liquid feed, with the gas flow holes positioned to each correspond with an underlying ultrasonic transducer. Referring specifically to FIG. 16, when the ultrasonic generator 106 is in operation, atomization cones 162 develop through the gas flow holes 218, and the gas tubes 208 are located such that carrier gas 104 exiting from ports in the gas tubes 208 impinge on the atomization cones and flow upward through the gas flow holes. The gas flow holes 218, therefore, act to assist in efficiently distributing the carrier gas 104 about the atomization cones 162 for aerosol formation. It should be appreciated that the gas distribution plates 218 can be made to accommodate any number of the gas tubes 208 and gas flow holes 218. For convenience of illustration, the embodiment shown in FIGS. 15 and 16 shows a design having only two of the gas tubes 208 and only 16 of the gas flow holes 218. Also, it should be appreciated that the gas distribution plate 216 could be used alone, without the gas tubes 208. In that case, a slight positive pressure of carrier gas 104 would be maintained under the gas distribution plate 216 and the gas flow holes 218 would be sized to maintain the proper velocity of carrier gas 104 through the gas flow holes 218 for efficient aerosol generation. Because of the relative complexity of operating in that mode, however, it is not preferred.

Figure 17:
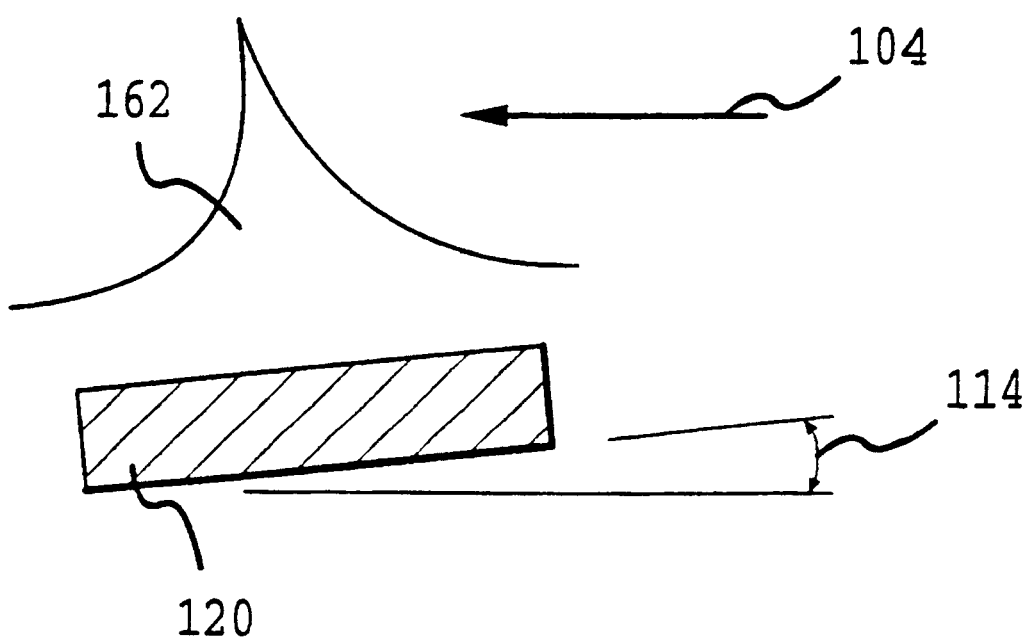

Aerosol generation may also be enhanced through mounting of ultrasonic transducers at a slight angle and directing the carrier gas at resulting atomization cones such that the atomization cones are tilting in the same direction as the direction of flow of carrier gas. Referring to FIG. 17, an ultrasonic transducer disc 120 is shown. The ultrasonic transducer disc 120 is tilted at a tilt angle 114 (typically less than 10 degrees), so that the atomization cone 162 will also have a tilt. It is preferred that the direction of flow of the carrier gas 104 directed at the atomization cone 162 is in the same direction as the tilt of the atomization cone 162.

Figure 18:
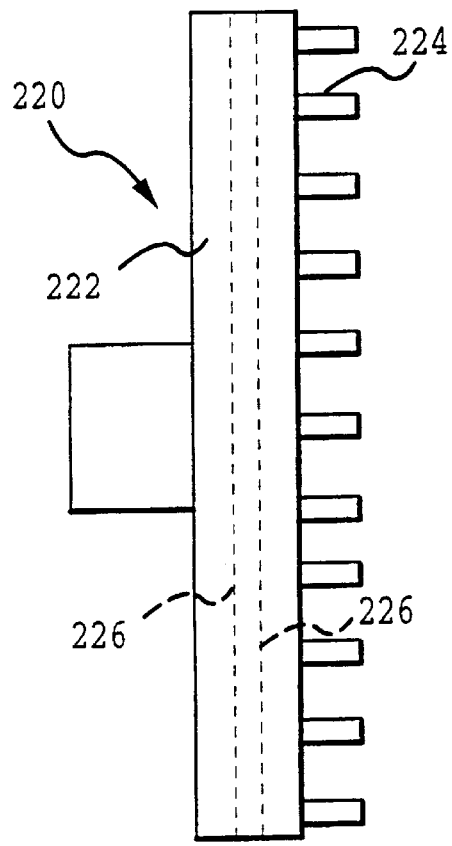
Figure 19:
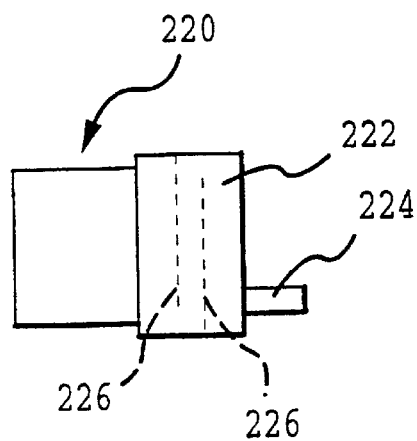

Referring now to FIGS. 18 and 19, a gas manifold 220 is shown for distributing gas to the gas tubes 208 in a 400 transducer array design. The gas manifold 220 includes a gas distribution box 222 and piping stubs 224 for connection with gas tubes 208 (shown in FIG. 11). Inside the gas distribution box 222 are two gas distribution plates 226 that form a flow path to assist in distributing the gas equally throughout the gas distribution box 222, to promote substantially equal delivery of gas through the piping stubs 224. The gas manifold 220, as shown in FIGS. 18 and 19, is designed to feed eleven gas tubes 208. For the 400 transducer design, a total of four gas manifolds 220 are required.

Figure 20:
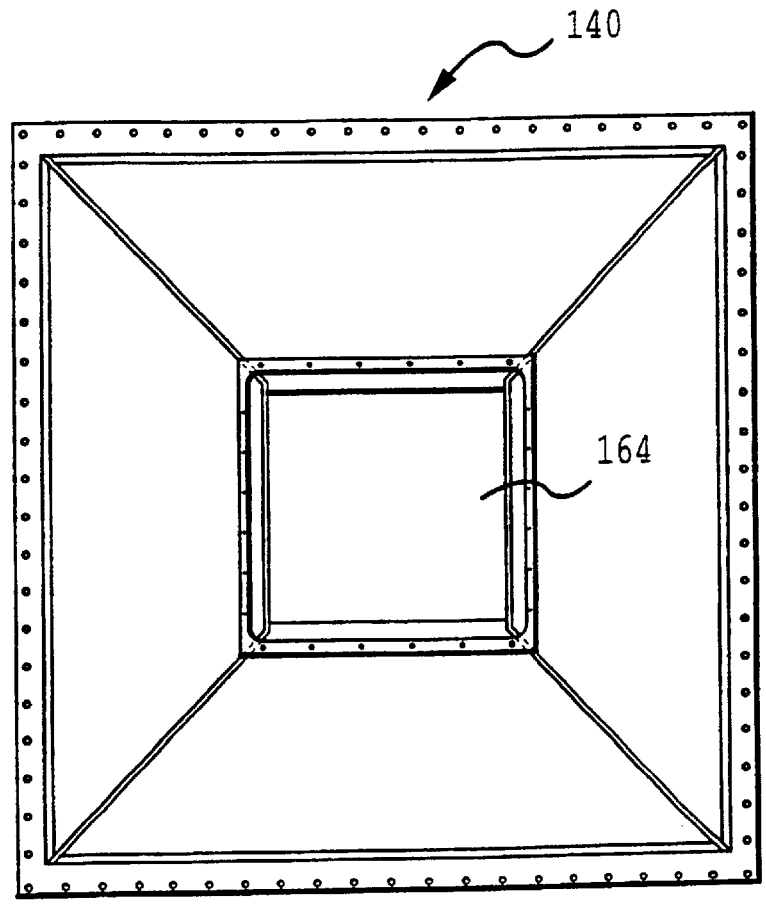
Figure 21:
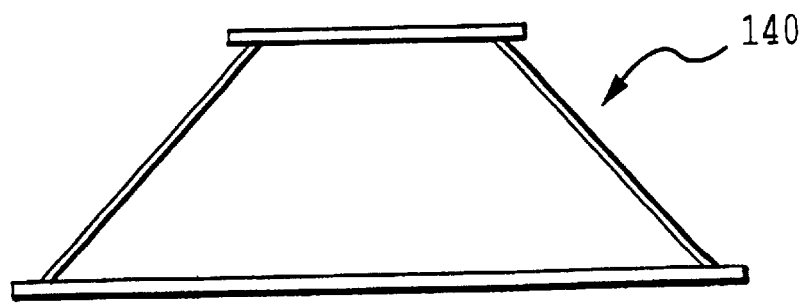

Referring now to FIGS. 20 and 21, the generator lid 140 is shown for a 400 transducer array design. The generator lid 140 mates with and covers the liquid feed box 190 (shown in FIGS. 9 and 10). The generator lid 140, as shown in FIGS. 20 and 21, has a hood design to permit easy collection of the aerosol 108 without subjecting droplets in the aerosol 108 to sharp edges on which droplets may coalesce and be lost, and possibly interfere with the proper operation of the aerosol generator 106. When the aerosol generator 106 is in operation, the aerosol 108 would be withdrawn via the aerosol exit opening 164 through the generator cover 140.

The design and apparatus of the aerosol generator 106 described with reference to FIGS. 2–21, as well as a facility including other process equipment described herein for carrying out the process of the present invention for making powders are within the scope of the present invention.

Figure 22:
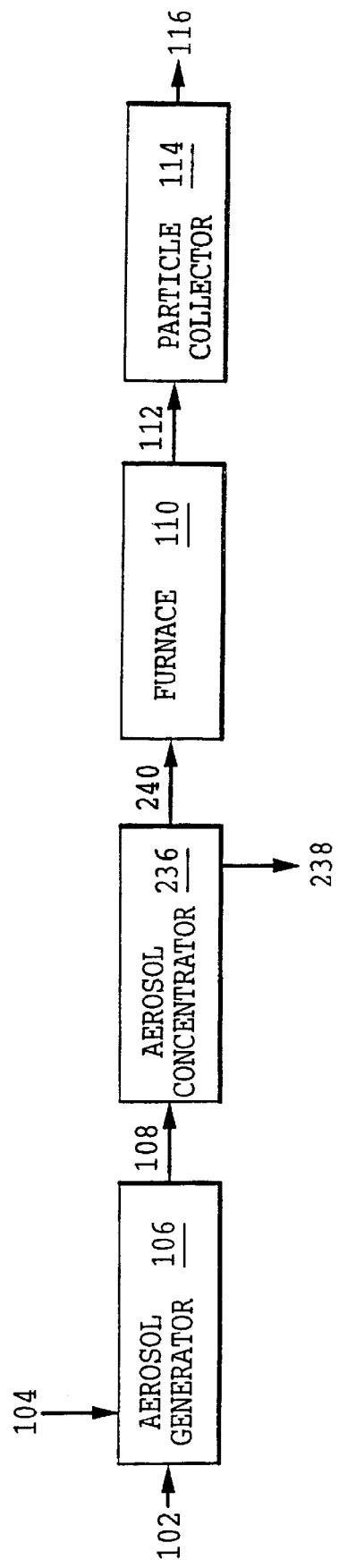

Although the aerosol generator 106 produces a high quality aerosol 108 having a high droplet loading, it is often desirable to further concentrate the aerosol 108 prior to introduction into the furnace 110. Referring now to FIG. 22, a process flow diagram is shown for one embodiment of the present invention involving such concentration of the aerosol 108. As shown in FIG. 22, the aerosol 108 from the aerosol generator 106 is sent to an aerosol concentrator 236 where excess carrier gas 238 is withdrawn from the aerosol 108 to produce a concentrated aerosol 240, which is then fed to the furnace 110.

The aerosol concentrator 236 typically includes one or more virtual impactors capable of concentrating droplets in the aerosol 108 by a factor of greater than about 2, preferably by a factor of greater than about 5, and more preferably by a factor of greater than about 10, to produce the concentrated aerosol 240. According to the present invention, the concentrated aerosol 240 should typically contain greater than about $1 \times 10^7$ droplets per cubic centimeter, and more preferably from about $5 \times 10^7$ to about $5 \times 10^8$ droplets per cubic centimeter. A concentration of about $1 \times 10^8$ droplets per cubic centimeter of the concentrated aerosol is particularly preferred, because when the concentrated aerosol 240 is loaded more heavily than that, then the frequency of collisions between droplets becomes large enough to impair the properties of the concentrated aerosol 240, resulting in potential contamination of the particulate product 116 with an undesirably large quantity of over-sized particles. For example, if the aerosol 108 has a concentration of about $1 \times 10^7$ droplets per cubic centimeter, and the aerosol concentrator 236 concentrates droplets by a factor of 10, then the concentrated aerosol 240 will have a concentration of about $1 \times 10^8$ droplets per cubic centimeter. Stated another way, for example, when the aerosol generator generates the aerosol 108 with a droplet loading of about 0.167 milliliters liquid feed 102 per liter of carrier gas 104, the concentrated aerosol 240 would be loaded with about 1.67 milliliters of liquid feed 102 per liter of carrier gas 104, assuming the aerosol 108 is concentrated by a factor of 10.

Having a high droplet loading in aerosol feed to the furnace 110 provides the important advantage of reducing the heating demand on the furnace 110 and the size of flow conduits required through the furnace. Also, other advantages of having a dense aerosol include a reduction in the demands on cooling and particle collection components, permitting significant equipment and operational savings. Furthermore, as system components are reduced in size, powder holdup within the system is reduced, which is also desirable. Concentration of the aerosol stream prior to entry into the furnace 110, therefore, provides a substantial advantage relative to processes that utilize less concentrated aerosol streams.

The excess carrier gas 238 that is removed in the aerosol concentrator 236 typically includes extremely small droplets that are also removed from the aerosol 108. Preferably, the droplets removed with the excess carrier gas 238 have a weight average size of smaller than about 1.5 microns, and more preferably smaller than about 1 micron and the droplets retained in the concentrated aerosol 240 have an average droplet size of larger than about 2 microns. For example, a virtual impactor sized to treat an aerosol stream having a weight average droplet size of about three microns might be designed to remove with the excess carrier gas 238 most droplets smaller than about 1.5 microns in size. Other designs are also possible. When using the aerosol generator 106 with the present invention, however, the loss of these very small droplets in the aerosol concentrator 236 will typically constitute no more than about 10 percent by weight, and more preferably no more than about 5 percent by weight, of the droplets originally in the aerosol stream that is fed to the concentrator 236. Although the aerosol concentrator 236 is useful in some situations, it is normally not required with the process of the present invention, because the aerosol generator 106 is capable, in most circumstances, of generating an aerosol stream that is sufficiently dense. So long as the aerosol stream coming out of the aerosol generator 102 is sufficiently dense, it is preferred that the aerosol concentrator not be used. It is a significant advantage of the present invention that the aerosol generator 106 normally generates such a dense aerosol stream that the aerosol concentrator 236 is not needed. Therefore, the complexity of operation of the aerosol concentrator 236 and accompanying liquid losses may typically be avoided.

It is important that the aerosol stream (whether it has been concentrated or not) that is fed to the furnace 110 have a high droplet flow rate and high droplet loading as would be required for most industrial applications. With the present invention, the aerosol stream fed to the furnace preferably includes a droplet flow of greater than about 0.5 liters per hour, more preferably greater than about 2 liters per hour, still more preferably greater than about 5 liters per hour, even more preferably greater than about 10 liters per hour, particularly greater than about 50 liters per hour and most preferably greater than about 100 liters per hour; and with the droplet loading being typically greater than about 0.04 milliliters of droplets per liter of carrier gas, preferably greater than about 0.083 milliliters of droplets per liter of carrier gas 104, more preferably greater than about 0.167 milliliters of droplets per liter of carrier gas 104, still more preferably greater than about 0.25 milliliters of droplets per liter of carrier gas 104 , particularly greater than about 0.33 milliliters of droplets per liter of carrier gas 104 and most preferably greater than about 0.83 milliliters of droplets per liter of carrier gas 104.

As discussed previously, the aerosol generator 106 of the present invention produces a concentrated, high quality aerosol of micro-sized droplets having a relatively narrow size distribution. It has been found, however, that for many applications the process of the present invention is significantly enhanced by further classifying by size the droplets in the aerosol 108 prior to introduction of the droplets into the furnace 110. In this manner, the size and size distribution of particles in the particulate product 116 are further controlled.

Figure 23:
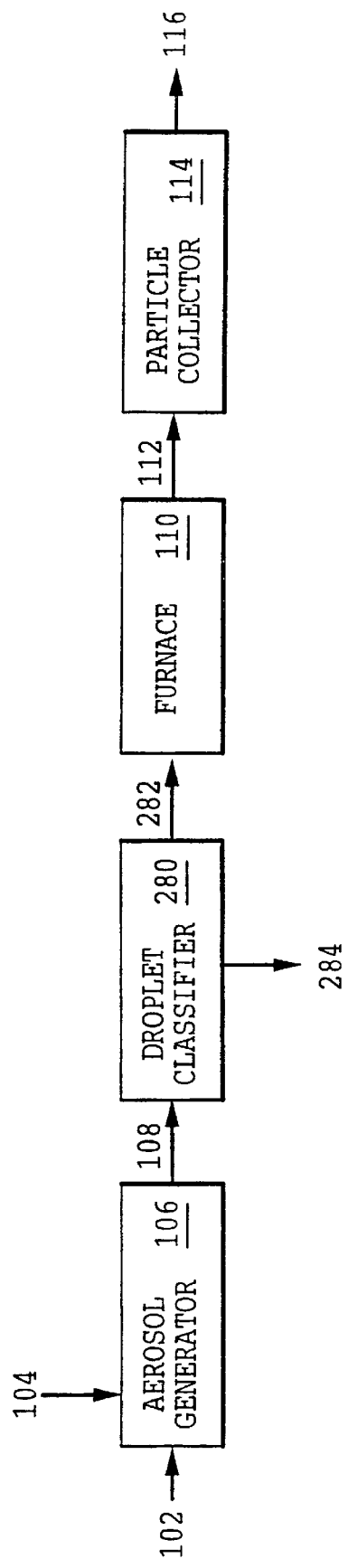

Referring now to FIG. 23, a process flow diagram is shown for one embodiment of the process of the present invention including such droplet classification. As shown in FIG. 23, the aerosol 108 from the aerosol generator 106 goes to a droplet classifier 280 where oversized droplets are removed from the aerosol 108 to prepare a classified aerosol 282. Liquid 284 from the oversized droplets that are being removed is drained from the droplet classifier 280. This drained liquid 284 may advantageously be recycled for use in preparing additional liquid feed 102.

Any suitable droplet classifier may be used for removing droplets above a predetermined size. For example, a cyclone could be used to remove over-size droplets. A preferred droplet classifier for many applications, however, is an impactor.

In a preferred embodiment of the present invention, the droplet classifier 280 is typically designed to remove droplets from the aerosol 108 that are larger than about 15 microns in size, more preferably to remove droplets larger than about 10 microns in size, even more preferably to remove droplets of a size larger than about 8 microns in size and most preferably to remove droplets larger than about 5 microns in size. The droplet classification size in the droplet classifier is preferably smaller than about 15 microns, more preferably smaller than about 10 microns, even more preferably smaller than about 8 microns and most preferably smaller than about 5 microns. The classification size, also called the classification cut point, is that size at which half of the droplets of that size are removed and half of the droplets of that size are retained. Because the aerosol generator 106 of the present invention initially produces a high quality aerosol 108, having a relatively narrow size distribution of droplets, typically less than about 30 weight percent of liquid feed 102 in the aerosol 108 is removed as the drain liquid 284 in the droplet classifier 288, with preferably less than about 25 weight percent being removed, even more preferably less than about 20 weight percent being removed and most preferably less than about 15 weight percent being removed. Minimizing the removal of liquid feed 102 from the aerosol 108 is particularly important for commercial applications to increase the yield of high quality particulate product 116. It should be noted, however, that because of the superior performance of the aerosol generator 106, it is frequently not required to use an impactor or other droplet classifier to obtain a desired absence of oversize droplets to the furnace 110. This is a major advantage, because the added complexity and liquid losses accompanying use of an impactor may often be avoided with the process of the present invention.

Sometimes it is desirable to use both the aerosol concentrator 236 and the droplet classifier 280 to produce an extremely high quality aerosol stream for introduction into the furnace for the production of particles of highly controlled size and size distribution. By using both a virtual impactor and an impactor, both undesirably large and undesirably small droplets are removed, thereby producing a classified aerosol with a very narrow droplet size distribution. Also, the order of the aerosol concentrator 236 and the aerosol classifier 280 could be with either device positioned first. Typically, however, the aerosol concentrator 236 will be positioned ahead of the droplet classifier 280.

Figure 24:
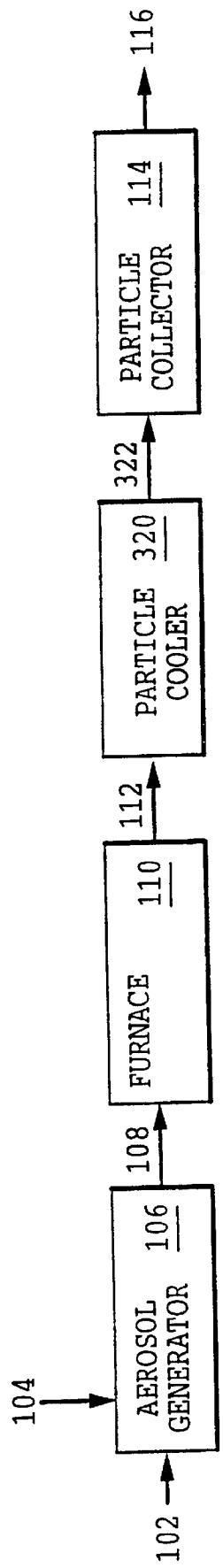

With some applications of the process of the present invention, it may be possible to collect the particles 112 directly from the output of the furnace 110. More often, however, it will be desirable to cool the particles 112 exiting the furnace 110 prior to collection of the particles 112 in the particle collector 114. Referring now to FIG. 24, one embodiment of the process of the present invention is shown in which the particles 112 exiting the furnace 110 are sent to a particle cooler 320 to produce a cooled particle stream 322, which is then feed to the particle collector 114. Although the particle cooler 320 may be any cooling apparatus capable of cooling the particles 112 to the desired temperature for introduction into the particle collector 114, traditional heat exchanger designs are not preferred. This is because a traditional heat exchanger design ordinarily directly subjects the aerosol stream, in which the hot particles 112 are suspended, to cool surfaces. In that situation, significant losses of the particles 112 occur due to thermophoretic deposition of the hot particles 112 on the cool surfaces of the heat exchanger. According to the present invention, a gas quench apparatus is provided for use as the particle cooler 320 that significantly reduces thermophoretic losses compared to a traditional heat exchanger.

Figure 25:
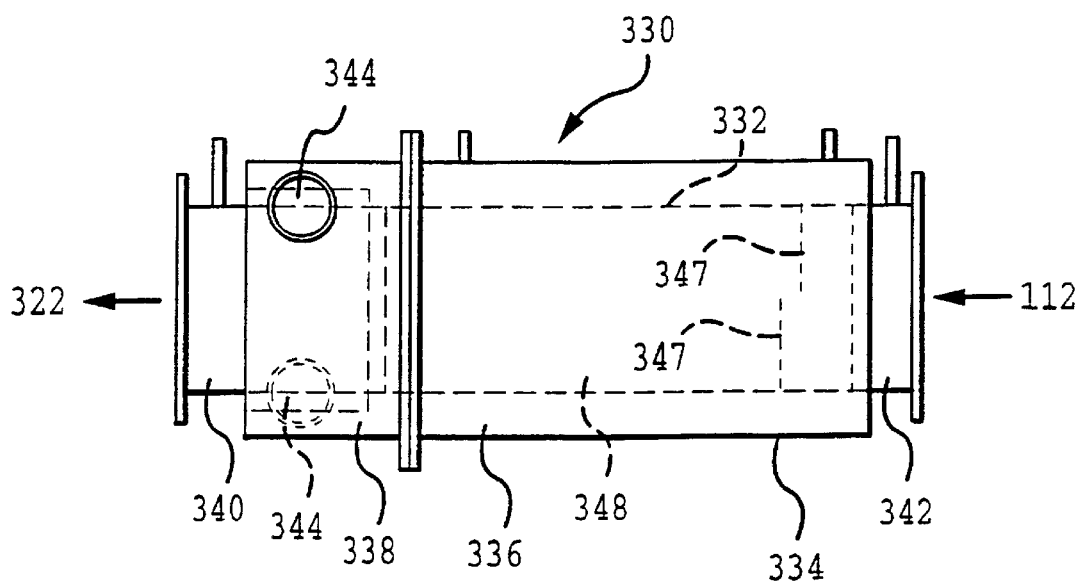
Figures 26, 27:
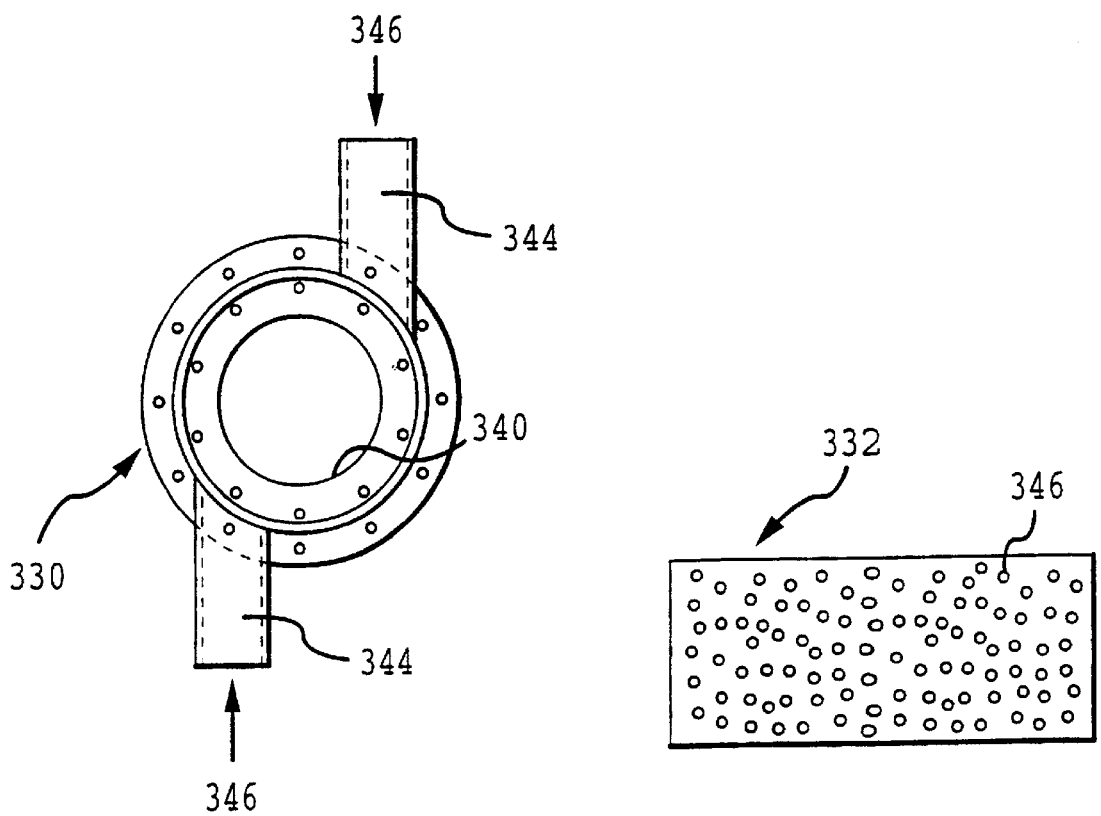
Figure 28:
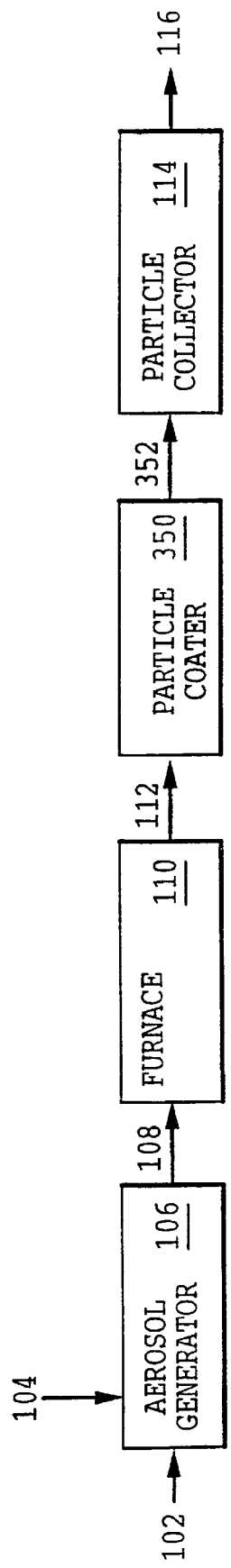
Figure 29:
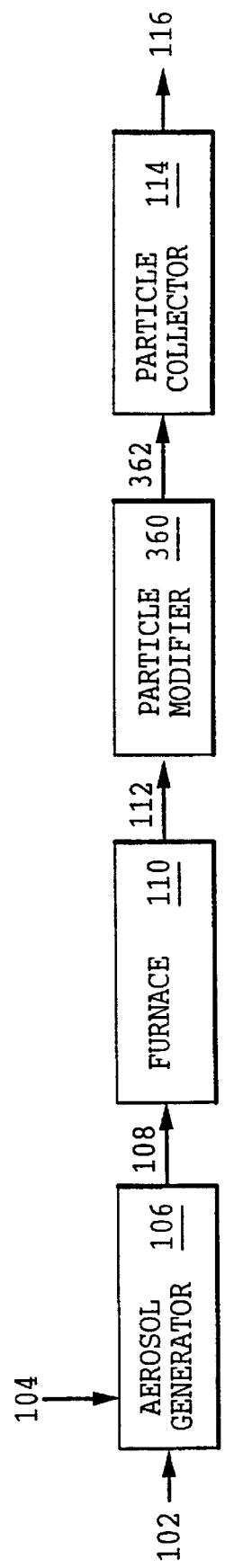
Figure 30A:
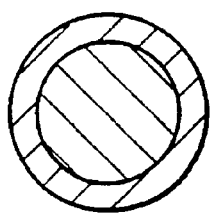
Figure 30B:
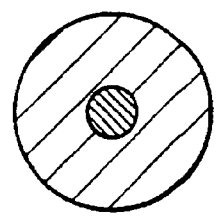
Figure 30C:
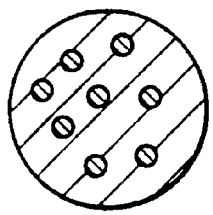
Figure 30D:
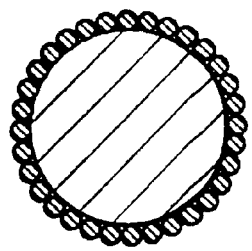
Figure 30E:
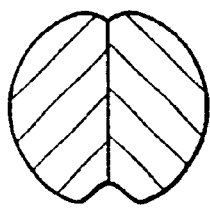
Figure 30F:
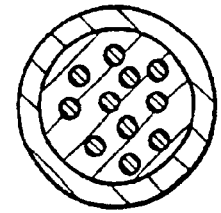

Referring now to FIGS. 25–27, one embodiment of a gas quench cooler 330 is shown. The gas quench cooler includes a perforated conduit 332 housed inside of a cooler housing 334 with an annular space 336 located between the cooler housing 334 and the perforated conduit 332. In fluid communication with the annular space 336 is a quench gas inlet box 338, inside of which is disposed a portion of an aerosol outlet conduit 340. The perforated conduit 332 extends between the aerosol outlet conduit 340 and an aerosol inlet conduit 342. Attached to an opening into the quench gas inlet box 338 are two quench gas feed tubes 344. Referring specifically to FIG. 27, the perforated tube 332 is shown. The perforated tube 332 has a plurality of openings 345. The openings 345, when the perforated conduit 332 is assembled into the gas quench cooler 330, permit the flow of quench gas 346 from the annular space 336 into the interior space 348 of the perforated conduit 332. Although the openings 345 are shown as being round holes, any shape of opening could be used, such as slits. Also, the perforated conduit 332 could be a porous screen. Two heat radiation shields 347 prevent downstream radiant heating from the furnace. In most instances, however, it will not be necessary to include the heat radiation shields 347, because downstream radiant heating from the furnace is normally not a significant problem. Use of the heat radiation shields 347 is not preferred due to particulate losses that accompany their use.

With continued reference to FIGS. 25–27, operation of the gas quench cooler 330 will now be described. During operation, the particles 112, carried by and dispersed in a gas stream, enter the gas quench cooler 330 through the aerosol inlet conduit 342 and flow into the interior space 348 of perforated conduit 332. Quench gas 346 is introduced through the quench gas feed tubes 344 into the quench gas inlet box 338. Quench gas 346 entering the quench gas inlet box 338 encounters the outer surface of the aerosol outlet conduit 340, forcing the quench gas 346 to flow, in a spiraling, swirling manner, into the annular space 336, where the quench gas 346 flows through the openings 345 through the walls of the perforated conduit 332. Preferably, the gas 346 retains some swirling motion even after passing into the interior space 348. In this way, the particles 112 are quickly cooled with low losses of particles to the walls of the gas quench cooler 330. In this manner, the quench gas 346 enters in a radial direction into the interior space 348 of the perforated conduit 332 around the entire periphery, or circumference, of the perforated conduit 332 and over the entire length of the perforated conduit 332. The cool quench gas 346 mixes with and cools the hot particles 112, which then exit through the aerosol outlet conduit 340 as the cooled particle stream 322. The cooled particle stream 322 can then be sent to the particle collector 114 for particle collection. The temperature of the cooled particle stream 322 is controlled by introducing more or less quench gas. Also, as shown in FIG. 25, the quench gas 346 is fed into the quench cooler 330 in counter flow to flow of the particles. Alternatively, the quench cooler could be designed so that the quench gas 346 is fed into the quench cooler in concurrent flow with the flow of the particles 112. The amount of quench gas 346 fed to the gas quench cooler 330 will depend upon the specific material being made and the specific operating conditions. The quantity of quench gas 346 used, however, must be sufficient to reduce the temperature of the aerosol steam including the particles 112 to the desired temperature. Typically, the particles 112 are cooled to a temperature at least below about 200° C., and often lower. The only limitation on how much the particles 112 are cooled is that the cooled particle stream 322 must be at a temperature that is above the condensation temperature for water as another condensible vapor in the stream. The temperature of the cooled particle stream 322 is often at a temperature of from about 50° C. to about 120° C.

Because of the entry of quench gas 346 into the interior space 348 of the perforated conduit 322 in a radial direction about the entire circumference and length of the perforated conduit 322, a buffer of the cool quench gas 346 is formed about the inner wall of the perforated conduit 332, thereby significantly inhibiting the loss of hot particles 112 due to thermophoretic deposition on the cool wall of the perforated conduit 332. In operation, the quench gas 346 exiting the openings 345 and entering into the interior space 348 should have a radial velocity (velocity inward toward the center of the circular cross-section of the perforated conduit 332) of larger than the thermophoretic velocity of the particles 112 inside the perforated conduit 332 in a direction radially outward toward the perforated wall of the perforated conduit 332.

As seen in FIGS. 25–27, the gas quench cooler 330 includes a flow path for the particles 112 through the gas quench cooler of a substantially constant cross-sectional shape and area Preferably, the flow path through the gas quench cooler 330 will have the same cross-sectional shape and area as the flow path through the furnace 110 and through the conduit delivering the aerosol 108 from the aerosol generator 106 to the furnace 110.

Also, particle cooling in the quench cooler is accomplished very quickly, reducing the potential for thermophoretic losses during cooling. The total residence time for the aerosol flowing through both the heated zone of the furnace 110 and through the quench cooler is typically shorter than about 5 seconds, more preferably shorter than about 2 seconds, and most preferably shorter than about 1 second.

In an additional embodiment, the process of the present invention can also incorporate compositional modification of the particles 112 exiting the furnace. Most commonly, the compositional modification will involve forming on the particles 112 a material phase that is different than that of the particles 112, such as by coating the particles 112 with a coating material. One embodiment of the process of the present invention incorporating particle coating is shown in FIG. 28. As shown in FIG. 28, the particles 112 exiting from the furnace 110 go to a particle coater 350 where a coating is placed over the outer surface of the particles 112 to form coated particles 352, which are then sent to the particle collector 114 for preparation of the particulate product 116.

In the particle coater 350, the particles 112 are coated using any suitable particle coating technology, such as by gas-to-particle conversion. Preferably, however, the coating is accomplished by chemical vapor deposition (CVD) and/or physical vapor deposition (PVD). In CVD coating, one or more vapor phase coating precursors are reacted to form a surface coating on the particles 112. Preferred coatings deposited by CVD include oxides, such as silica, alumina, titania and zirconia, and elemental metals. For example, silica may be deposited using a silane precursor, such as tetrachlorosilane. In PVD coating, coating material physically deposits on the surface of the particles 112. Preferred coatings deposited by PVD include organic materials and elemental metals, such as elemental silver, copper and gold. Another possible surface coating method is surface conversion of the surface portion of the particles 112 by reaction with a vapor phase reactant to convert a surface portion of the particles to a different material than that originally contained in the particles 112. Although any suitable apparatus may be used for the particle coater 350, when a gaseous coating feed involving coating precursors is used, such as for CVD and PVD, feed of the gaseous coating feed is introduced through a circumferentially perforated conduit, such as was described for the quench cooler 330 with reference to FIGS. 25–27. In some instances, the quench cooler 330 may also act as the particle coater 350, when coating material precursors are included in the quench gas 346.

With continued reference primarily to FIG. 28, in a preferred embodiment, when the particles 112 are coated according to the process of the present invention, the particles 112 are also manufactured via the aerosol process of the present invention, as previously described. The process of the present invention can, however, be used to coat particles that have been premanufactured by a different process, such as by a liquid precipitation route. When coating particles that have been premanufactured by a different route, such as by liquid precipitation, it is preferred that the particles remain in a dispersed state from the time of manufacture to the time that the particles are introduced in slurry form into the aerosol generator 106 for preparation of the aerosol 108 to form the dry particles 112 in the furnace 110, which particles 112 can then be coated in the particle coater 350. Maintaining particles in a dispersed state from manufacture through coating avoids problems associated with agglomeration and redispersion of particles if particles must be redispersed in the liquid feed 102 for feed to the aerosol generator 106. For example, for particles originally precipitated from a liquid medium, the liquid medium containing the suspended precipitated particles could be used to form the liquid feed 102 to the aerosol generator 106. It should be noted that the particle coater 350 could be an integral extension of the furnace 110 or could be a separate piece of equipment.

In a further embodiment of the present invention, following preparation of the particles 112 in the furnace 110, the particles 112 may then be structurally modified to impart desired physical properties prior to particle collection. Referring now to FIG. 29, one embodiment of the process of the present invention is shown including such structural particle modification. The particles 112 exiting the furnace 110 go to a particle modifier 360 where the particles are structurally modified to form modified particles 362, which are then sent to the particle collector 114 for preparation of the particulate product 116. The particle modifier 360 is typically a furnace, such as an annealing furnace, which may be integral with the furnace 110 or may be a separate heating device. Regardless, it is important that the particle modifier 360 have temperature control that is independent of the furnace 110, so that the proper conditions for particle modification may be provided separate from conditions required of the furnace 110 to prepare the particles 112. The particle modifier 360, therefore, typically provides a temperature controlled environment and necessary residence time to effect the desired structural modification of the particles 112.

The structural modification that occurs in the particle modifier 360 may be any modification to the crystalline structure or morphology of the particles 112. For example, the particles 112 may be annealed in the particle modifier 360 to density the particles 112 or to recrystallize the particles 112 into a polycrystalline or single crystalline form. Also, especially in the case of composite particles 112, the particles may be annealed for a sufficient time to permit redistribution within the particles 112 of different material phases.

The initial morphology of composite particles made in the furnace 110, according to the present invention, could take a variety of forms, depending upon the specified materials involved and the specific processing conditions. Examples of some possible composite particle morphologies, manufacturable according to the present invention are shown in FIGS. 30A–F. These morphologies could be of the particles as initially produced in the furnace 110 or that result from structural modification in the particle modifier 360. Furthermore, the composite particles could include a mixture of the morphological attributes shown in FIG. 30.

When making multi-phase particles, a preferred multi-phase particle includes a metallic phase, such as with at least one of palladium, silver, nickel and copper, and a nonmetallic phase. Preferred for the nonmetallic phase is at least one of silica, alumina, titania and zirconia. Another preferred nonmetallic phase includes a titanate, and preferably a titanate of at least one of barium, strontium, neodymium, calcium, magnesium and lead.

Aerosol generation with the process of the present invention has thus far been described with respect to the ultrasonic aerosol generator. Use of the ultrasonic generator is preferred for the process of the present invention because of the extremely high quality and dense aerosol generated. In some instances, however, the aerosol generator for the process of the present invention may have a different design depending upon the specific application. For example, when larger particles are desired, such as those having a weight average size of larger than about 3 microns, a spray nozzle atomizer may be preferred. For smaller-particle applications, however, and particularly for those applications to produce particles smaller than about 3 microns, and preferably smaller than about 2 microns in size, as is generally desired with the particles of the present invention, the ultrasonic generator, as described herein, is particularly preferred. In that regard, the ultrasonic generator of the present invention is particularly preferred for when making particles with a weight average size of from about 0.2 micron to about 3 microns.

Although ultrasonic aerosol generators have been used for medical applications and home humidifiers, use of ultrasonic generators for spray pyrolysis particle manufacture has largely been confined to small-scale, experimental situations. The ultrasonic aerosol generator of the present invention described with reference to FIGS. 2–21, however, is well suited for commercial production of high quality powders with a small average size and a narrow size distribution. In that regard, the aerosol generator produces a high quality aerosol, with heavy droplet loading and at a high rate of production. Such a combination of small droplet size, narrow size distribution, heavy droplet loading, and high production rate provide significant advantages over existing aerosol generators that usually suffer from at least one of inadequately narrow size distribution, undesirably low droplet loading, or unacceptably low production rate.

Through the careful and controlled design of the ultrasonic generator of the present invention, an aerosol may be produced typically having greater than about 70 weight percent (and preferably greater than about 80 weight percent) of droplets in the size range of from about 1 micron to about 10 microns, preferably in a size range of from about 1 micron to about 5 microns and more preferably from about 2 microns to about 4 microns. Also, the ultrasonic generator of the present invention is capable of delivering high output rates of liquid feed in the aerosol. The rate of liquid feed, at the high liquid loadings previously described, is preferably greater than about 25 milliliters per hour per transducer, more preferably greater than about 37.5 milliliters per hour per transducer, even more preferably greater than about 50 milliliters per hour per transducer and most preferably greater than about 100 millimeters per hour per transducer. This high level of performance is desirable for commercial operations and is accomplished with the present invention with a relatively simple design including a single precursor bath over an array of ultrasonic transducers. The ultrasonic generator is made for high aerosol production rates at a high droplet loading, and with a narrow size distribution of droplets. The generator preferably produces an aerosol at a rate of greater than about 0.5 liter per hour of droplets, more preferably greater than about 2 liters per hour of droplets, still more preferably greater than about 5 liters per hour of droplets, even more preferably greater than about 10 liters per hour of droplets and most preferably greater than about 40 liters per hour of droplets. For example, when the aerosol generator has a 400 transducer design, as described with reference to FIGS. 3–21, the aerosol generator is capable of producing a high quality aerosol having high droplet loading as previously described, at a total production rate of preferably greater than about 10 liters per hour of liquid feed, more preferably greater than about 15 liters per hour of liquid feed, even more preferably greater than about 20 liters per hour of liquid feed and most preferably greater than about 40 liters per hour of liquid feed.

Under most operating conditions, when using such an aerosol generator, total particulate product produced is preferably greater than about 0.5 gram per hour per transducer, more preferably greater than about 0.75 gram per hour per transducer, even more preferably greater than about 1.0 gram per hour per transducer and most preferably greater than about 2.0 grams per hour per transducer.

The concentrations of soluble precursors in the liquid feed 102 will vary depending upon the particular materials involved and the particular particle composition and particle morphology desired. For most applications, when soluble precursor(s) are used, the soluble precursor(s) are present at a concentration of from about 1–50 weight percent of the liquid feed, 102. In any event, however, when soluble precursors are used, the precursors should be at a low enough concentration to permit the liquid feed to be ultrasonically atomized and to prevent premature precipitation of materials from the liquid feed 102. The concentration of suspended particulate precursors will also vary depending upon the particular materials involved in the particular application.

Powders of a variety of materials may be made according to the present invention, with the powders so produced being an important aspect of the invention. The particles may include, for example, single phase or multi-phase particles. Also, the particles may include a metallic phase or a nonmetallic phase.

With the present invention, these various powders may be made with very desirable attributes for a variety of applications. In that regard, the powders are typically made with a small weight average particle size, narrow particle size distribution, spheroidal particle shape, and high density relative to a theoretical density for the material of the particles. Also, the particles of the powder typically are either substantially single crystalline or are polycrystalline and with a large mean crystallite size.

With respect to particle size, the powders are characterized generally as having a weight average particle size that typically is in the range of from about 0.05 micron to about 4 microns, with most powders having a weight average size of from about 0.1 micron to about 3 microns. With the process of the present invention, however, particle size may generally be controlled to provide particles with a desired size. Particle size is varied primarily by altering the frequency of ultrasonic transducers in the aerosol generator and by altering the concentration of precursors in the liquid feed. Lower ultrasonic frequencies tend to produce larger particles, while higher frequencies tend to produce smaller particles. Also, higher precursor concentrations in the liquid feed tend to produce larger particles and lower precursor concentrations in the liquid feed tend to produce smaller particles.

The particles are typically characterized as having a weight average particle size in a range having a lower limit, depending upon the application, of from about 0.1 micron, or about 0.2 micron, or about 0.3 micron, or about 0.5 micron. or about 0.8 micron, or about 1 micron; and having an upper limit, depending upon the application, of about 4 microns, or about 3 microns, or about 2.5 microns, or about 2 microns, or about 1 micron, or about 0.8 micron, or about 0.6 micron. Powders having a weight average size range defined by any combination of one of the specified upper limits and one of the specified lower limits are within the scope of the present invention, so long as the upper limit is larger than the lower limit.

As will be appreciated by those skilled in the art, the size of particles as referred to herein is the size of what is often referred to as the primary particles. As is known in the art, it is common for particles manufactured by an aerosol route to form loosely bound, or "soft," agglomerates when the particles are collected. These soft agglomerates are easily dispersed back to the loose primary particles, such as by sonication, sieving or low shear milling. A preferred method for determining particle size is to first disperse the particles in a liquid medium, such as water, by sonication in an ultrasonic bath or horn to disperse soft agglomerates that may have formed, and to then determine primary particle size attributes by light scattering, such as in a Microtrac™ or other analytical equipment.

The powders are also characterized as having a narrow particle size distribution, typically with greater than about 75 weight percent, preferably greater than about 90 weight percent, and more preferably greater than about 95 weight percent of the particles in the powder having a size of smaller than two times the weight average particle size, and even more particularly smaller than about 1.5 times the weight average particle size.

The powders are also typically characterized as being comprised of spheroidal particles. In that regard, the particles are substantially spherical, in that the particles are not jagged or irregular in shape, although the particles may become faceted as the crystallite size in the particles increases. Spheroidal particles are advantageous because they typically have increased dispersibility and flowability in paste formulations relative to jagged or irregular particles.

Although in some instances the powders may be made as very porous or hollow particles, the powders are usually characterized as being very dense, with the particles typically having a density of at least about 80%, preferably at least about 90% and more preferably at least about 95%, of a theoretical density. The theoretical density is that density that particles would have assuming that the particles included zero porosity. As used herein, the density of a particle is as measured by helium pycnometry. High particle density is particularly advantageous for thick film applications involving a fired film, because higher density particles tend to exhibit reduced shrinkage during sintering than highly porous particles.

The powders are further characterized as typically having a high degree of purity, with generally no more than about 0.1 atomic percent impurities and preferably no more than about 0.01 atomic percent impurities. One significant characteristic of the powders of the present invention is that they may be made to be substantially free of organic materials, if desired, and particularly to be substantially free of surfactants. This is a significant advantage over particles made by a liquid route, which typically include residual surfactants. These residual surfactants can significantly impair the utility of the particles, especially in making thick film pastes.

Efficient manufacture of particulate product through the aerosol manufacture method of the present invention requires control of a number of flow streams and heat input. FIG. 31 shows a schematic of an aerosol manufacture facility of the present invention showing major components.

The aerosol manufacture facility, as shown in FIG. 31, includes an aerosol generator 600, an aerosol heater 602 in fluid communication with the aerosol generator 600, an aerosol cooler 604 in fluid communication with the aerosol heater 602, and a particle collector 606 in fluid communication with the aerosol cooler 604. The aerosol manufacture facility also includes a precursor liquid supply system 608, a carrier gas supply system 610 and a cooling gas supply system 612.

During operation of the aerosol manufacture facility to produce a particulate product, precursor liquid is circulated to the aerosol generator 600 from the precursor liquid supply system 608. Circulation of the precursor liquid includes supplying a precursor liquid feed 620 from the precursor liquid supply system 608 to the aerosol generator 600 and removing a precursor liquid effluent 622 from the aerosol generator 600 and returning the precursor liquid effluent 622 to the precursor liquid supply system 608, for recirculation to the aerosol generator 600 as part of the precursor liquid feed 620. Carrier gas 624 is supplied to the aerosol generator 600 from the carrier gas supply system 610. In the aerosol generator 600, there is a reservoir of the precursor liquid overlying ultrasonic transducers, as previously described with reference to FIGS. 2–21. When the ultrasonic transducers in the aerosol generator are activated, droplets of the precursor liquid are formed. These droplets combine with and are carried away by the carrier gas 624 in the form of an aerosol stream which exits the aerosol generator 600 and passes through a conduit 614 to the aerosol heater 602, where particles are formed in the aerosol stream. Formation of the particles involves heating the aerosol stream to vaporize the liquid vehicle from the droplets. The aerosol stream, now including particles as a disperse phase, exits the aerosol heater 602 through a conduit 616 and passes to the aerosol cooler 604. In the aerosol cooler 604, the aerosol stream is mixed with a cooling gas 624 supplied to the aerosol cooler 604 from the cooling gas supply system 612, to lower the temperature of the aerosol stream to cool the particles. The aerosol stream exits the aerosol cooler 604 through the conduit 618 and passes to the particle collector 606. In the particle collector 606, the particles are removed from the aerosol stream. The aerosol generator 600, aerosol heater 602, aerosol cooler 604 and particle collector 606 may comprise any suitable equipment, such as has been previously described. In that regard, the aerosol generator 600 is typically an ultrasonic aerosol generator of a design as previously described; the aerosol heater 602 is typically a furnace, such as tube furnace; the aerosol cooler is typically a quench-style cooler, such as previously described; and the particle collector typically comprises a filter, a cyclone separator or an electrostatic precipitator.

Figure 31:
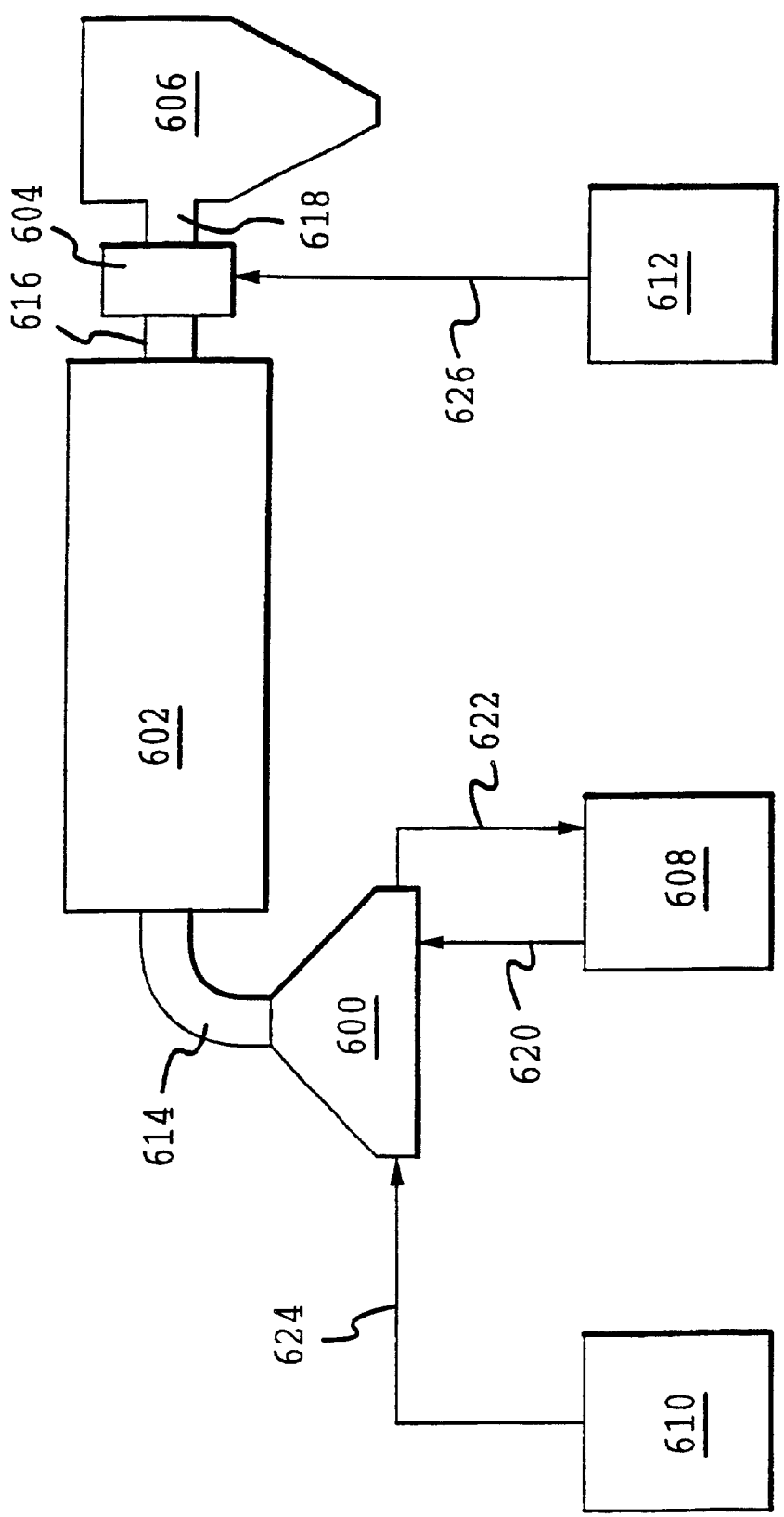
Figure 32:
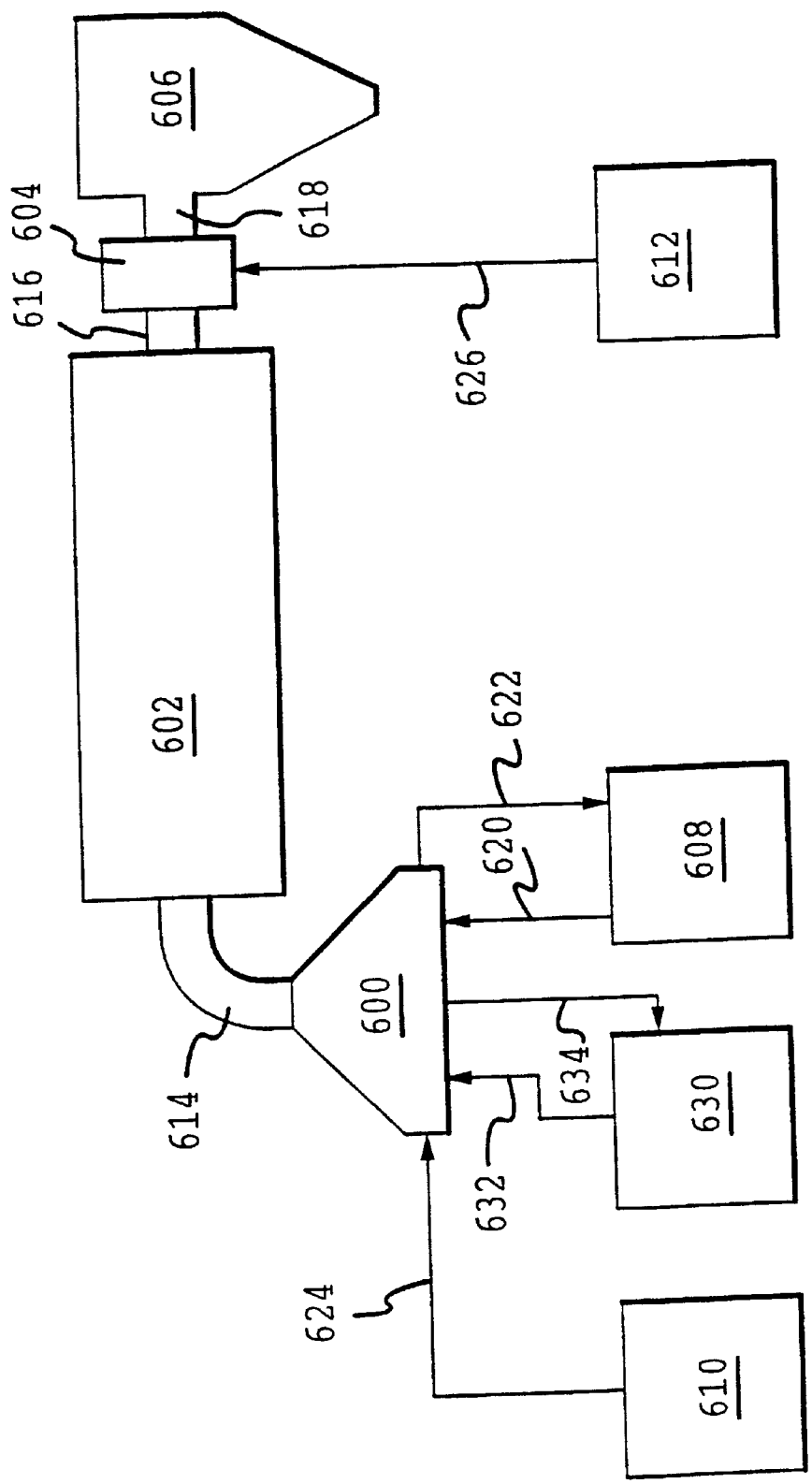

As can be seen in FIG. 31, a number of process flows must be coordinated to efficiently produce particles in the aerosol manufacture facility. Many variations to the aerosol manufacture facility are possible, several of which could involve even more complex operations than that shown in FIG. 31. For example, FIG. 32 is a schematic showing another embodiment of the aerosol manufacture facility. As shown in FIG. 32, the aerosol manufacture facility includes, in addition to the features shown in FIG. 31, a cooling liquid supply system 630. Operation of the aerosol manufacture facility to make particles involves a cooling liquid feed 632, typically water, supplied to the aerosol generator 600 from the cooling liquid supply system 630. A cooling liquid effluent 634 is returned from the aerosol generator 600 to the cooling liquid supply system 630. The cooling liquid supply system 630 would be used, for example, when the aerosol generator 600 is of a design incorporating cooling of the ultrasonic transducers during operation, as previously discussed with respect to aerosol generator designs. Also, or alternatively, the cooling liquid supply system 630 could be used to cool driver circuitry that drives the ultrasonic transducers to prevent circuit overheating.

Manufacture of particles in the aerosol manufacture facility may occur in a batch mode or a continuous mode of operation. In most instances, however, the aerosol manufacture facility will be operated in a batch mode. As used herein, unless otherwise noted, operating in a batch mode refers to processing of a batch of precursor liquid to produce particles, and includes processing that could be considered as being technically semi-batch or semi-continuous in nature. A batch of precursor liquid refers to a discrete volume of precursor liquid to be processed. The particles produced from processing of a batch of precursor liquid are generally referred to as a batch of particles or a powder batch, even though the particles may be removed from the system periodically at different times during processing of the precursor liquid batch. When operated in a batch mode, the aerosol manufacture facility may be designed with appropriately sized equipment to accommodate any desired precursor liquid batch size. In some instances, when processing large precursor liquid batches, processing of the precursor liquid batch in batch mode may require a batch run time of a week or more.

Figure 33:
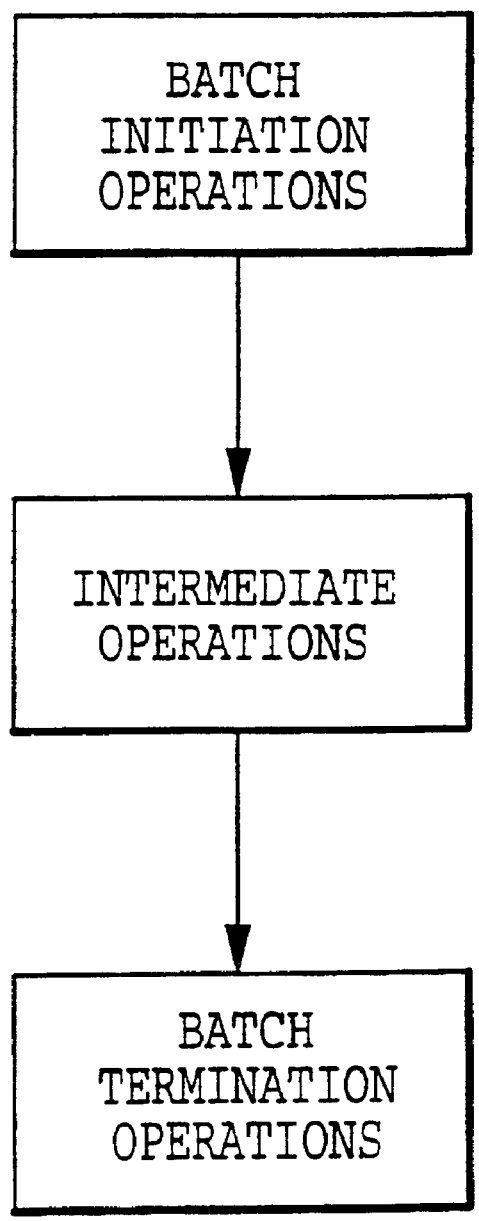

Referring now to FIG. 33, a flow diagram is shown for processing a batch of precursor liquid in the aerosol manufacture facility operated in batch mode. As seen in FIG. 33, the processing of a batch proceeds through three stages of operation, namely batch initiation operations, intermediate operations, and batch termination operations. In a first stage, the batch initiation operations involve preliminary operations to prepare the system for generation of and processing of the aerosol stream. The batch initiation operations, generally include initiating flows, such as of carrier gas, precursor liquid and cooling gas, and conditioning equipment, such as the furnace, the aerosol generator, the aerosol cooler and the particle collector, all prior to commencing generation of the aerosol stream in the aerosol generator. Typically, the final step in the batch initiation operations is to commence generation of the aerosol stream. This is usually accomplished by activating the ultrasonic transducers once initial preparations are complete.

In a second stage, the intermediate operations involve manufacture of particles after the commencement of generation of the aerosol stream. Referring briefly to FIG. 31, the intermediate operations generally include generating the aerosol stream in the aerosol generator 600, and then flowing the aerosol stream to the aerosol heater 602, where the aerosol stream is heated and the particles are formed. The aerosol stream, containing the particles, then passes to the aerosol cooler 604, where the cooling gas 624 is mixed with the aerosol stream to reduce the temperature of the aerosol stream. The aerosol stream then passes to the particle collector 606 where the particles are removed from the aerosol stream. The intermediate operations may last for a week, or more, for large precursor liquid batches and typically include particle manufacture in a steady state or quasi-steady state operation. In this respect, the intermediate operations are analogous to operating in a continuous mode, and the discussions herein relating to the intermediate operations apply equally to operation of the aerosol manufacture facility in a continuous mode of operation. Furthermore, although the intermediate operations typically involve steady state or quasi-steady state processing, the steady state or quasi-steady state condition may be periodically interrupted to permit routine maintenance, to permit removal of accumulated particles from the particle collector 606 or for other reasons. Such interruptions preferably occur no more frequently than about once per day, and preferably for no longer than a few hours for each occurrence.

Referring again to FIG. 33, in a third stage of batch processing, the batch termination operations generally involve terminating particle manufacture and shutting down process flows and equipment. For example, the batch termination operations typically include deactivating the ultrasonic transducers to cease generation of the aerosol stream, purging remaining aerosol from the system, and terminating the flows of carrier gas, precursor liquid and cooling gas.

As noted, the intermediate operations are generally analogous to operations in a continuous mode. Likewise, the batch initiation operations are analogous to start-up operations that may precede continuous mode operation. Also, the batch termination operations are analogous to a periodic shut-down that may be required even when the aerosol manufacture facility is operated in a continuous mode. Therefore, the discussions herein, although focused primarily on batch mode of operation, apply equally to a continuous mode of operation.

Efficient control of the batch initiation operations, the intermediate operations, the batch termination operations, and transitions between these stages is an important aspect of the present invention for efficient operation of the aerosol manufacture facility.

One major aspect of the present invention is control of the concentration of the precursor material in the precursor liquid being processed in a batch, especially during the intermediate operations. This is important because, over time, the circulating precursor liquid has a tendency to become more concentrated in the precursor material. Referring to FIGS. 31 and 33, during the intermediate operations, the precursor liquid feed 620 is divided, in the aerosol generator, into at least two portions. A first portion exits the aerosol generator in the droplets of the aerosol stream. A second portion exits the aerosol as the precursor liquid effluent 622 that is returned to the precursor liquid supply system for recirculation.

Figure 34:
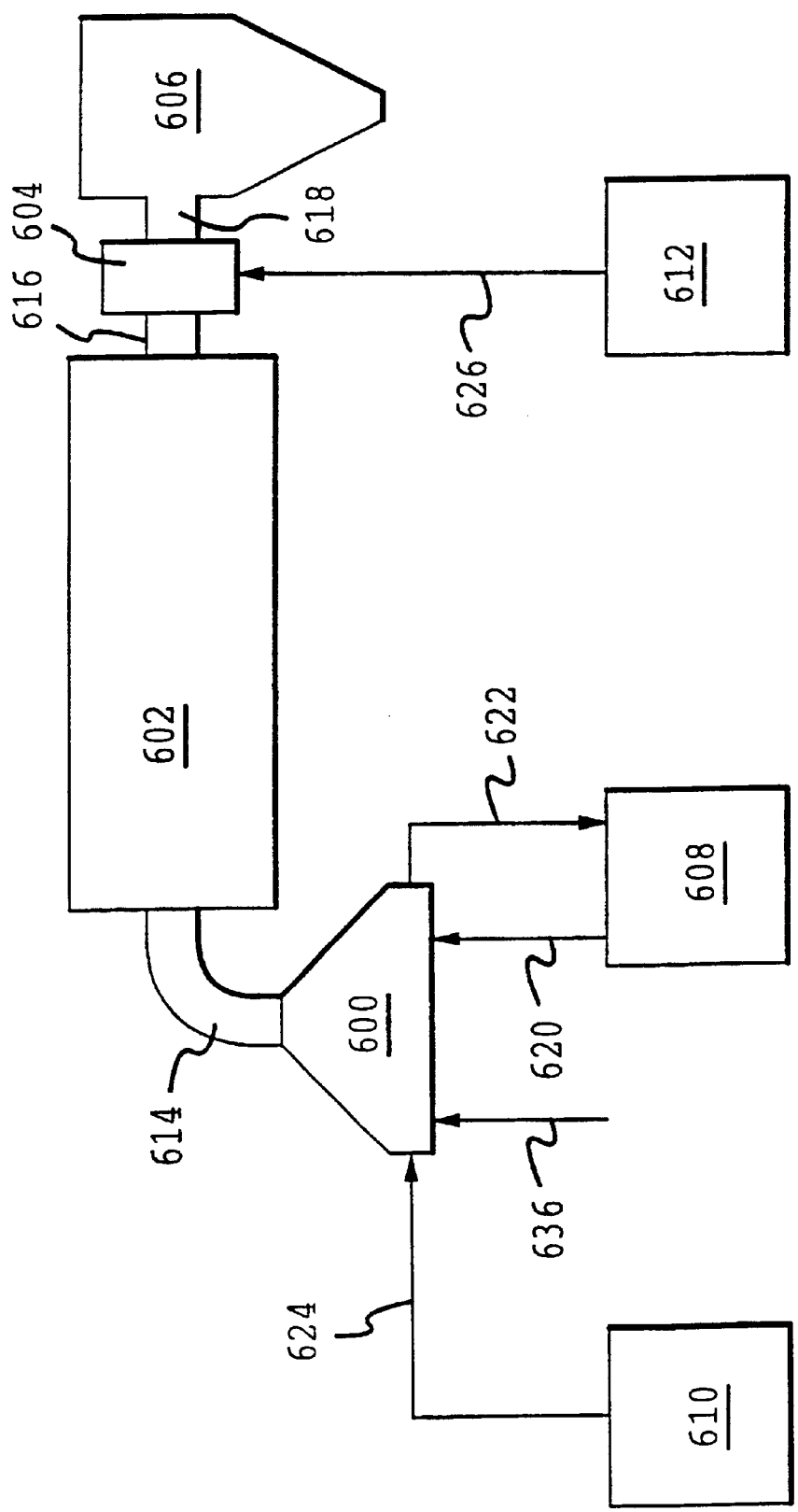
Figure 35:
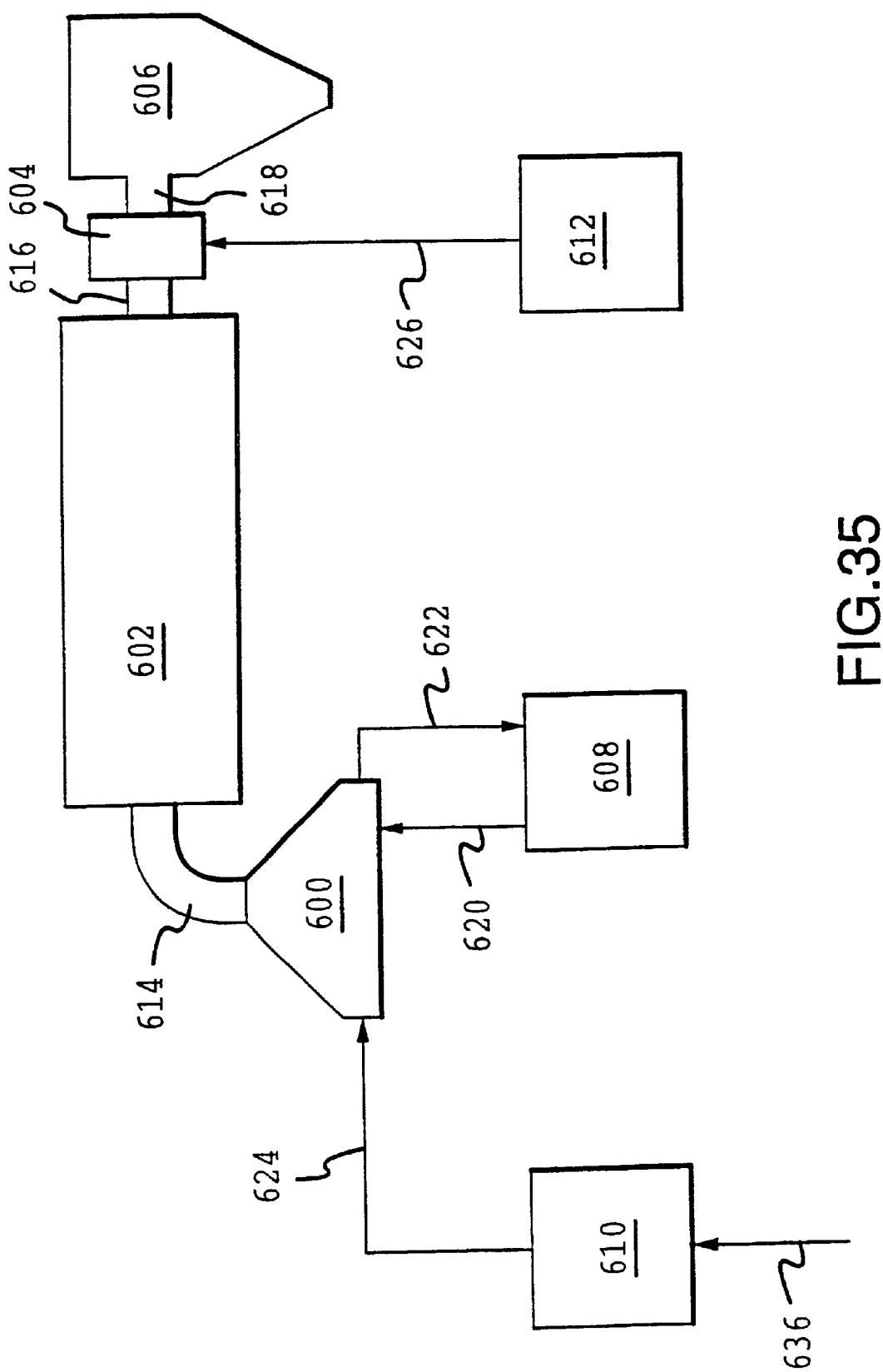
Figure 36:
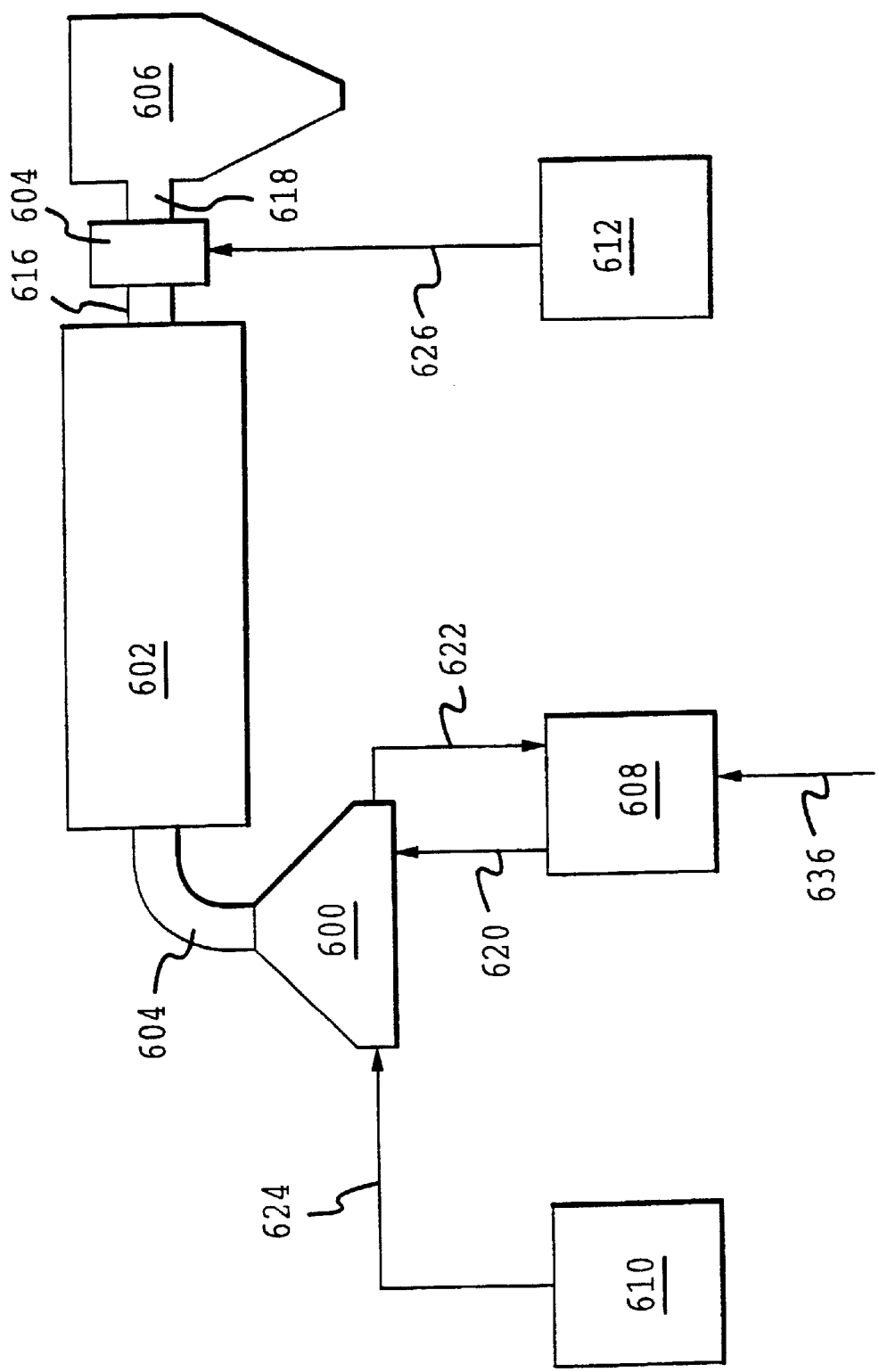

The problem with concentration of the precursor material over time results primarily from vaporization, in the aerosol generator 600, of some of the liquid vehicle from the precursor liquid circulating through the aerosol generator 600. The tendency of the circulating precursor liquid to become more concentrated in the precursor material can be a serious problem when it is desired to make a uniform batch of particles, as is usually the case. This significant problem is addressed with the present invention through the addition of additional liquid vehicle to the aerosol manufacture facility during generation of the aerosol stream to at least partially offset the tendency of the precursor liquid to otherwise become more concentrated in the precursor material. The additional liquid vehicle may be added at any convenient location within the aerosol manufacture facility to effect the desired concentration. Preferred locations for adding the additional liquid vehicle include the aerosol generator 600, the carrier gas supply system 610, and the precursor liquid supply system 608. FIG. 34 shows a schematic of one embodiment of the aerosol manufacture facility including the addition of additional liquid vehicle 636 directly to the aerosol generator 600. FIG. 35 shows one embodiment of the aerosol manufacture facility including the addition of the additional liquid vehicle 636 to the carrier gas supply system 610. FIG. 36 shows one embodiment of the aerosol manufacture facility including addition of the additional liquid vehicle 636 to the precursor liquid supply system 608. With the present invention, the concentration of the precursor material in the precursor liquid feed 620 typically varies by no more than about 20 percent relative to the maximum concentration experienced in the precursor liquid feed, and preferably varies by no more than about 10 percent and more preferably by no more than about 5 percent.

In addition to becoming more concentrated in the precursor material, it is possible also that the precursor liquid may become concentrated in or depleted in some other component, for which appropriate process adjustments may be made. For example, when making some materials, the precursor liquid comprises an acidic aqueous nitrate solution. In that situation, significant nitric acid can be lost to volatilization in the aerosol generator and the precursor liquid will, therefore, become depleted in nitric acid over time. Additional nitric acid may, however, be added, to at least partially offset the depletion. The additional nitric acid could be added together with the additional liquid vehicle 636, as an aqueous solution of nitric acid, or could be added separately.

Another significant aspect of the present invention concerning efficient control and operation of batch processing in the aerosol manufacture facility is that the processing may, at least in part, be automated, with automated control of at least a portion of one of the batch initiation operations, the intermediate operations and the batch termination operations. In preferred process embodiments, all three of the stages of batch processing are significantly automated. In one preferred automated mode of operation, an operator directs an electronic processor to process a batch of precursor liquid to prepare a batch of particles of a selected composition. The processor then processes instructions concerning manufacture of particles of the selected composition and automatically directs the aerosol manufacture facility to manufacture a batch of particles of the selected composition.

Figure 37:
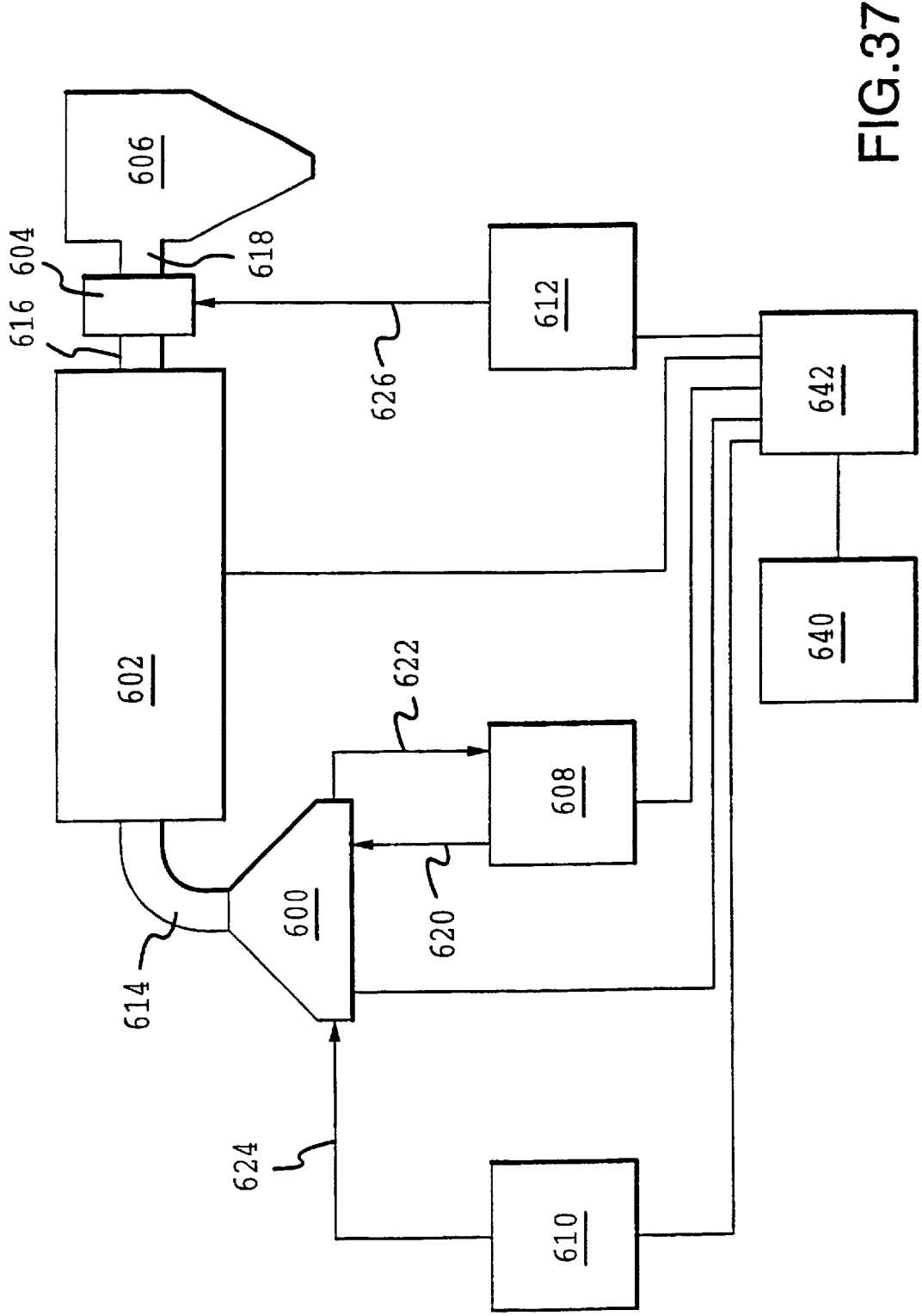

Referring now to FIG. 37, a schematic of one embodiment of the aerosol manufacture facility is shown in which an electronic processor is used to direct control of batch processing of the aerosol manufacture facility. As shown in FIG. 37, an electronic processor 640 communicates with an electronic controller 642, which communicates with the precursor liquid supply system 608, the carrier gas supply system 610, the cooling gas supply system 612, the aerosol heater 602 and the aerosol generator 600. During operation, the electronic processor 640 communicates directions to the controller 642, which transmits control signals to effectuate automatic actuation of actuatable equipment, such as actuatable flow control valves, pumps, heating elements, etc. The electronic processor 640 also monitors selected conditions, via the controller 642, in the aerosol manufacture facility. Monitored conditions may include conditions such as properties of the precursor liquid, temperatures, pressures, flow rates, liquid levels, etc. Based at least on one of these monitored conditions, the electronic processor 640 reevaluates control requirements and directs a change of controlled parameters, as required.

It will be appreciated that the electronic processor 640 is ultimately responsible for directing the process control, even though the actual control signals to effectuate the control come from the controller 642. The controller 642 merely facilitates communication between the electronic processor 640 and actuatable equipment through which process control is effectuated. For example, the controller 642 is capable of converting analog signals received from process equipment into digital signals to send to the electronic processor 640 for processing. Also, the controller 642 is capable of converting digital signals received from the electronic processor to analog control signals to send to actuatable equipment. The controller 642 is also capable of relaying a signal without conversion. The controller 642 may comprise a single unit or may comprise a plurality of components that are coordinated to facilitate communication between the electronic processor 640 and different portions of the aerosol manufacture facility. Moreover, the actuatable equipment may be actuated electronically or pneumatically. As will be appreciated, the use of pneumatically actuated equipment may require transducers to convert electronic signals from the controller 642 into pneumatic signals to actuate the equipment.

The electronic processor 640 may be any suitable processor, such as a microprocessor or a computer. Typically, the electronic processor will be a programmable logic control microprocessor. Also, the electronic processor 640 includes, or is connected to, memory including instructions for manufacture of particles of the desired composition, which instructions are processable by the electronic processor 640. Furthermore, the memory may include instructions for manufacture of particles of a number of different compositions. An operator could then instruct the electronic processor 640 as to which composition is desired, and the electronic processor 640 could select and process the appropriate set of instructions for the desired composition. In this way, the aerosol manufacture facility could be used to manufacture batches of particles of different compositions, although thorough cleaning of process equipment would be required between batches of different compositions.

Also, although FIG. 37 shows automated process control involving all of the aerosol heater 602, the precursor liquid supply system 608, the carrier gas supply system 610, the cooling gas supply system 612 and the aerosol generator 600, it is not necessary, within the scope of the present invention, that all of those portions of the aerosol manufacture facility be automatically controlled, or that any particular operations be controlled, but rather only that some operation associated with at least one of the aerosol heater 602, the precursor liquid supply system 608, the carrier gas supply system 610, the cooling gas supply system 612 and the aerosol generator 600 be automatically controlled. Preferably, however, at least one operation in each of the aerosol heater 602, the precursor liquid supply system 608, the carrier gas supply system 610, the cooling gas supply system 612 and the aerosol generator 600 is automatically controlled at the direction of the electronic processor 640.

When operation of the aerosol generator 600 is automated, automatic control in the aerosol generator 600 typically includes automatically activating, at the direction of the electronic processor 640, the ultrasonic transducers in the aerosol generator 600 during batch initiation operations and automatically deactivating, at the direction of the electronic processor 640, the ultrasonic transducers during batch termination operations. The timing for activation and deactivation of the ultrasonic transducers in relation to other operations is very important, as discussed more fully below.

As noted previously, control of the concentration of the precursor material in the precursor liquid through the addition of additional liquid vehicle is an important aspect of the present invention. In a preferred embodiment, the concentration control is automated. This automation may be accomplished, for example, through monitoring, by the electronic processor 640, the concentration of the precursor material in the precursor liquid supply system 608, or monitoring of one or more properties of the precursor liquid which are indicative of concentration or from which concentration may be calculated.

FIG. 38 shows one embodiment of the precursor liquid supply system 608 including automated control of the concentration of the precursor material in the precursor liquid, as well as automated control of other process parameters. As shown in FIG. 38, the precursor liquid supply system 608 includes two liquid containment vessels, a first vessel 650 and a second vessel 652. During the intermediate operations of batch processing, both the first vessel 650 and the second vessel 652 contain at least some of the precursor liquid. The first vessel 650 acts as a primary supply source for the precursor liquid and the second vessel acts as a control vessel from which precursor liquid is withdrawn for the precursor liquid feed 620 supplied to the aerosol generator, and to which the additional liquid vehicle 636 is added for control of concentration of precursor material in the precursor liquid. The second vessel 652, therefore, typically has a much smaller liquid containment capacity than the first vessel 650. Typically, the second vessel 652 has a capacity of no larger than about 50% of the capacity of the first vessel. The capacity of the second vessel may, however, be considerably smaller, such as less than 10% of the capacity of the first vessel. For example, the first vessel may have a capacity of about 250 gallons (about 946 liters) and the second vessel a capacity of about 15 gallons (about 57 liters).

During the intermediate operations, with reference to FIGS. 37 and 38, precursor liquid is withdrawn from the first vessel 650 by a pump 654, with a portion of the precursor liquid exiting the pump 654 being transferred to the second vessel 652 through a flow control valve 656 and a check valve 658. Another portion of the precursor liquid exiting the pump 654 is recirculated back to the first vessel 650 in a recirculation stream 660. The recirculation stream 660 helps to keep the precursor liquid in the first vessel 650 thoroughly mixed and to avoid the development of concentration gradients within the first vessel 650. This is particularly important when the precursor liquid includes precursor material in the form of suspended particles, as described previously. Mixing in the first vessel may be aided by operation of a mixer 662 to drive an impeller 664 located within the first vessel 650. The flow control valve 656 is used to control the transfer of precursor liquid from the first vessel to the second vessel, as discussed below. The check valve 658 prevents inadvertent back flow toward the first vessel 650, and permits the first vessel 650 to be maintained in a substantially unpressurized state while the second vessel 652 is pressurized. Maintaining the first vessel 650 in an unpressurized state significantly simplifies operations involving the first vessel 650.

Also, during the intermediate operations, precursor liquid is withdrawn from the second vessel 652 by a pump 665 for supply to the aerosol generator 600 as the precursor liquid feed 620, after passing through a flow control valve 660 and a flow element 668. The precursor liquid effluent 622 from the aerosol generator is returned to the second vessel 652. A side stream 670 is withdrawn from the bottom portion of the second vessel 652 by a pump 672. The side stream 670 passes through a monitor element 674 and is recirculated to the top portion of the second vessel 652. The recirculation of the side stream 670 helps to keep the precursor liquid in the second vessel 652 well mixed and to avoid the development of concentration gradients within the second vessel 652. The additional liquid vehicle 636 passes through a flow control valve 676 and a flow element 678 prior to entering the second vessel 652.

The precursor liquid effluent 622 typically involves significant flow. This is because, typically, only a small portion of the precursor liquid feed 620 is converted to droplets in the aerosol stream during a single pass through the aerosol generator 600. The recycle ratio for the precursor liquid fed to the aerosol generator, is typically larger than about four to one, more typically larger than about six to one, even more typically larger than about eight to one and still more typically larger than about ten to one. The recycle ratio is the volumetric ratio of recycled precursor liquid to fresh precursor liquid in the precursor liquid feed 620 (i.e., ratio of rate of flow of precursor liquid effluent 622 to rate of transfer of fresh precursor liquid from the first vessel 650 to the second vessel 652 ). The portion of the precursor liquid feed 620 that exits the aerosol generator 600 in the aerosol stream is typically less than about twenty volume percent of the precursor liquid feed 620, and more typically less than about fifteen volume percent, even more typically less than about ten volume percent, and still more typically less than about five volume percent of the precursor liquid feed 620. The portion of the precursor liquid feed 620 exiting the aerosol generator 600 as the precursor liquid effluent 622 is typically larger than about eighty volume percent of the precursor liquid feed 620, more typically larger than about eighty-five volume percent, even more typically larger than about ninety volume percent and still more typically larger than about ninety-five volume percent of the precursor liquid feed 620.

FIG. 38 shows major elements for automated process control within the precursor liquid supply system 608. As will be appreciated, however, additional automated process control features could also be included without departing from the scope of the present invention. Furthermore, the present invention does not require the inclusion of all of the automated process control features shown in FIG. 38.

Figure 38:
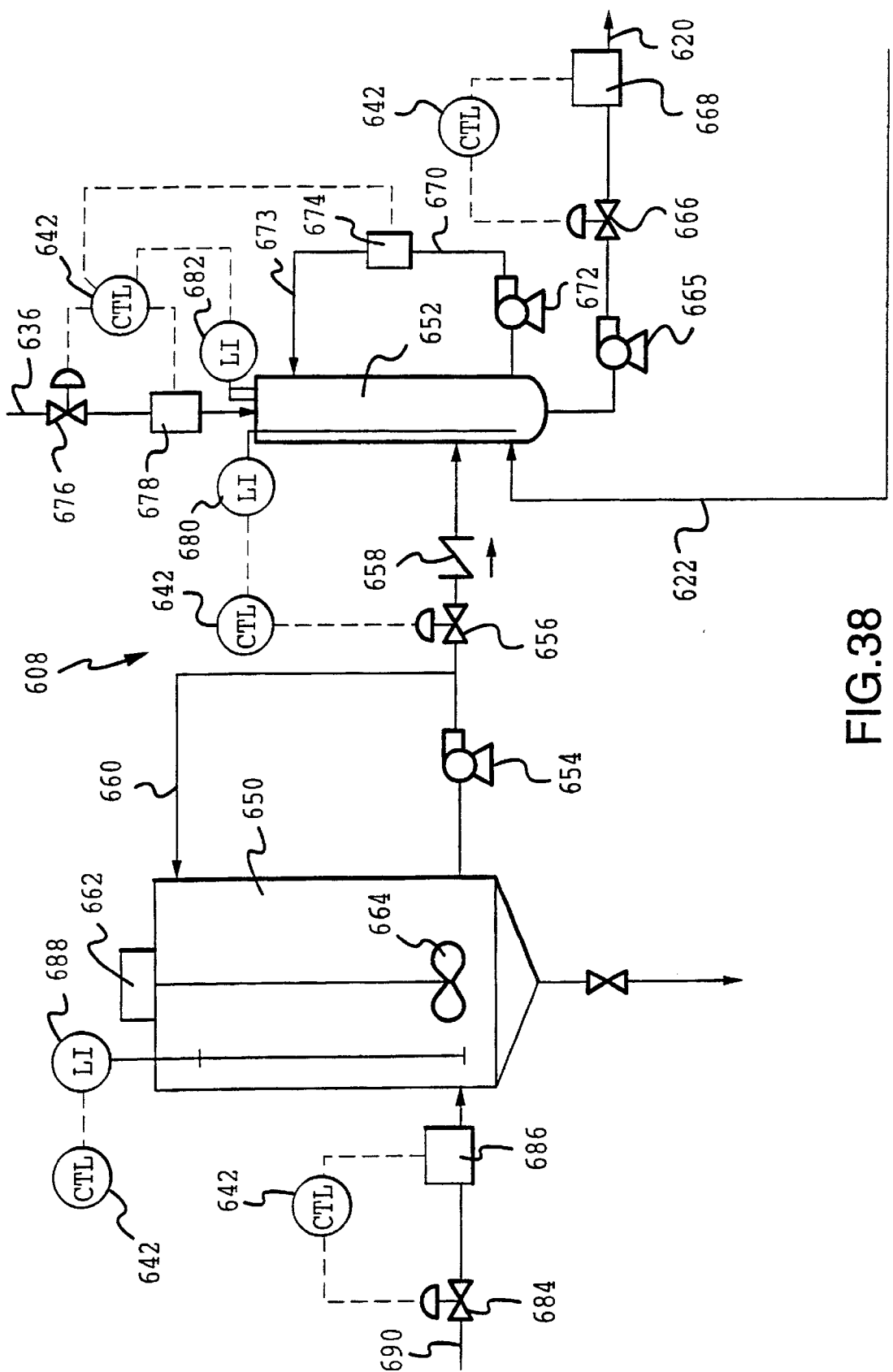
Figure 39:
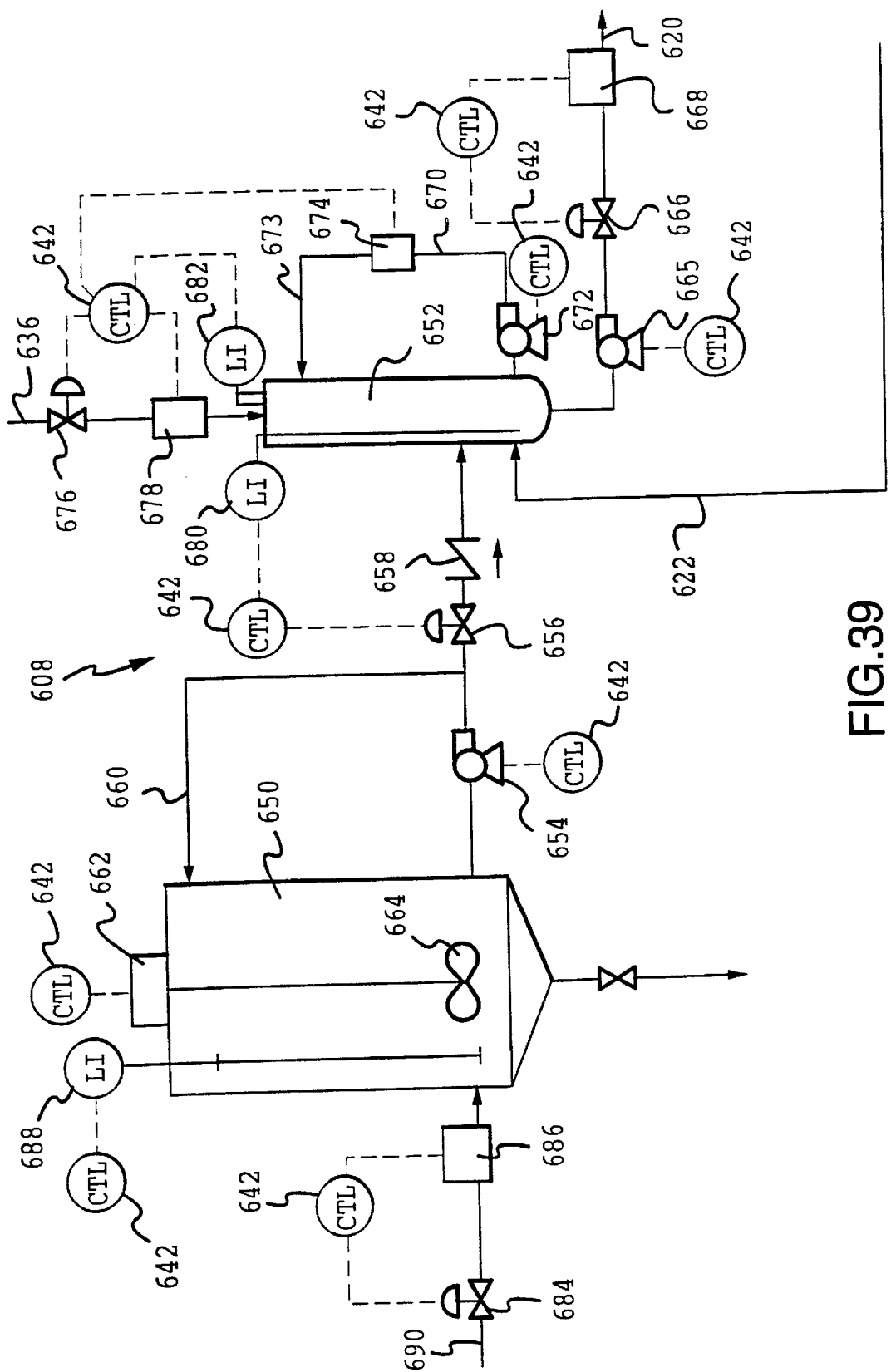
Figure 40:
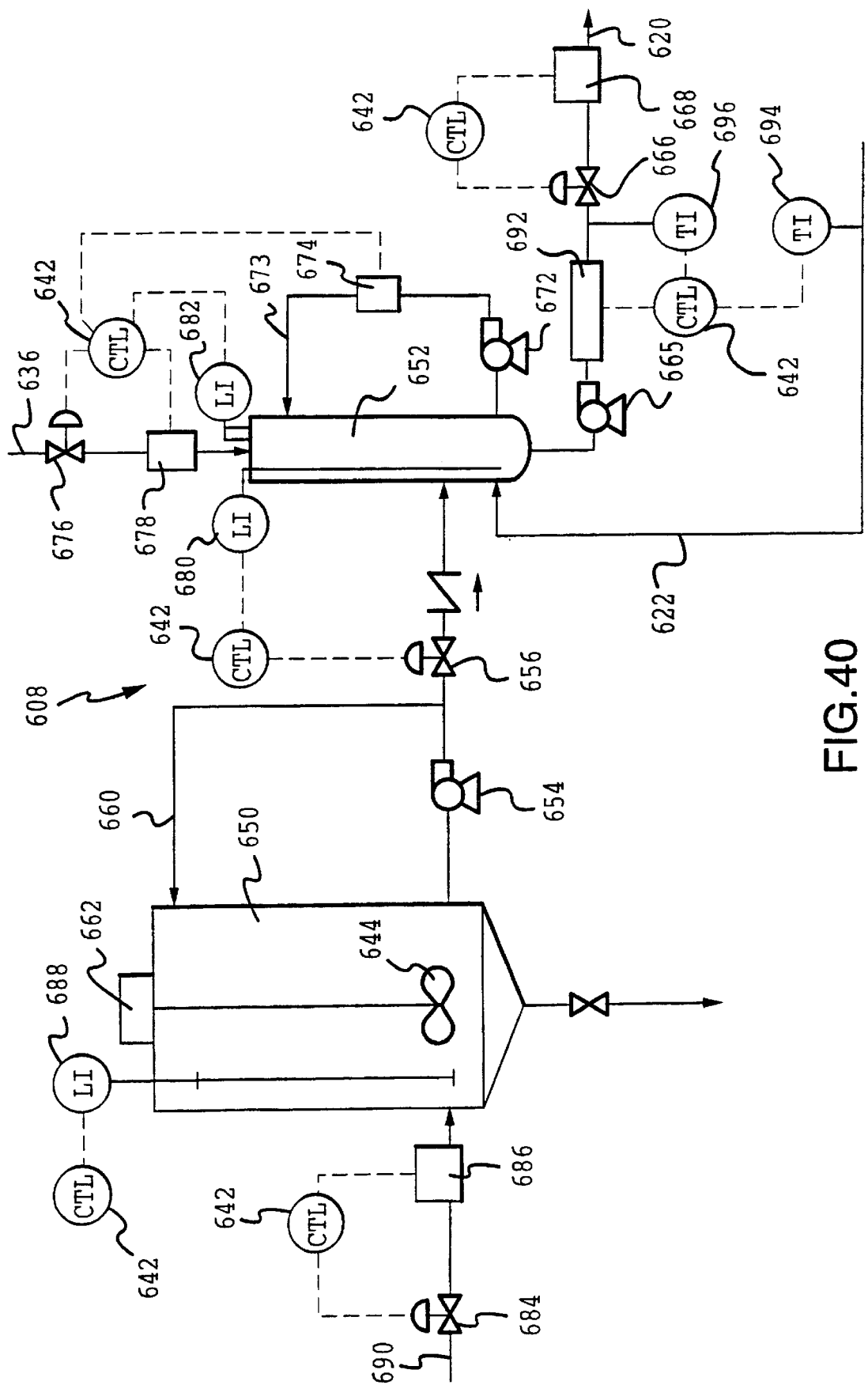
Figure 41:
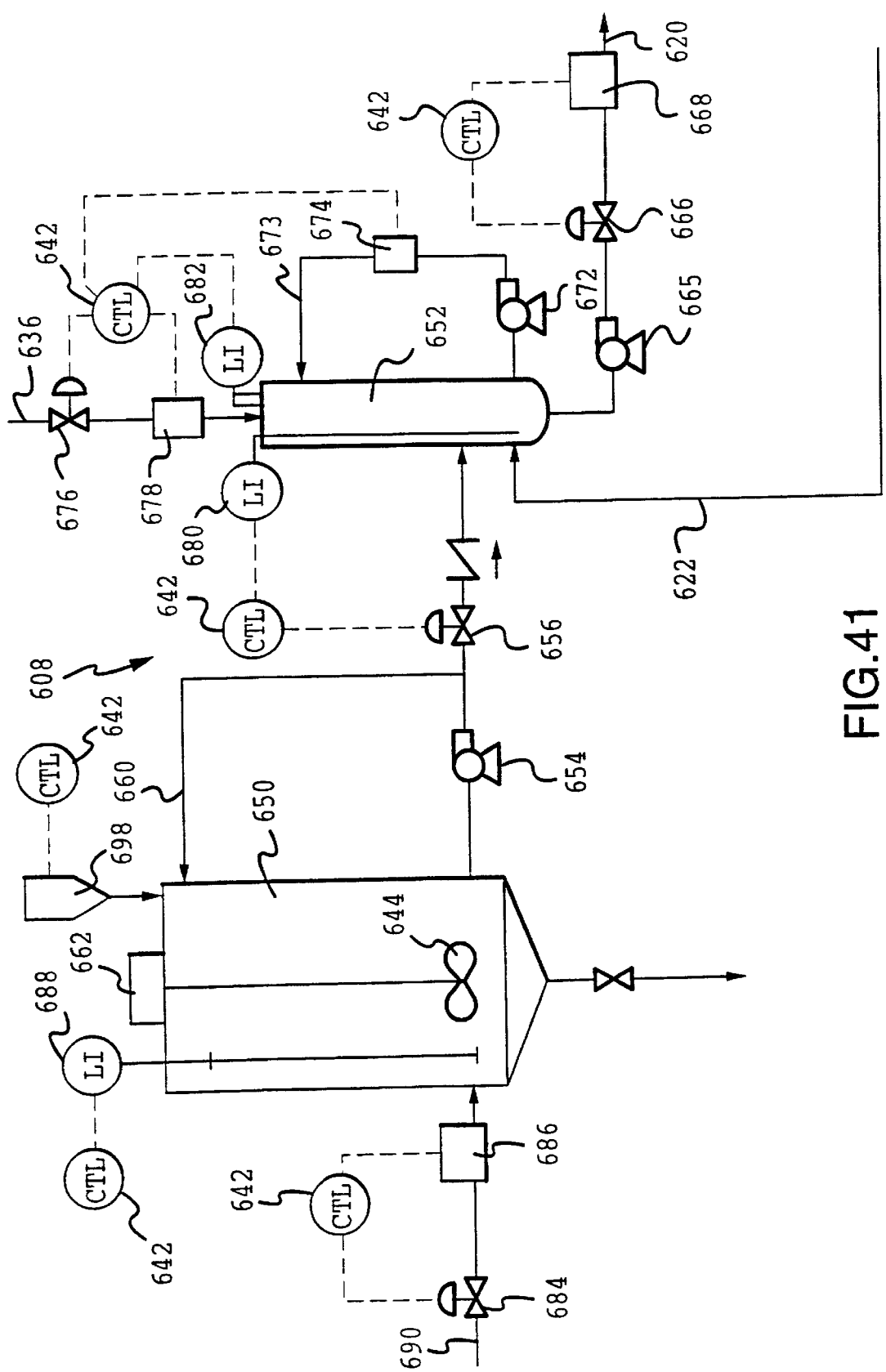

As shown in FIG. 38, automated process control involves flow control valves 656, 665, 676, and 684, level indicators 680, 682 and 688, the monitor element 674, and the flow elements 668, 678, and 686. Different combinations of the process control equipment are used to control the batch initiation operations, intermediate operations and batch termination operations, respectively. Communication between the process control equipment and the electronic processor 640 (as shown in FIG. 37), which directs the automated control, is via the controller 642. It will be appreciated that the controller 642 is shown in several places in FIG. 38, even though the controller 642 may constitute a single unit.

One of the important control features shown in FIG. 38 is automatic control of addition of the additional liquid vehicle 636 to the second vessel 652 to control the concentration of precursor material in the precursor liquid in the second vessel 652, and especially during the intermediate operations.

Automated process control during intermediate operations of batch processing will now be described, with reference to FIGS. 37 and 38. The flow control valve 656 is automatically actuated at the direction of the electronic processor 640 to control flow of precursor liquid from the first vessel 650 to the second vessel 652. The electronic processor 640, via the controller 642, monitors the level of precursor liquid in the second vessel 652 based on a signal from the level indicator 680. The electronic processor 640 then responsively directs automatic actuation of the flow control valve 656. The flow control valve 656 may be operated in an open/close mode to either permit or not permit transfer of precursor liquid, or may be operated in a proportional mode to increase or decrease the flow rate of precursor liquid through the flow control valve 656 into second vessel 652. When operated in an open/close mode, the flow control valve 656 is opened when the level in the second vessel 652 drops below a predetermined level, and the flow control valve 656 is closed when the level rises above a predetermined level, so that the level in the second vessel is permitted to oscillate between the predetermined high and low levels. Maintaining the level of the precursor liquid in the second vessel 652 within a relatively narrow predetermined range is important to efficient control of the concentration of precursor material in the precursor liquid, because the concentration control is easier to accomplish if the level in the second vessel 652 is relatively constant. For example, the difference between the predetermined high and low levels may be only a few centimeters, or less.

The flow rate of the precursor liquid feed 620 is controlled by automatic actuation of the flow control valve 666. The electronic processor 640 monitors flow rate, via the flow element 668, and responsively directs flow control of the flow control valve 666 to maintain the flow rate to the aerosol generator 600 within a desired range.

In one embodiment, not shown in FIG. 38, the flow rate of the precursor liquid feed 620 may be automatically controlled to maintain a desired height of precursor liquid in the reservoir of precursor liquid overlying ultrasonic transducers in the aerosol generator 600. The flow control valve 620 could be automatically actuated at the direction of the electronic processor 640 to increase or decrease the flow to the aerosol generator 600 and, therefore, also increase or decrease the height of the precursor liquid in the aerosol generator 600. The control could include automatic monitoring of the liquid level in the aerosol generator 600 by the electronic processor 640, via a level indicator in the aerosol generator 600.

Referring again to FIGS. 37 and 38, the concentration of precursor material in the precursor liquid contained in the second vessel 652 is controlled by the addition of the additional liquid vehicle 636 to offset a tendency of the circulated precursor liquid to otherwise concentrate over time. Addition of the additional liquid vehicle 636 is controlled by automatic actuation of the flow control valve 676 at the direction of the electronic processor 640. The electronic processor 640 monitors one or more properties of the precursor liquid in the second vessel 652 via the monitor element 674. The electronic processor 640 also monitors the level of the precursor liquid within the second vessel via the level indicator 682 and the flow of the additional liquid vehicle 636 via the flow element 678. Based on the monitored conditions, the electronic processor 640 directs automatic actuation of the flow control valve 676, as necessary, to add a proper quantity of the additional liquid vehicle 636 to the second vessel 652. For example, the monitor element 674 may measure the specific gravity, or density, and the temperature of the precursor liquid contained in the second vessel 652. The specific gravity, or density, measurement may be accomplished with any suitable density meter, such as a MicroMotion™ coriolis sensor. With the monitored information, in combination with information from the level indicator 682, the electronic processor 640 can calculate a concentration for the precursor material in the precursor liquid contained within the second vessel 652 and can then calculate a quantity of the additional liquid vehicle 636 to add to maintain the concentration within a desired range. The flow element 678 then keeps the electronic processor 640 informed as to the actual quantity of the additional liquid vehicle 636 that has been added. The flow control valve 676 may be operated as an open/close mode to periodically admit the additional liquid vehicle 636 as required, or may be operated in a proportional mode to continuously vary the flow rate of the additional liquid vehicle 636. Also, it should be appreciated that the monitor element 674 could be located at locations other than that shown in FIG. 38. For example, the monitor element could be located downstream of the pump 665 to monitor properties of the precursor liquid in the precursor liquid feed 620. Also, the monitor element 774 could be combined with the flow element 668 into a single element.

Automated process control during batch initiation operations will now be described, with continued reference to FIGS. 37 and 38. Prior to commencement of batch initiation operations, the first vessel 650 will typically be substantially empty. Batch initiation operations will typically commence with an operator inputting instructions to the electronic processor 640 that a batch is to be prepared of particles of a selected material. Flow control valve 684 is initially closed and is automatically actuated to an open position at the direction of the electronic processor 640 to permit make-up liquid vehicle 690 to enter the tank. The make-up liquid vehicle is often deionized water. The electronic processor 640 monitors the flow of the make-up liquid vehicle 690 into the first vessel 650 and directs the flow control valve 684 to a closed position to discontinue flow into the first vessel 650 when a predetermined quantity of the make-up liquid vehicle 690 has been added to the first vessel 650. The operator adds a predetermined quantity of precursor material to the first vessel 650. The precursor material may include only a single material, such as a soluble salt or dispersible particles, or may comprise multiple materials, as described previously. The addition of the precursor material may occur after all of the make-up liquid vehicle 690 has been added to the first vessel 650 or before all of the make-up liquid vehicle 690 has been added. The mixer 662 is activated to turn the impeller 644 to thoroughly mix liquid vehicle and precursor material in the first vessel 650. Also, the pump 654 is turned on and flow is established through the recirculation stream 660 to further aid mixing. The flow control valve 656 is initially in a closed position to prevent flow into the second vessel 652. After mixing in the first vessel 650 has proceeded for a time sufficient to adequately mix the liquid vehicle and precursor material to form the desired precursor liquid, then the flow control valve 656 is automatically actuated to an open position at the direction of the electronic processor 640 to permit the flow of precursor liquid into the second vessel 652, which is, preferably, initially substantially empty.

After there is an adequate quantity of precursor liquid in the second vessel 652, circulation of precursor liquid is established through the aerosol generator 600, with the ultrasonic transducers being deactivated so that no aerosol is being generated in the aerosol generator 600. To establish the circulation, the pump 665 is activated to commence the flow of the precursor liquid feed 620 which circulates through the aerosol generator 600 and returns to the second vessel 652 as the precursor liquid effluent 622. Also, the pump 672 is activated to commence recirculation of precursor liquid through the recirculation stream 673. In a preferred embodiment, the pump 654, pump 665, pump 672, and mixer 662 are all automatically actuated at the direction of the electronic processor 640. This embodiment is shown in FIG. 39.

Another embodiment of the precursor liquid supply system 608, including major process components, is shown in FIG. 40. As shown in FIG. 40, a precursor liquid heater 692 is located between the pump 665 and the flow control valve 666. When the precursor liquid heater 692 is activated, the precursor liquid in the precursor liquid feed 620 is heated prior to introduction into the aerosol generator 600. Although the precursor liquid heater 692 could be used to heat the precursor liquid at any desired time, typically the precursor liquid heater is used only during batch initiation operations. When circulation of precursor liquid is being established through the aerosol generator 600 during batch initiation operations, as previously described, the precursor liquid heater 692 is automatically turned on at the direction of the electronic processor 640. The electronic processor 640 monitors, via a temperature indicator 694, the temperature of the precursor liquid effluent 622 and the precursor liquid heater 692 is automatically turned off, at the direction of the electronic processor 640, when the temperature in the precursor liquid effluent 622 reaches a predetermined elevated temperature. In this manner, the precursor liquid circulating through the aerosol generator during the batch initiation operations is at an elevated temperature and, therefore, heats at least a portion of the aerosol generator. This conditions the aerosol generator to simulate operating conditions during intermediate operations when the ultrasonic transducers are activated and are warming the aerosol generator 600 and the precursor liquid in the aerosol generator 600. The electronic processor 640 also monitors, via a temperature indicator 696, the temperature of the precursor liquid in the precursor liquid feed 620. If the temperature becomes excessively high, the electronic processor 640 can direct that the precursor liquid heater 692 be automatically turned off or heat input be reduced.

Referring now to FIG. 41, another embodiment of the precursor liquid supply system 608, including major process control components, is shown. The embodiment shown in FIG. 41 includes a hopper 698 which contains precursor material. During the batch initiation operations, the hopper is automatically controlled at the direction of the electronic processor 640, to deliver a specified quantity of the precursor material to the first vessel 650 during the batch initiation operations. Multiple hoppers could be used for multiple precursor materials, if desired.

Referring once again to FIGS. 37 and 38, automated process control in the precursor liquid supply system during batch termination operations will now be described. During the intermediate operations, precursor liquid is transferred from the first vessel 650 to the second vessel 652 and, accordingly, the level of the precursor liquid in the first vessel 650 drops as the intermediate operations continue. The electronic controller 640 monitors, via the level indicator 688, the precursor liquid level within the first vessel 650. When the liquid level in the first vessel 650 drops below a predetermined level, the electronic processor 640 automatically commences the batch termination operations.

After the batch termination operations are commenced, the pump 654 is automatically shut off at the direction of the electronic processor to terminate transfer of precursor liquid from the first vessel 650 to the second vessel 652. Precursor liquid, however, continues to be withdrawn from the second vessel 652 by the pump 665 to supply the precursor liquid feed 620. Because there is no fresh precursor liquid being introduced into the second vessel 652, however, the tendency of the precursor liquid to become more concentrated in the precursor material over time becomes an even bigger problem. Therefore, during the batch termination operations, the rate of addition of the additional liquid vehicle 636 will typically be accelerated relative to the rate of addition during the intermediate operations. When the level of the precursor liquid in the second vessel 652 drops below a certain level, as monitored by either level indicator 680 or level indicator 682, the electronic processor automatically turns off pump 665 and pump 672 and closes the flow control valve 676, if the flow control valve 676 is not already closed. Alternatively, the pump 665 could be automatically turned off, at the direction of the electronic processor 640 when the electronic processor 640 determines that the concentration of precursor material in the liquid vehicle has reached an undesirably high level.

Although the precursor liquid supply system 608 has been described in FIGS. 38–41 with reference to the use of two vessels, the liquid supply system could be operated with only a single vessel, if desired. If only a single vessel is used, then that vessel would act as primary supply vessel and a control vessel, applying the principles as discussed with respect to FIGS. 38–41. With the present invention, however, it is preferred that the precursor liquid supply system 608 include two vessels, as described with reference to FIGS. 38–41.

FIG. 42 shows a schematic of one embodiment of the carrier gas supply system 610, including major process control components. Referring now to FIGS. 37 and 42, automated control of the carrier gas supply system 610 will be described. With reference to FIGS. 37 and 42, during intermediate operations of batch processing, a main carrier gas feed 700 is divided into a plurality of carrier gas feed streams 702, with each carrier gas feed stream 702 providing a portion of the carrier gas 624 to the aerosol generator 600. For example, each of the carrier gas feed streams 702 could provide a different portion of the carrier gas 624 to a different location within the aerosol generator 600, to ensure good distribution of the carrier gas 624 in the aerosol generator 600. The flow of carrier gas in each of the carrier gas feed streams 702 is independently automatically controlled at the direction of the electronic processor 640 through automatic actuation of the appropriate flow control valve 704. The electronic processor 640 monitors flow through each of the carrier gas feed streams 702 via the flow element 706. Based on flow information from the flow element 702, the electronic processor directs control of the corresponding flow control valve 704 accordingly. Independent control of the carrier gas feed streams 702 permits more precise control of carrier gas delivery to the aerosol generator 600. Also, the independent control of each of the carrier gas feed streams 702 allows flexibility to deliver carrier gas to some portions of the aerosol generator 600 and not to other portions of the aerosol generator 600. Therefore, if part of the aerosol generator must be shut down because of an operating problem, other portions of the aerosol generator can continue to operate to generate the aerosol stream. For example, the aerosol generator could include the ultrasonic transducers subdivided into independently activatable groups, with at least one group corresponding with each of the carrier gas feed streams 702.

Figure 42:
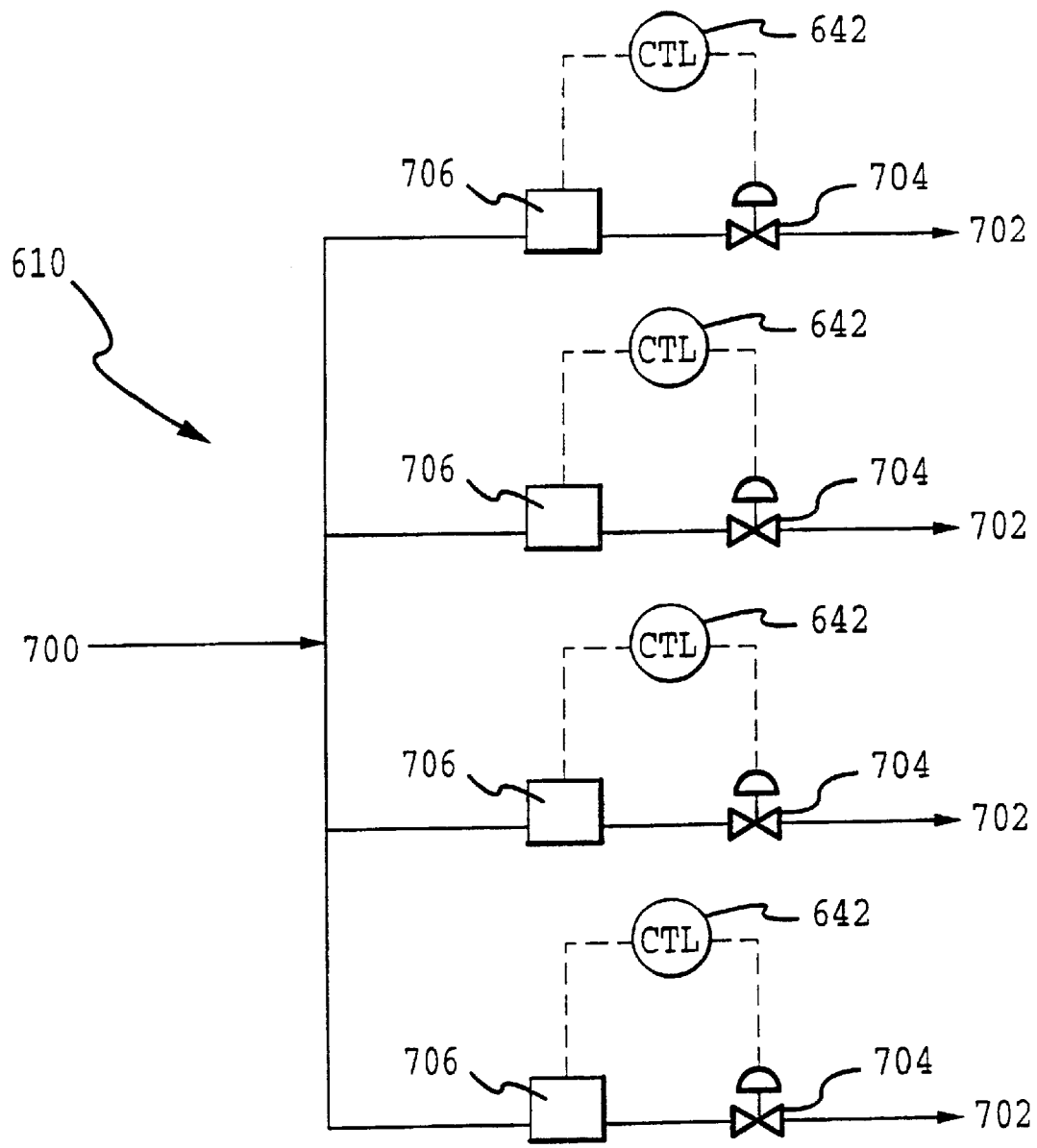

With continued reference to FIGS. 37 and 42, automated control of the carrier gas supply system 610 during the batch initiation operations will be described. Initially all of the flow control valves 704 are closed. At the direction of the electronic processor 640, each of the flow control valves 704 is automatically opened to initiate the flow of carrier gas through the carrier gas feed streams 702. During batch termination operations, the electronic processor automatically directs closure of each of the flow control valves 704 to discontinue the supply of carrier gas through the carrier gas feed streams 702.

Figure 51:
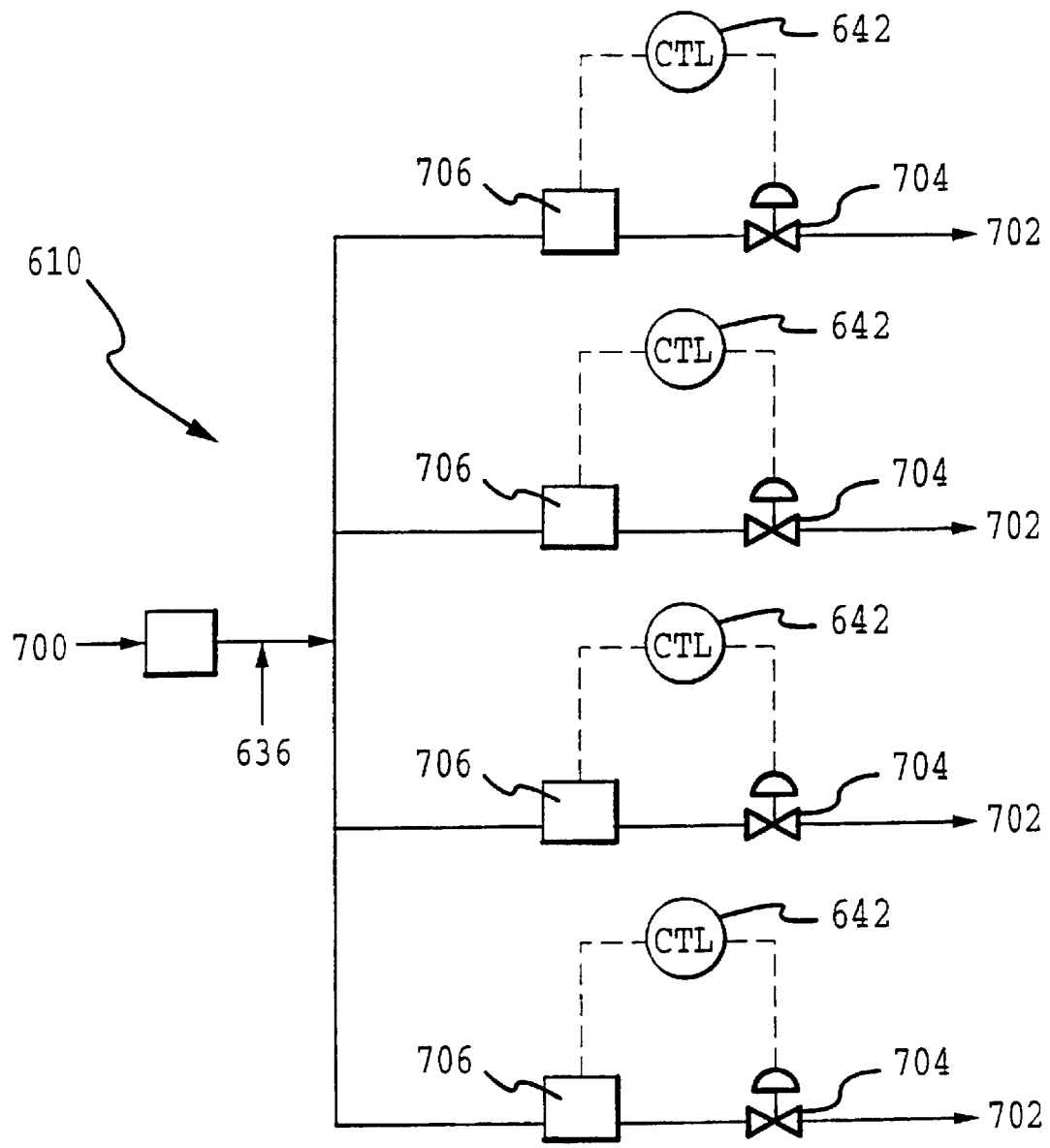

FIG. 51 shows a schematic of another embodiment of the carrier gas supply system 610 in which the additional liquid vehicle 636 is added to the carrier gas. FIG. 51 is the same as FIG. 42, except that the main carrier gas feed 700 is heated in a heater 708 and the additional liquid vehicle 636 is then added to the main carrier gas feed 700. The additional liquid vehicle 636 is preferably added in an amount that will substantially saturate the main carrier gas feed 700 with vapor of the liquid vehicle. Heating of the main carrier gas feed 700 is done to increase the quantity of vapor of the liquid vehicle that may be accommodated by the main carrier gas feed 700 when saturated. With reference to FIGS. 37 and 51, the temperature of the main carrier gas feed 700 after the heater 708 is preferably approximately equal to, or slightly higher than, the temperature of the aerosol stream being generated in the aerosol generator 600, so that the carrier gas 624 will be substantially saturated in the liquid vehicle at the conditions of aerosol generation, to reduce or substantially prevent vaporization in the aerosol generator 600 of liquid vehicle from the precursor liquid feed 620 fed to the aerosol generator 600.

Also, although a preferred embodiment of the method of the present invention includes a circulating precursor liquid, it is possible to operate without precursor liquid circulation. For example, when the carrier gas 624 is saturated with vapor of the liquid vehicle, as just described, then the loss of liquid vehicle from precursor liquid in the aerosol generator 600 may be small enough to avoid circulation altogether. In one embodiment, the precursor liquid could be fed to the aerosol generator 600 at a rate substantially equal to the rate of droplet generation to form the aerosol stream, with no precursor liquid effluent stream 622 exiting the aerosol generator. As another example, circulation could also be avoided by processing a more dilute precursor liquid, that then concentrates, in a steady state fashion in the aerosol generator 600 to a desired concentration. The precursor liquid would be fed to the aerosol generator 600 at a rate substantially equal to the rate consumption in the aerosol generator 600, including consumption to produce droplets for the aerosol stream and to saturate the carrier gas in the aerosol generator 600 with vapor of the liquid vehicle.

Figure 43:
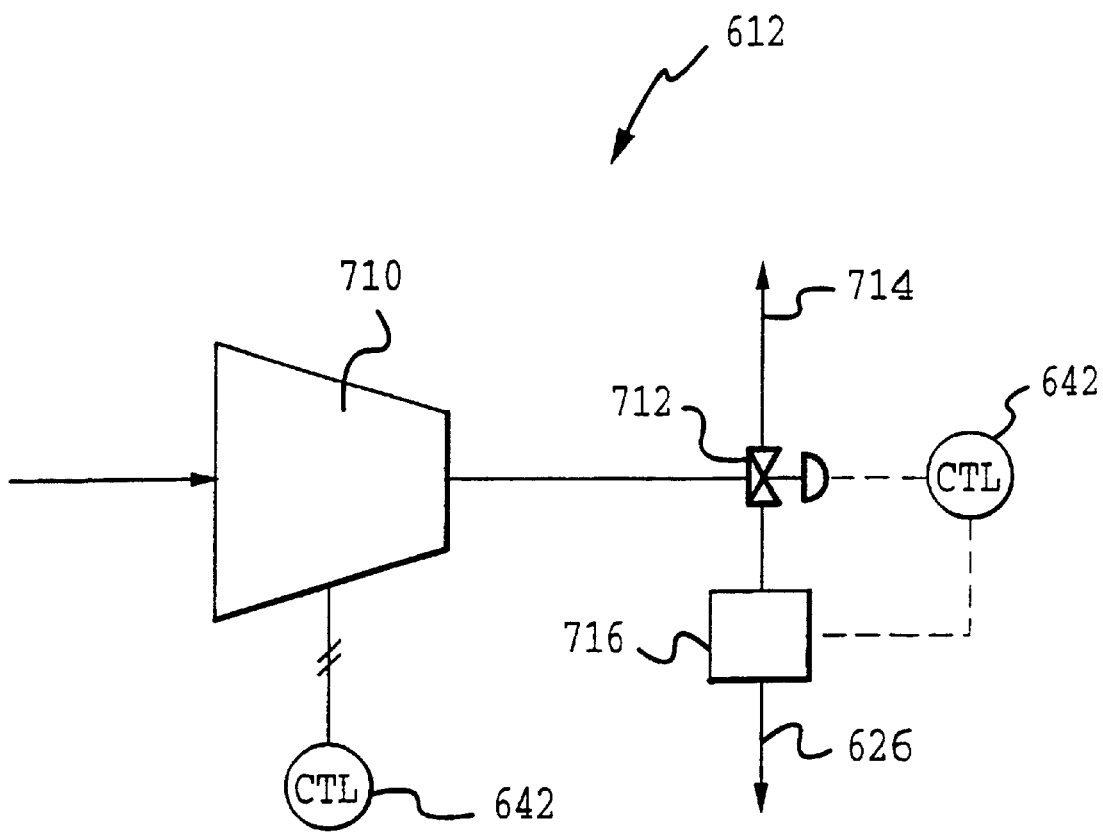

FIG. 43 shows a schematic of one embodiment of the cooling gas supply system 612, including some major process control features. Referring to FIGS. 37 and 43, automated control of the cooling gas supply system will be described. During intermediate operations, a blower 710 supplies cooling gas, typically air, through a flow control valve 712 to provide the cooling gas feed 626 to the aerosol cooler 604. The flow control valve 712 is a three-way valve and excess cooling gas is vented via a vent stream 714. The electronic processor 640 monitors, via a flow element 716, the flow of the cooling gas feed 626. The flow control valve 712 is automatically actuated, based on directions from the electronic processor 640, to vary the relative quantities of the cooling gas in the cooling gas feed 626 and the vent stream 714, to maintain the flow rate of the cooling gas feed 626 within a desired range. During the batch initiation operations, the blower 710 is initially idle and is automatically turned on at the direction of the electronic processor 640. During batch termination operations, the blower 710 is automatically turned off at the direction of the electronic processor 640, to discontinue flow of the cooling gas feed 626.

As one alternative to the embodiment described with reference to FIGS. 37 and 43, the cooling gas feed 626 could be supplied to aerosol cooler 604 by pulling a vacuum on the aerosol manufacture facility, rather than supplying the cooling gas feed 626 under a positive pressure as shown in FIG. 43. Likewise, the supply of the carrier gas 624 could also be supplied by pulling a vacuum on the system. For example, a blower could be located downstream of the particle collector 606 to pull a vacuum through the aerosol generator 600, the aerosol heater 602, the aerosol cooler 604 and the particle collector 606. The carrier gas supply system 610 could include a vacuum valve that permits flow of the carrier gas 624 when the pressure across the vacuum valve reaches a predetermined level as the vacuum develops in the system. The flow rate of the carrier gas 624 to the aerosol generator 600 could then be automatically controlled using a control system similar to that shown in FIGS. 42 or 51, but with operation at a vacuum. Likewise, the cooling gas supply system 612 could include a vacuum valve and automated flow control downstream of the vacuum valve.

FIG. 44 shows one embodiment of the aerosol heater 602 comprising a tube furnace 720, including eight separate heating zones, numbered 1 through 8. Heating zones 1 and 2 are adjacent the inlet to the tube furnace 720 and heating zones 7 and 8 are adjacent the outlet from the tube furnace 720. Each of the heating zones is associated with one or more heating elements that is independently controllable to independently control heat input into each of the heating zones. Each of heating zones 3, 4, 5 and 6 cover a full circumferential area of the tube 722 over some portion of the longitudinal dimension of the tube 722. Heating zones I and 2 are directly opposing and each cover a portion extending around a circumferential half of the tube 722, with heating zone 1 covering a circumferential top half and heating zone 2 covering a circumferential bottom half of the tube 722. Likewise, heating zones 7 and 8 each cover a portion extending around only a circumferential half of the tube 722, similar to the arrangement of heating zones 1 and 2. Heating zones 1 and 2, are, therefore, directly opposing each other in a direction substantially perpendicular to the direction of flow through the tube furnace 720. A similar relationship exists between heating zones 7 and 8. As noted, each of the heating zones is independently controllable. FIG. 45 shows a simplified cross-section through heating zones I and 2 of the tube furnace 720, showing the location of heating zones I and 2 in the interior of the tube 722. Heating zone 1 is heated by a heating element 724 while heating zone 2 is independently heated by an opposing heating element 726.

With reference to FIGS. 37, 44 and 45, automated control of heat input into the aerosol heater 602 will be described. During intermediate operations of batch processing, the aerosol stream flows through the interior of tube 722 of the tube furnace 720. One or more of the heating zones are individually heated by heating elements corresponding with those heating zones. The electronic processor 640 automatically monitors, via the temperature indicator 724, the temperature at some location within the tube furnace 720. Typically, the temperature is monitored at the outer surface of the tube 720 by a thermocouple located at the outer surface. Based on the monitored temperature information, the electronic processor 640 automatically directs the tube furnace 720 to control the heat input of the heating zones. Although only a single temperature indicator 724 is shown in FIG. 44, typically a number of temperature indicators would be used, with at least one for each heating zone, and the electronic processor would automatically direct control of heat input into each of the heating zones accordingly. Furthermore, the tube furnace 720 is typically oriented so that the flow of the aerosol stream through the tube 722 is in a substantially horizontal direction. With such a configuration, there is a tendency of droplets or particles, as the case may be, in the aerosol stream to vertically rise due to buoyancy forces caused by heating of the aerosol stream. To at least partially accommodate this effect, it is typically desired to have a higher heat input into heating zone number 2 than into heating zone number 1. For example, heat input into heating zone 2 could be three times the heat input in zone 1. In an extreme situation, heat input could be only into zone 2 with no heat input into zone 1, with zone 1 then being heated through convective heating from zone 2. During batch initiation operations, heat input into the heating zones is either zero or at a reduced level. Heat input is automatically increased, however, at the direction of the electronic processor 640 to cause the temperature within the tube 722 to increase, prior to flowing the aerosol stream through the tube 722. During the batch termination operations, heat input into the tube furnace 720 is automatically reduced or terminated, to automatically decrease the temperature within the tube 722. This is typically done after the flow of the aerosol stream through the tube 722 has been discontinued.

Figure 46:
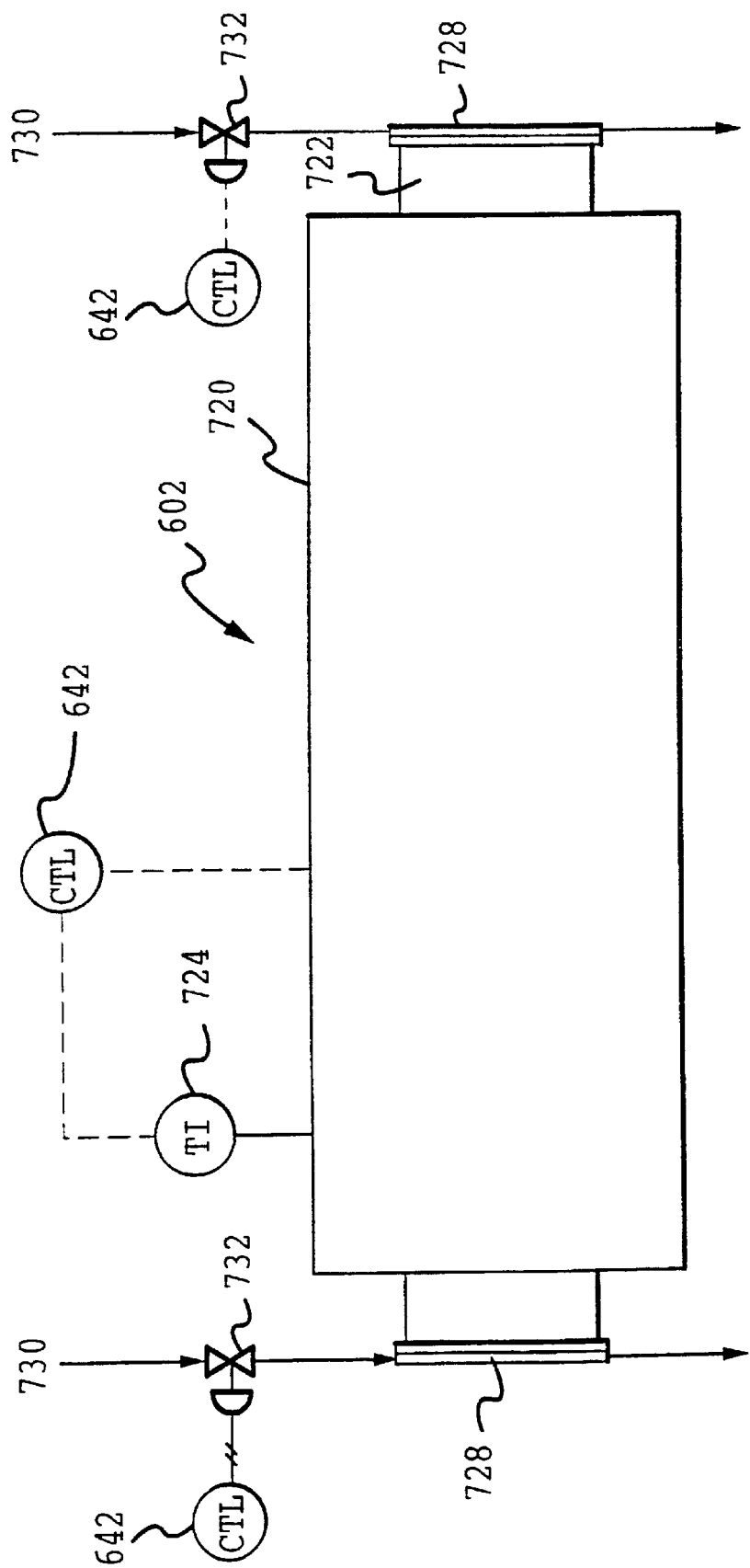

FIG. 46 shows another embodiment of the aerosol heater 602 including the tube furnace 720. Temperature control is as described previously with respect to FIGS. 44 and 45. With reference to FIGS. 37 and 46, the ends of the tube furnace are attached to end caps 728, which provide for a flange connection to conduits connecting with the aerosol generator and the aerosol cooler. During batch processing, the end caps 728 may be cooled with a cooling liquid 730, such as water, circulated through at least a portion of each end cap 728. During normal manufacture conditions present during the intermediate operations, the electronic processor typically maintains the flow control valves 732 in a closed position so the cooling fluid 730 is not flowing to the end cap 728. During the intermediate operations when the aerosol stream is flowing through the tube 722, there is typically no need to cool the end cap 728. During batch initiation operations, however, when the temperature in the furnace is being increased, and before the flow of carrier gas has been initiated, the electronic processor 640 directs automatic actuation of the flow control valves 732 to an open position to permit the cooling liquid 730 to cool the end caps 728. During batch termination operations, the electronic processor 640 may direct that the flow control valves 732 once more be automatically actuated into an open position to commence cooling of the end caps 728, while the temperature in the furnace is reduced to a desired level after flow of the carrier gas is discontinued through the tube furnace 720. Opening and closing of the flow control valves 732 could be directed by the electronic processor 640 based on any suitable input. For example, the flow control valves 732 could be opened and closed at specific times during batch initiation operations and batch termination operations, or could be opened and closed based on a monitored condition, such as a monitored temperature in the vicinity of one or both of the end caps 728.

Figure 47:
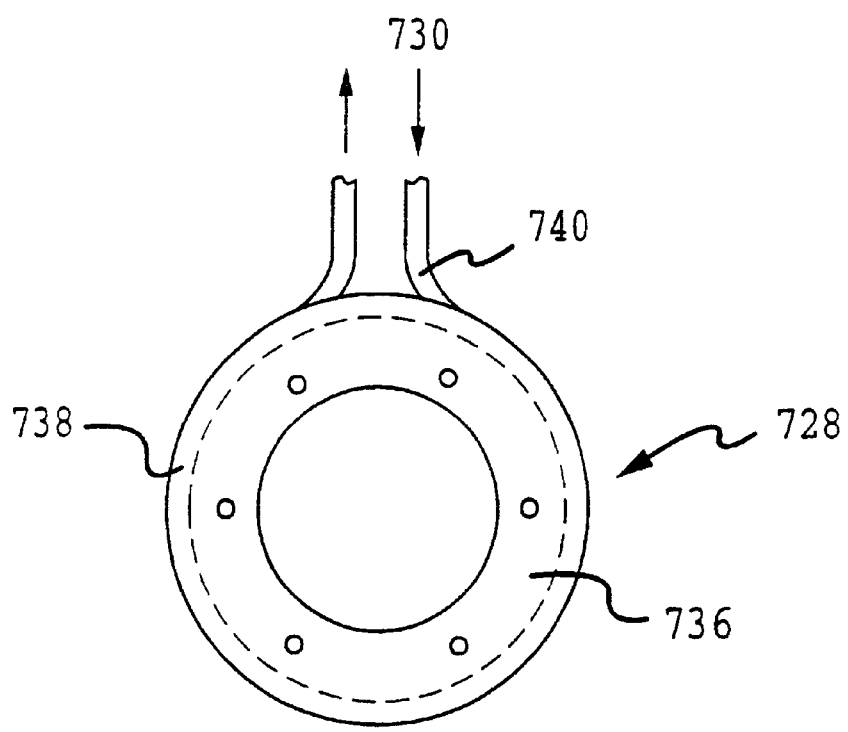
Figure 48:
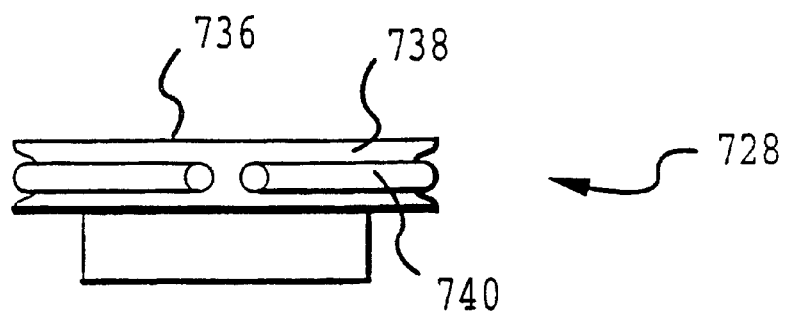

Referring now to FIGS. 46 and 47, one design for the end caps 728 is shown. As shown at FIGS. 46 and 47, the end caps 728 include a flange body portion 736 with a recess 738 about the edge in which a small tube 740 is disposed. The tube 740 provides a flow path for the cooling liquid 730 to circulate through the end caps 728 when being cooled. The tubes 740 are typically copper tubes for efficient heat transfer.

Figure 49:
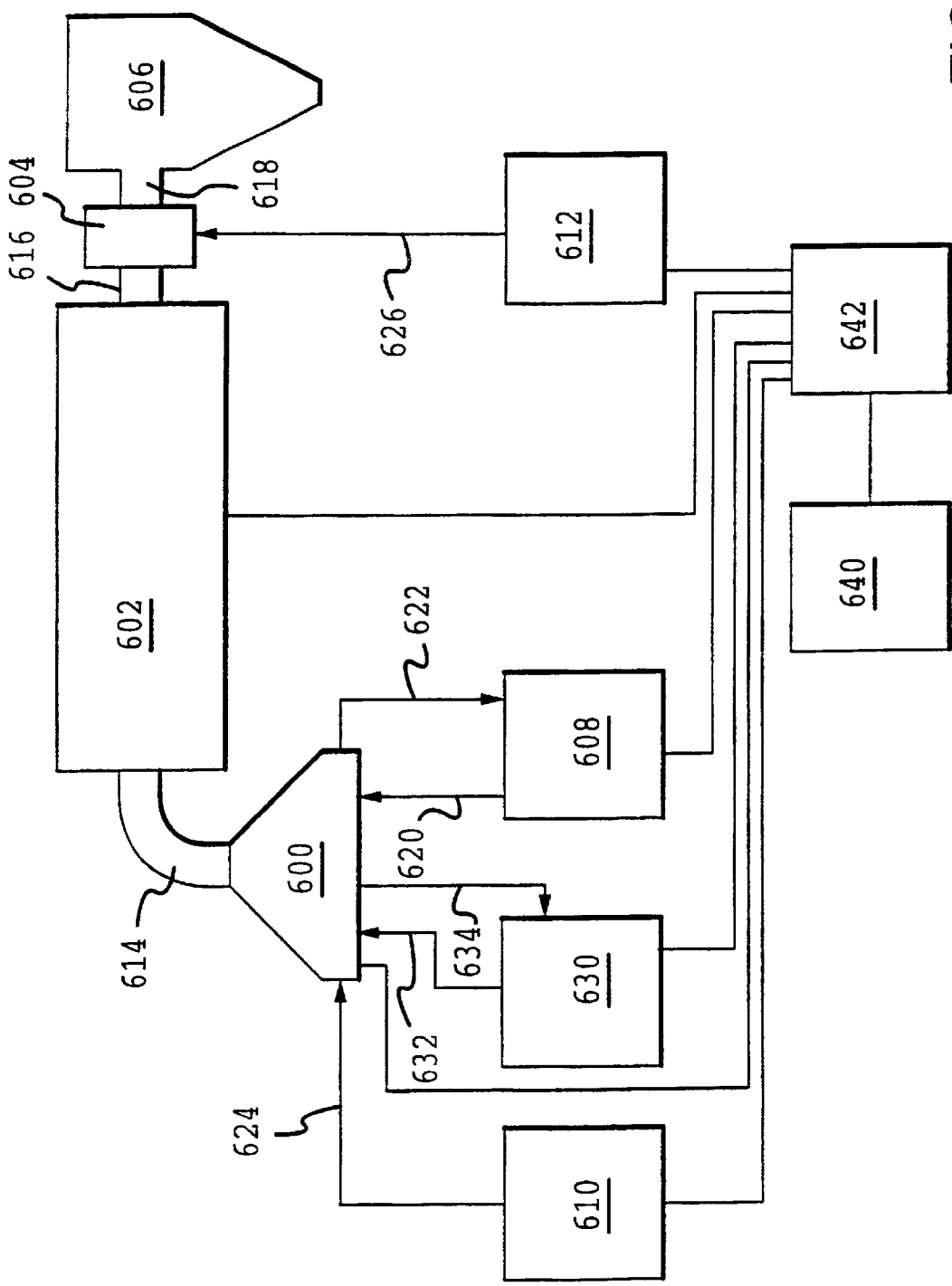

Referring now to FIG. 49, another embodiment of the aerosol manufacture facility is shown in which an electronic processor 640 is used to direct control of at least portions of batch processing in the aerosol manufacture facility. As shown in FIG. 49, the electronic processor 640 communicates, via the controller 642, with the cooling fluid supply system 630, in addition to communication with the carrier gas supply system 610, the precursor liquid supply system 608, the cooling gas supply system 612, the aerosol heater 602 and the aerosol generator 600.

Figure 50:
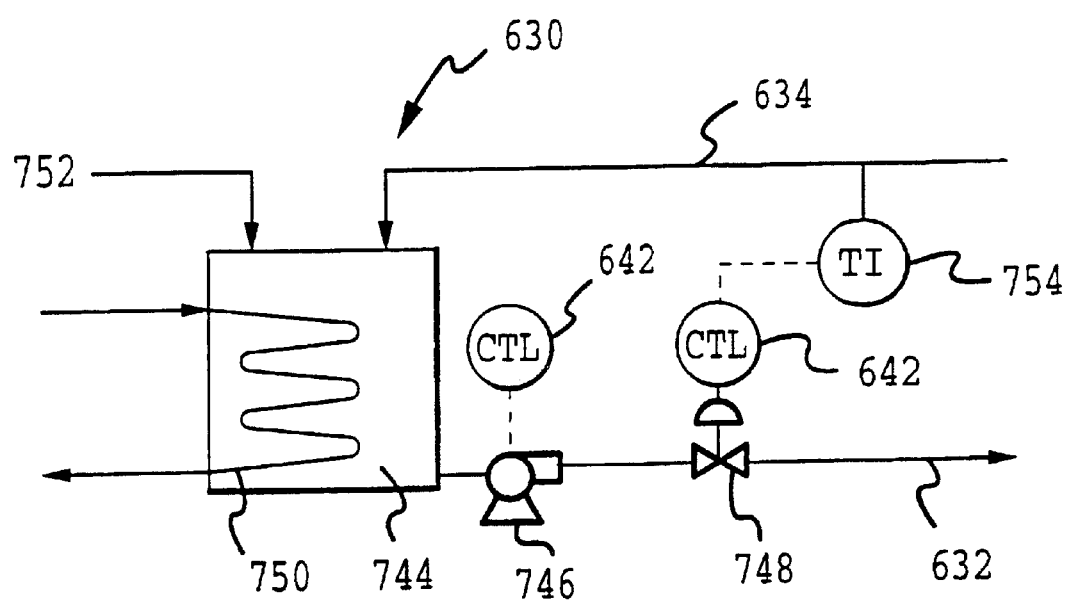

FIG. 50 show one embodiment of the cooling liquid supply system 630, including some major automated process control features. Referring now to FIGS. 49 and 50, automated control of the cooling liquid supply system 630 will be described. During intermediate operations of batch processing, the cooling liquid feed 632 is withdrawn from a cooling liquid tank 744 by a pump 746 and passes through a flow control valve 748. The cooling liquid effluent 634 is returned to the cooling liquid tank 744 for recirculation. Cooling liquid in the cooling liquid tank 744 is cooled via cooling coils 750. Make-up cooling liquid 752 is added as required. The cooling liquid is typically deionized water. During the intermediate operations, the electronic processor 640 monitors, via a temperature indicator 754, the temperature of cooling liquid in the cooling liquid effluent 634 and the electronic processor 640, based on the monitored temperature information, automatically actuates the flow control valve 748, as necessary, to increase or decrease the flow rate of the cooling liquid feed 632. During batch initiation operations, the pump 746 is initially in the off position. The pump 646 is automatically started at the direction of the electronic processor 640 to commence the flow of the cooling liquid feed 632. During the batch termination operations, the pump 746 is automatically shut off at the direction of the electronic processor 640, to terminate the flow of the cooling liquid feed 632.

In one embodiment for the cooling liquid supply system 630, cooling liquid could be supplied, during the intermediate operations, to electronic driver circuits driving the ultrasonic transducers of the aerosol generator 600, to cool the driver circuits to prevent overheating. Cooling liquid to the driver circuitry may be automatically controlled at the direction of the electronic processor 640, in a manner similar to control of the cooling liquid feed 632 to cool the ultrasonic transducers.

Figure 52:
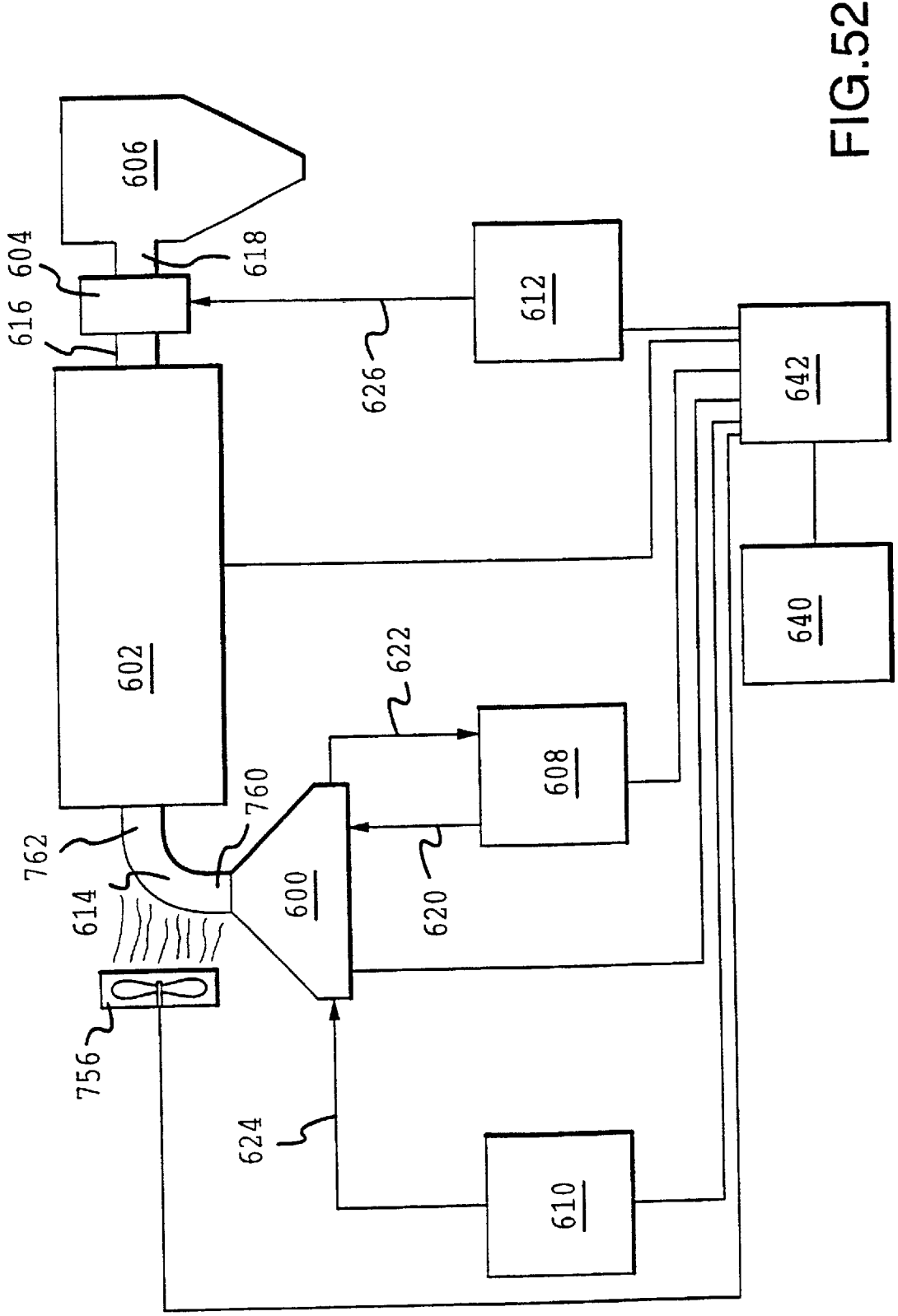

Referring now to FIG. 52, another embodiment is shown of the aerosol manufacture facility. This embodiment is the same as that shown in FIG. 37, except that the electronic processor 640 communicates, via the controller 642, with a cooling unit 756. Operation of the cooling unit 756 is automatically controlled at the direction of the electronic processor 640. The cooling unit 756 will typically be automatically activated during the batch initiation operations and will be automatically deactivated during the batch termination operations. During intermediate operations the cooling unit 756 will typically be operated when the aerosol generator 600 is generating the aerosol stream. The purpose of the cooling unit 756 is to cool at least a portion of the conduit 614, to prevent overheating of the aerosol stream flowing in the conduit 614 between the aerosol generator and the aerosol heater 602. The cooling unit 756 is typically a fan or blower blowing air on the conduit 614 to effect the desired cooling.

With continued reference to FIG. 52, in a preferred embodiment, the cooling unit 756 cools the first conduit portion 760 and substantially does not cool the second conduit portion 762. The first conduit portion 760 directs flow in a substantially vertical direction and the second portion, which is on the other side of the bend in the conduit 614, directs the flow of the aerosol stream in a substantially horizontal direction. By cooling the first conduit portion 760, excessive vaporization of liquid vehicle from droplets in the aerosol stream is prevented, allowing oversize droplets and liquid collecting on the walls of the first conduit portion 760 to drain back into the aerosol generator 600. However, because the second conduit portion 762 is substantially not cooled, heat from the aerosol heater 602 will tend to vaporize liquid vehicle from the droplets in the aerosol stream. Under these conditions, a situation is prevented where, otherwise, liquid may build up on the walls at the entrance of the aerosol heater 602, which may cause significant problems. In some instances, it may be desirable to insulate the second conduit portion 762 to prevent heat loss and to promote the desired vaporization of liquid vehicle from the droplets in the aerosol stream. Furthermore, in a preferred embodiment, the temperature of the wall of the first conduit portion 760 is monitored, with a temperature sensor, by the electronic processor 640, and the cooling unit 756 is turned on or off as necessary. Normally, the cooling unit is turned off and is turned on only if the wall temperature exceeds a predetermined value. The cooling unit 656 may also provide benefits during batch initiation and/or batch termination operations. For example, when the temperature in the aerosol heater 602 is being increased during batch initiation operations, without the flow of carrier gas, the cooling unit 756 may be turned on to prevent overheating of the conduit 614. Likewise, the cooling unit 756 may be turned on to cool the conduit 614 during batch termination operations after the flow of carrier gas is discontinued.

Figure 61:
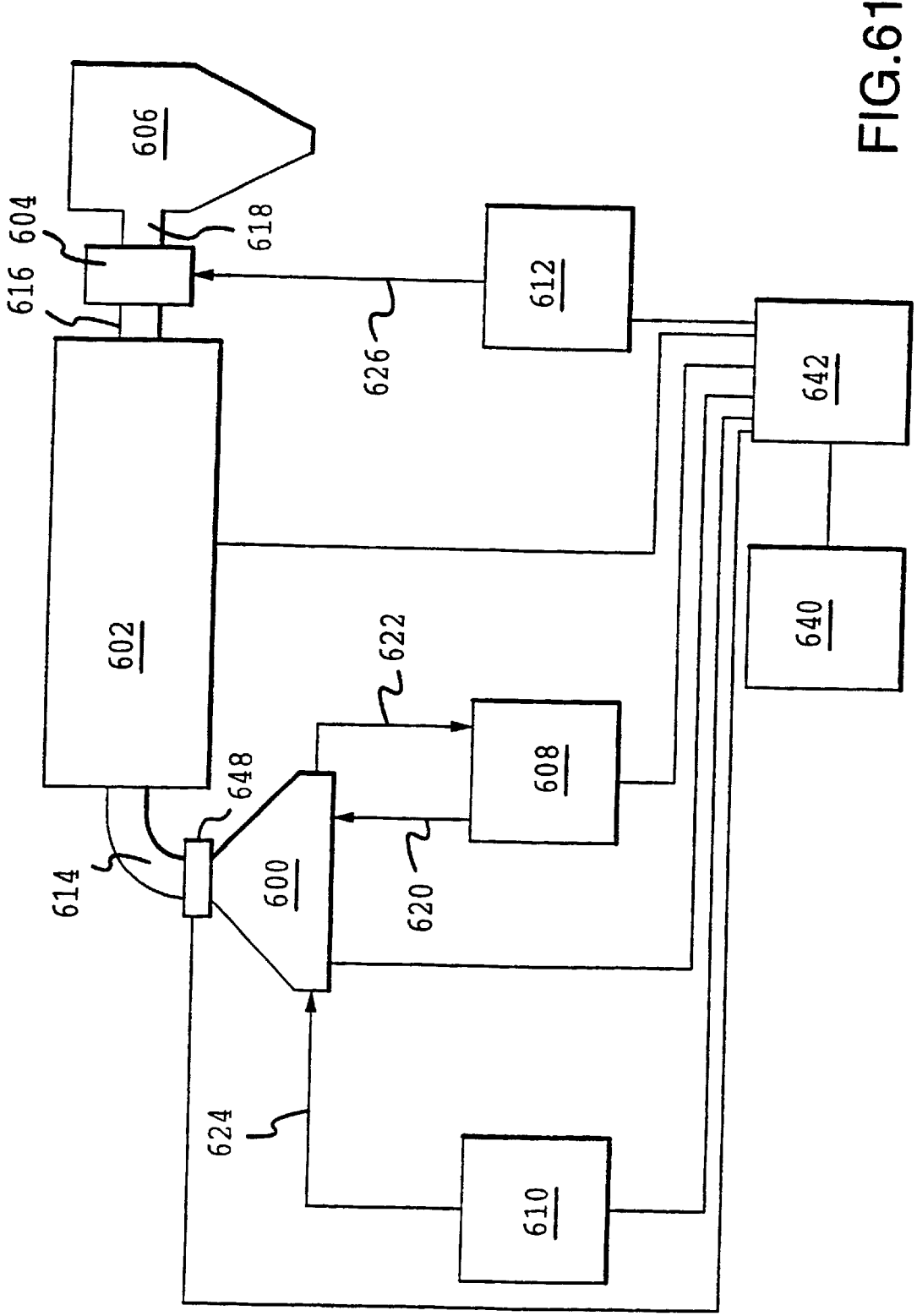
FIG. 61 is a schematic of another embodiment of the aerosol manufacture facility, including an aerosol monitor.

FIG. 61 shown another embodiment of the aerosol manufacture facility. FIG. 61 is the same as FIG. 37, except that the electronic processor 640 is also communicating, via the controller 642, with an aerosol monitor 648 located at the exit from the aerosol generator 600. During intermediate operations, the aerosol stream passes through the aerosol monitor 648. In the aerosol monitor 648, a light source, such as a neon or other source, directs a light beam across at least a portion of the flowing aerosol stream toward a light detector. The amount of light detected by the light detector provides information concerning the density of the liquid droplets in the aerosol stream. In the embodiment shown in FIG. 61, the electronic processor 640, during the intermediate operations, monitors, via the aerosol monitor 648, the density of the aerosol stream exiting the aerosol generator 600. The electronic processor 640 may then process the monitored aerosol density information and provide useful feedback and/or control. For example, when the electronic processor 640 identifies an anomaly in the density of the aerosol stream, an alarm could be activated to alert an operator, so that the operator could investigate the cause of the anomaly and make adjustments or repairs as necessary. Also, the electronic processor 640 could use the monitored aerosol density information to effect process control. For example, based on the density information, the electronic processor 640 could, during the intermediate operations, automatically direct an increase or decrease of flow in the precursor liquid stream 620, and/or the flow rate of the carrier gas 624 to optimize the density of the aerosol stream. During batch termination operations, the electronic processor 640 could direct automatic discontinuance of purge operations after the aerosol monitor 648 indicates that there is no more aerosol flowing from the aerosol generator600, indicating that the system has been adequately purged of remaining aerosol.

Although the aerosol manufacture method has been described as generally ending with collection of the particles in the particle collector, in some embodiments additional processing may be performed after particle collection. For example, if it is desired to further modify the composition or the morphology of the particles, the particles may be subjected to a post-collection anneal, or other operation at elevated temperature. During the post-collection anneal, components in the particles may react to alter the chemical composition of the particle, or one or more phases within the particles may be recrystallized or reconfigured. The anneal may be performed, for example in a rotary kiln.

Referring again to FIG. 33, the sequence for processing of a batch begins with batch initiation operations as a first stage, passes through intermediate operations as a second stage, and ends with batch termination operations as a third stage. The particular sequences of specific operations, or steps, within each of these stages may be varied considerably and still be within the scope of the present invention. In that regard, however, the activation of the ultrasonic transducers during the batch initiation operations and the deactivation of the ultrasonic transducers during the batch termination operations are critical steps, and it is necessary that certain steps be performed during the batch initiation operations prior to activation of the ultrasonic transducers and the certain steps during the batch termination operations occur after deactivation of the ultrasonic transducers, as described in more detail below.

Figure 53:
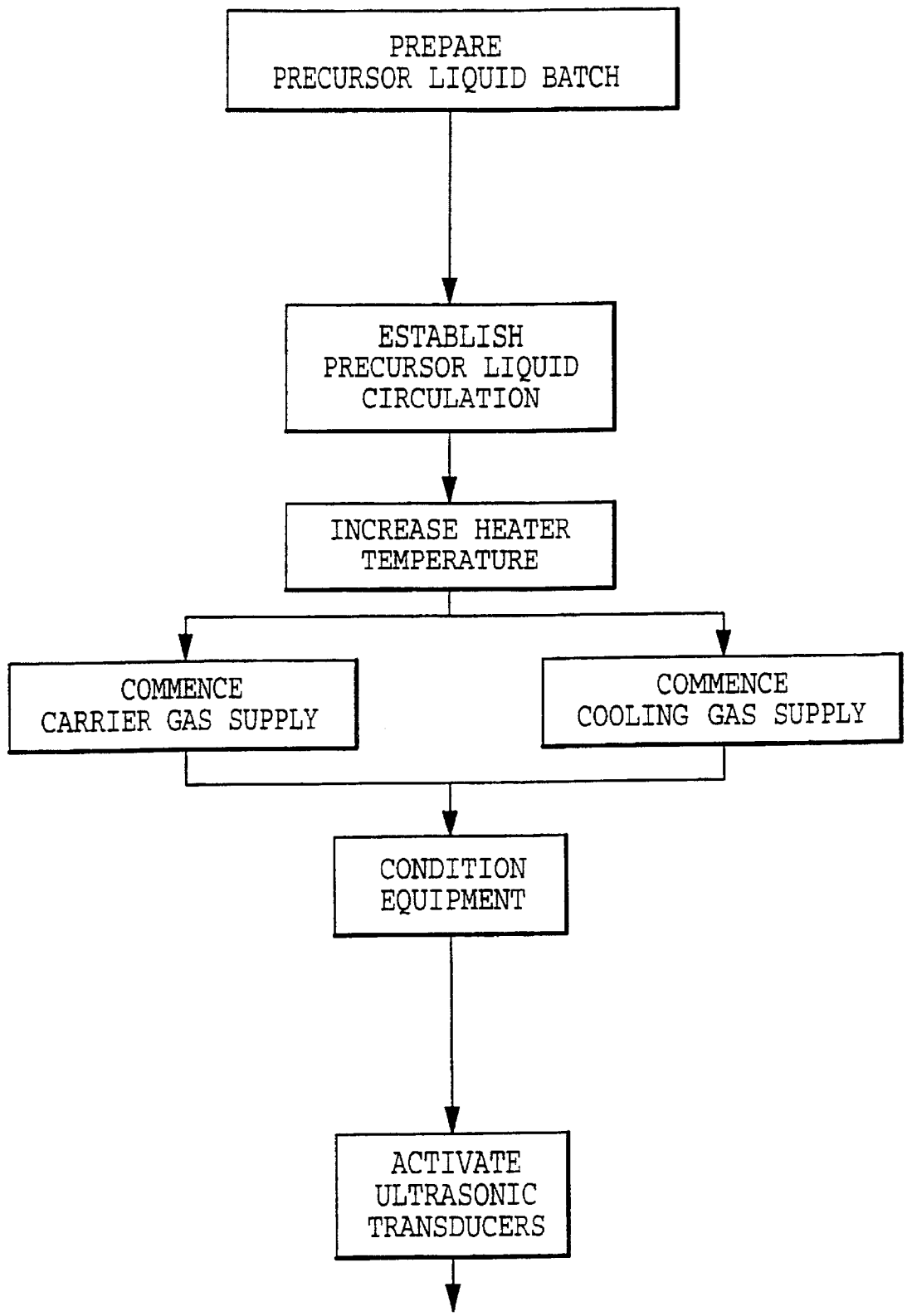
Figure 54:
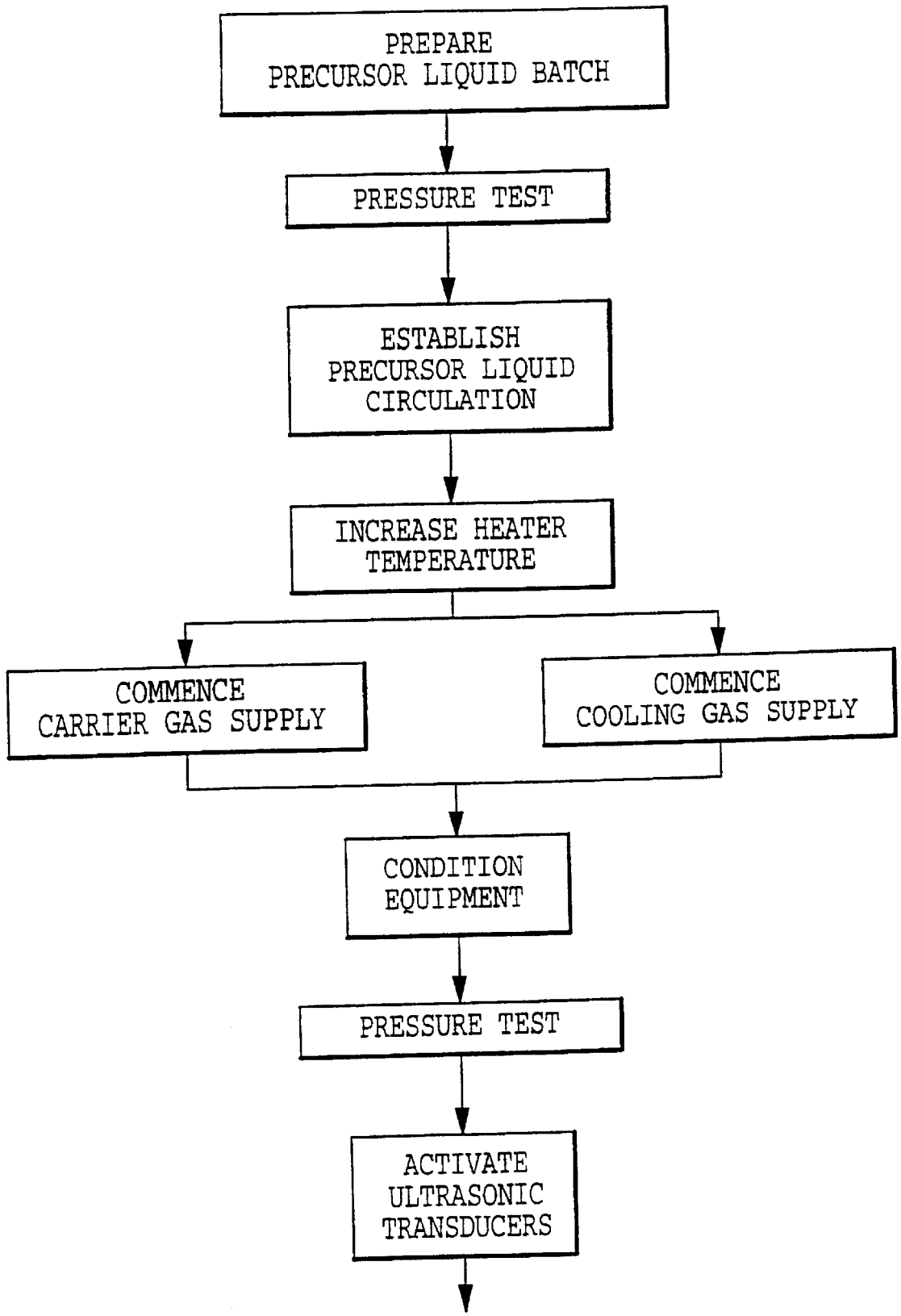
Figure 55:
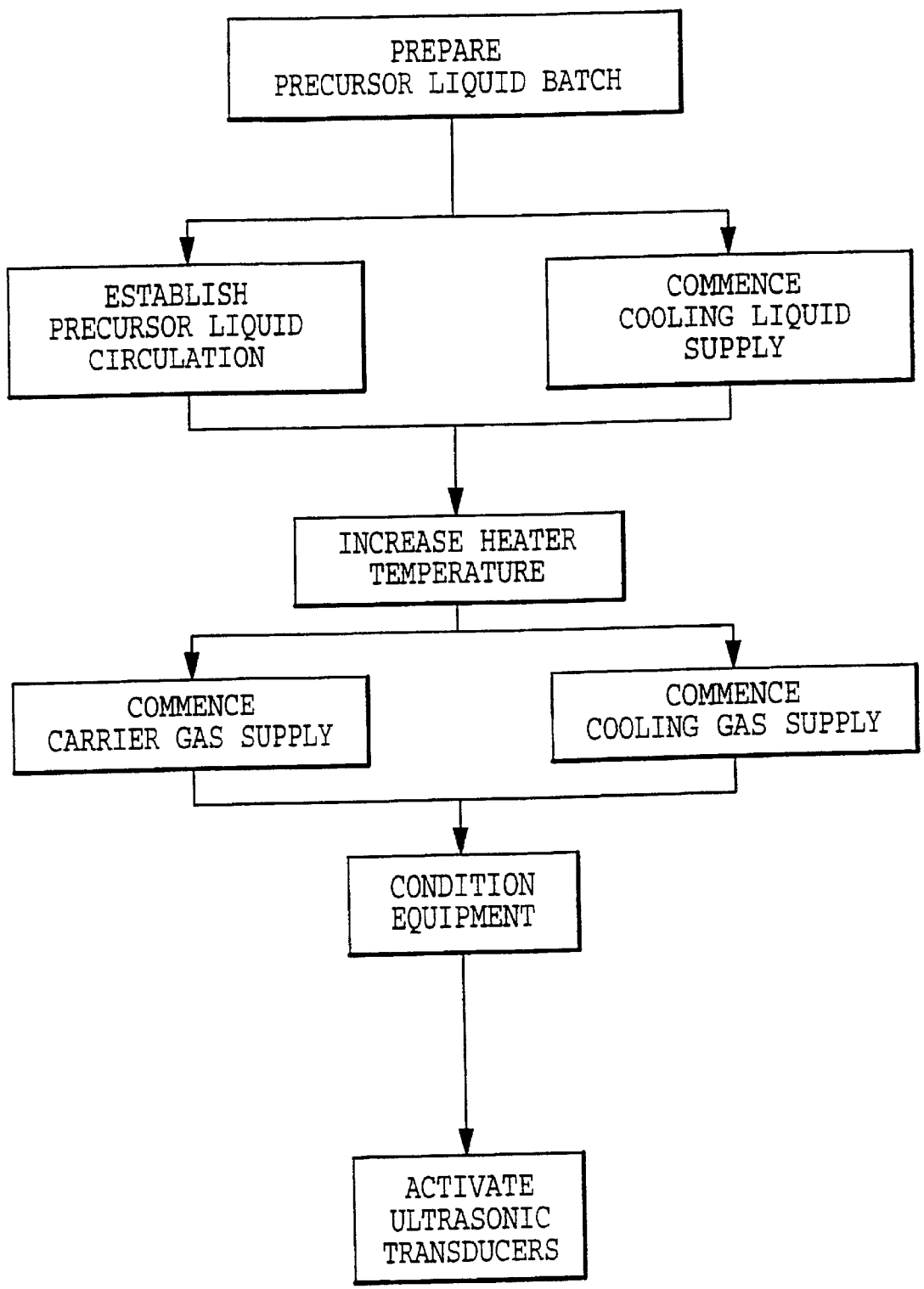

FIG. 53 is a flow diagram for one embodiment for a sequence of steps during the batch initiation operations. Referring to FIGS. 37 and 53, the first step is to prepare the precursor liquid batch. This typically comprises adding the liquid vehicle and the precursor material together, with appropriate mixing, to prepare the desired precursor liquid in a batch size desired for processing. It will be appreciated, however, that batches of the precursor liquid could be acquired in a pre-prepared state, in which case the batch initiation operations would not include preparation of the precursor liquid batch.

The next step shown in FIG. 53 is to establish precursor liquid circulation. This typically involves commencing to supply the precursor liquid feed 620 to the aerosol generator 600 from the precursor liquid supply system 608 and receiving back to the precursor liquid supply system 608 the precursor liquid effluent 622 from the aerosol generator 600. After circulation of the precursor liquid to the aerosol generator 600 has been established, the next step is to increase the temperature within the aerosol heater 602 to some elevated temperature. This is typically accomplished by increasing heat input into the aerosol heater 602. For example, when using a furnace as the aerosol heater 602, heat input is increased into one or more of a plurality of heating zones in the furnace, as previously described.

The next steps, as shown in FIG. 53, are to commence the carrier gas supply and to commence the cooling gas supply. These steps are shown as occurring substantially simultaneously. Commencing the carrier gas supply typically involves establishing flow of the carrier gas 624 to the aerosol generator 600 from the carrier gas supply system 610. Commencing the cooling gas supply typically involves beginning the flow of the cooling gas feed 626 to the aerosol cooler 604 from the cooling gas supply system 612.

The next step shown in FIG. 53 is to condition the equipment. This involves flowing the carrier gas, without generation of the aerosol stream, through the flow path comprising the aerosol generator 600, the aerosol heater 602, the aerosol cooler 604 and the particle collector 606. The aerosol heater 602 is at an elevated temperature and heats the flowing carrier gas. In the aerosol cooler 604, the hot carrier gas is mixed with the cooling gas feed 626 and then passes to the particle collector 606. Because the gas flowing through the particle collector 606 is at an elevated temperature, the flowing gas will heat at least portions of the particle collector 606. The effect of this conditioning step is to simulate conditions that will exist later, during the intermediate operations, after aerosol generation has commenced. For example, the aerosol cooler 604 and the particle collector 606 are warmed, under dynamic conditions, to a temperature simulating operating temperatures during the subsequent intermediate operations. Also, the furnace is conditioned in a dynamic state with flowing gas to simulate conditions that will exist during the intermediate operations.

The next step, as shown in FIG. 53, is to activate the ultrasonic transducers. This is accomplished by supplying electrical power to the ultrasonic transducer driver circuits to drive the ultrasonic transducers. Once the ultrasonic transducers have been activated, generation of the aerosol stream in the aerosol generator 600 commences. Because the generation of the aerosol stream does not commence until after the equipment has been conditioned, as previously discussed, the system is initially ready to produce particles under a steady state or quasi-steady state situation. This has the effect of reducing transitory effects in the system in the early stages of particle manufacture and reduces the possibility that substandard particles will be produced in the early stages. This is important because such substandard particles can contaminate an otherwise high quality batch, or could require that initial particles that are produced be discarded or subjected to cumbersome recycling operations. After activation of the ultrasonic transducers, the batch processing will proceed through the intermediate operations.

FIG. 54 shows a flow diagram for another embodiment for a sequence of steps during batch initiation operations. The sequence is the same as that shown in FIG. 53, except that two pressure test steps have been added. The first pressure test is conducted after preparation of the precursor liquid batch and before establishing the precursor liquid circulation. The first pressure test involves pressuring the flow path for the aerosol stream with the carrier gas and monitoring the pressurized flow path to identify leaks. The pressure test is primarily for safety, to ensure consistent flows throughout the system and to prevent losses. If the system fails the pressure test, then the batch initiation operations may be terminated and the source of the leak identified and fixed.

The second pressure test step shown in FIG. 54 follows the step of conditioning the equipment. For the second pressure test, the cooling gas supply and the carrier gas supply are temporarily interrupted and the flow path is again pressurized with carrier gas and the pressure monitored to identify leaks. The second pressure test is important to identify leaks that may develop after the equipment has reached an elevated temperature, that were not identified during the first pressure test. If the second pressure test fails, then the batch initiation operations will be terminated so that the source of the leak can be identified and fixed.

Referring now to FIG. 55, a flow diagram is shown of another embodiment of a sequence of steps for batch initiation operations. FIG. 55 is the same as FIG. 53, except that a step has been included to commence cooling liquid supply. This step is shown as being substantially simultaneous with establishing precursor liquid circulation. Referring now to FIGS. 49 and 55, commencing cooling liquid supply involves establishing the flow of the cooling liquid feed 632 from the cooling liquid supply system 630 and the return of the cooling fluid effluent 634 back to the cooling liquid supply system 630.

Referring now to FIG. 56, a flow diagram is shown of another embodiment for a sequence of steps during batch initiation operations. FIG. 56 is the same as FIG. 53. except that steps have been included relating to heating of the precursor liquid. Referring to FIGS. 37 and 56, after the step of establishing precursor liquid circulation, the next step is to commence heating precursor liquid. This is typically done by heating of precursor liquid in the precursor liquid supply system 608 so that the precursor liquid feed 620 supplied to the aerosol generator 600 is at an elevated temperature. By heating the precursor liquid, circulating precursor liquid in the aerosol generator 600 simulates an elevated temperature that will exist later during intermediate operations when the aerosol stream is being generated in the aerosol generator 600. Also, the heated precursor liquid will warm at least portions of the aerosol generator 600, again, simulating operation during intermediate operations. As shown in FIG. 56, after the step of conditioning the equipment, the next step is to terminate heating of the precursor liquid. During the, step of conditioning the equipment, as noted, the heated precursor liquid warms at least a portion of the aerosol generator 600. After the equipment has been sufficiently conditioned, the heating of the precursor liquid is terminated and the ultrasonic transducers are then activated to commence generation of the aerosol stream in the aerosol generator 600. At least some of the energy from the ultrasonic transducers results in heating of the circulating precursor liquid, so that the heating of the precursor liquid is typically no longer required.

With reference to FIGS. 37, 38 and 56, it should be noted that discontinuance of heating the precursor liquid might not always be required or desirable. For some precursor liquid compositions, it may be desirable to maintain the precursor liquid at a temperature that is higher than that which would otherwise exist during the intermediate operations. Also, the electronic processor 640 could continuously monitor the temperature of the precursor liquid effluent 622 and could automatically commence heating of the precursor liquid feed 620 whenever the monitored temperature drops below a predetermined level and could automatically discontinue the heating whenever the monitored temperature drops below a predetermined level.

Figure 56:
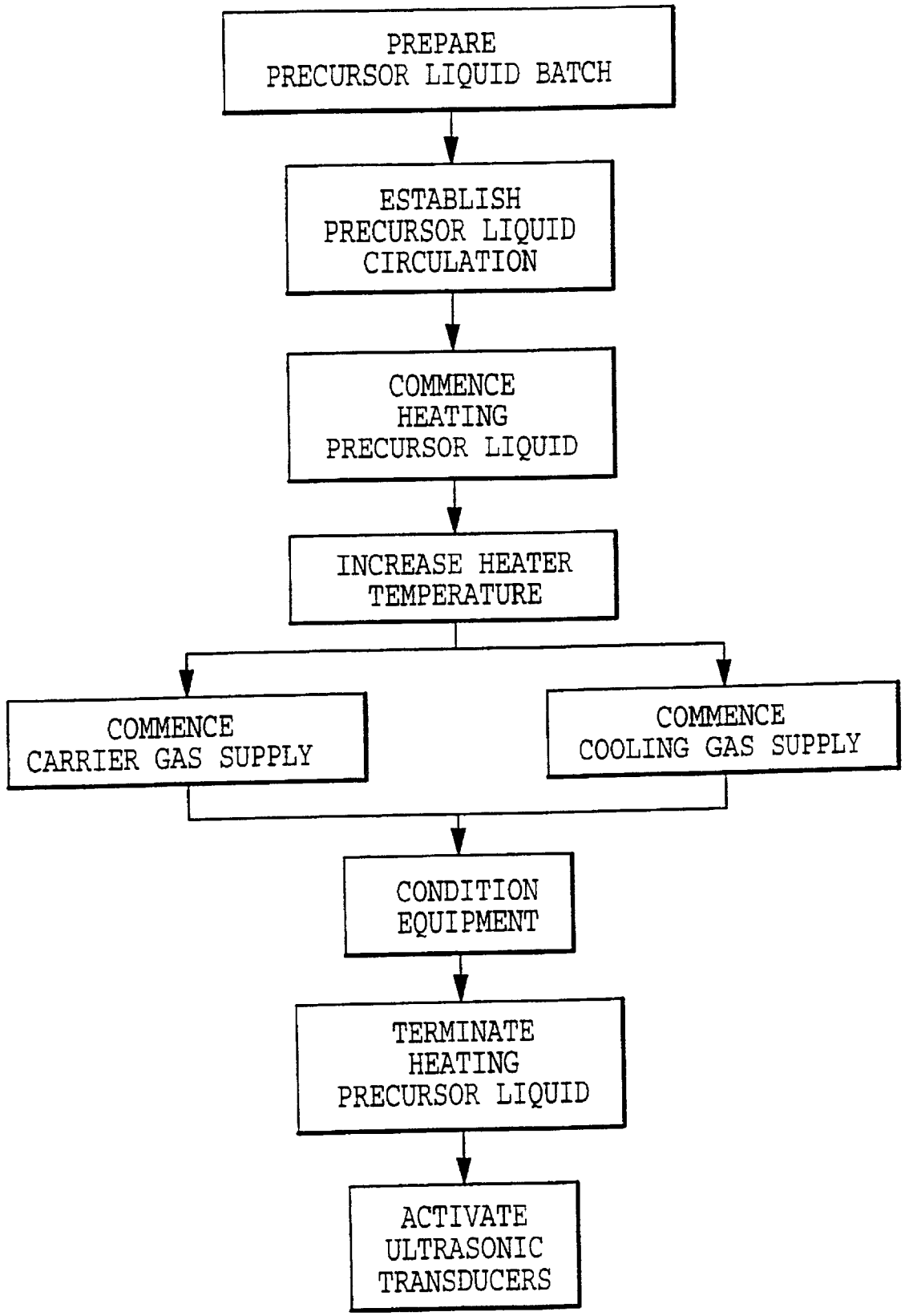
Figure 57:
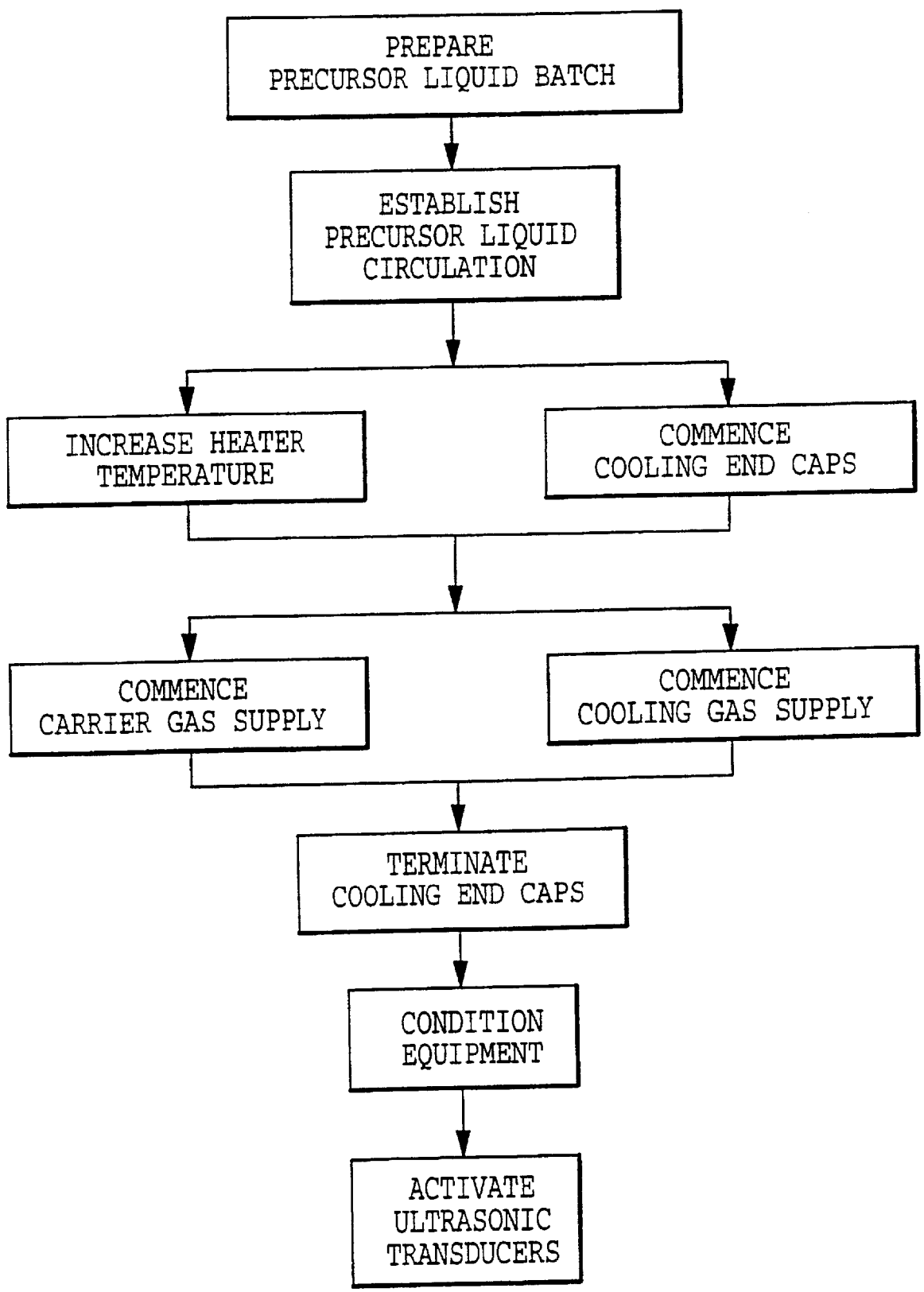
Figure 58:
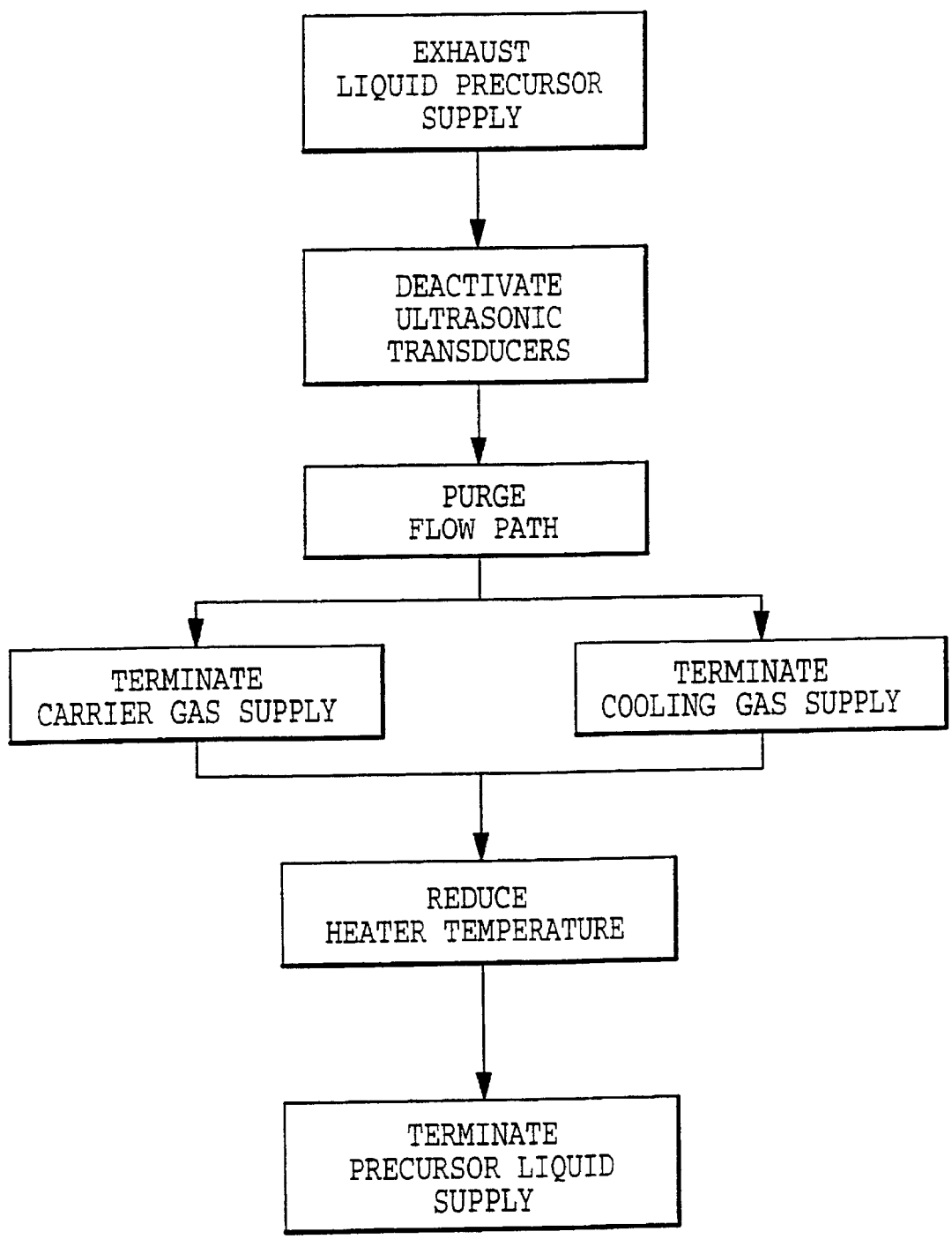
FIG. 58 is a flow diagram of one embodiment of a sequence of steps for batch termination operations of the present invention.
Figure 59:
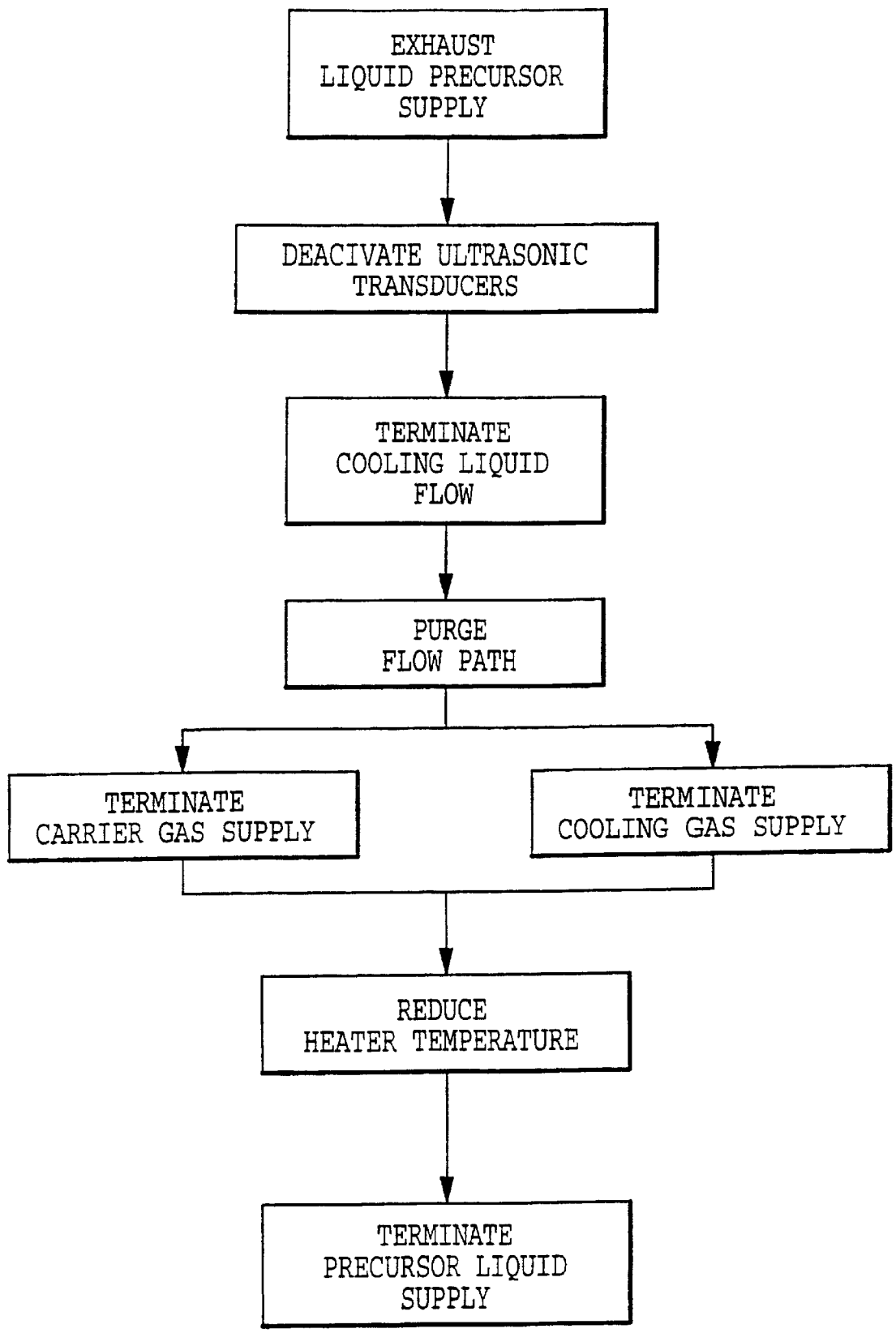
FIG. 59 is a flow diagram of one embodiment of a sequence of steps for batch termination operations of the present invention.
Figure 60:
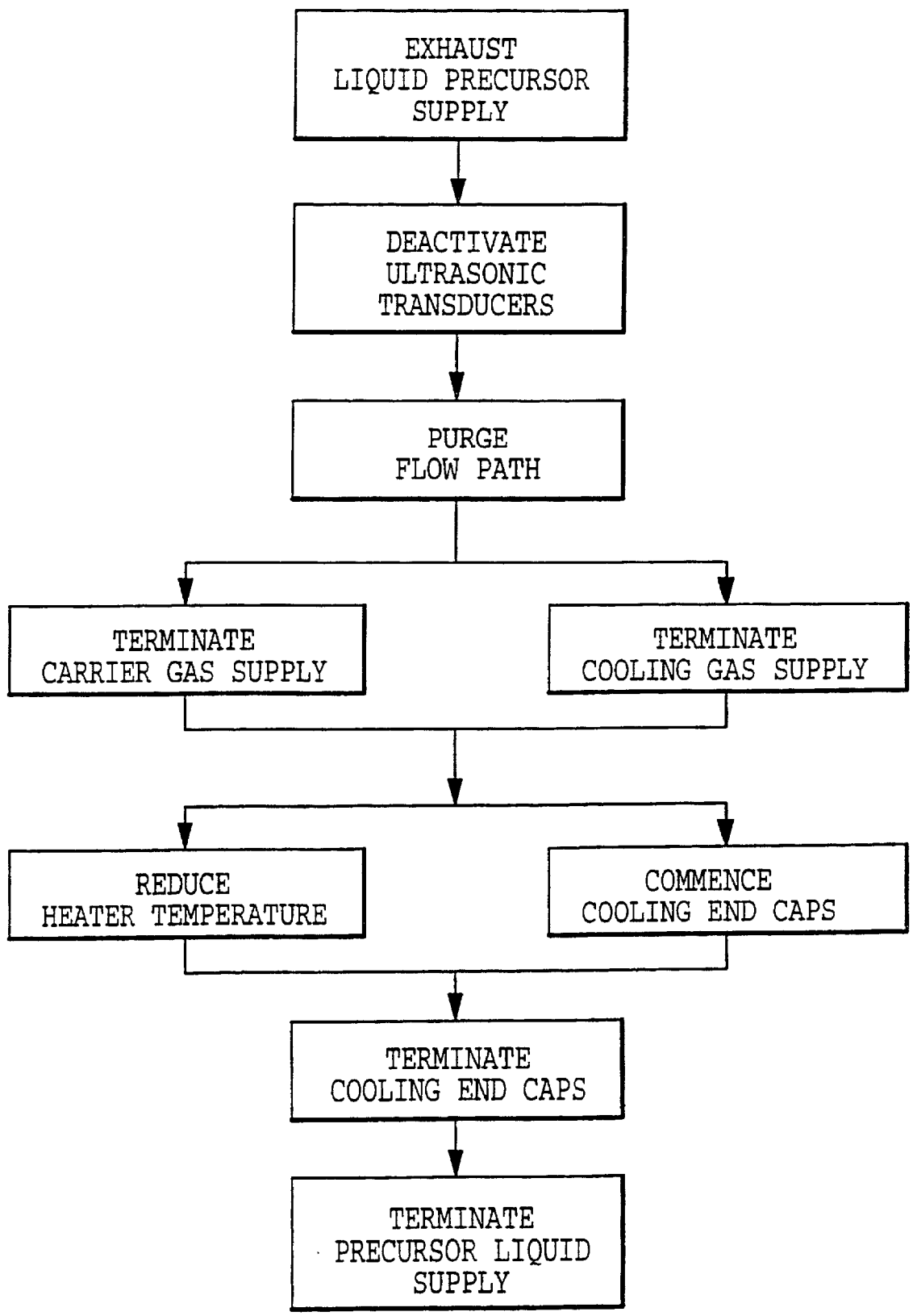
FIG. 60 is a flow diagram of one embodiment of a sequence of steps for batch termination operations of the present invention.

Referring to FIG. 57, a flow diagram is shown of yet another embodiment for a sequence of steps during batch initiation operations. FIG. 57 is the same as FIG. 53, except that steps have been included concerning cooling of end caps on the aerosol heater. Referring to FIGS. 37, 46 and 57, after the precursor liquid circulation has been established, the next steps, shown as being performed substantially simultaneously, are to increase the heater temperature and to commence cooling the end caps. Commencement of cooling the end caps comprises establishing flow of a cooling fluid through at least a portion of the end caps to cool the end caps and the terminal portions of the aerosol heater 602. The purpose of cooling the end caps is that without the cooling, the temperature at the terminal ends of the aerosol heater 602 could become excessively high, and could damage gaskets in connections between the aerosol heater and adjacent flow equipment. As seen in FIG. 57, the step preceding conditioning of the equipment is to terminate cooling the end caps. This is because after the carrier gas supply has commenced, the carrier gas flowing through the aerosol heater 602 will typically cool the terminal portions of the aerosol heater 602 by a sufficient amount so that cooling of the end caps is no longer required. Typically, it is not necessary to cool the end caps when particles are being produced, although the end caps may be cooled, if desired. For example, the electronic processor 640 could monitor the temperature in the vicinity of the end caps via a temperature probe, and cooling of the end caps could be automatically commenced whenever the monitored temperature exceeds a predetermined value and automatically terminated whenever the monitored temperature falls below a predetermined value.

Referring now to FIG. 58, a flow diagram shows one embodiment of a sequence of steps for batch termination operations. Referring to FIGS. 37 and 58, the first step in the batch termination operations is to exhaust the precursor liquid supply. This involves emptying, to the extent practical the precursor liquid supply system 608 of as much of the precursor liquid as possible while continuing to generate the aerosol stream in the aerosol generator 600. Typically, the initiation of the batch termination operations will be triggered by some monitored condition within the precursor liquid supply system 608, such as the level of precursor liquid remaining in a vessel within the precursor liquid supply system 608.

The next step, as shown in FIG. 58, is to deactivate the ultrasonic transducers. This step involves terminating the supply of electrical power to the ultrasonic transducer driving circuits. Deactivation of the ultrasonic transducers terminates the generation of the aerosol stream in the aerosol generator 600.

The next step, as shown in FIG. 58, is to purge the flow path of the aerosol stream. As noted previously, this flow path includes the aerosol generator 600, the aerosol heater 602, the aerosol cooler 604 and the particle collector 606. The purge is typically accomplished with the carrier gas, but a purge gas of a different composition could be used, if desired. The purpose of the purge is to remove any remaining aerosol from the aerosol generator 600 and downstream equipment. The purge may be conducted for a predetermined time, or for passage of a predetermined volume of purge gas, sufficient to remove any remaining aerosol, or may be terminated based on monitored conditions within the stream flowing through the flow path. For example, the concentration of nitrogen oxides downstream of the aerosol heater 602 could be monitored when the precursor liquid had included a precursor material of nitrate salts.

The next steps, as shown occurring substantially simultaneously in FIG. 58, are to terminate the carrier gas supply and to terminate the cooling gas supply. Terminating the carrier gas supply involves terminating the flow of the carrier gas 624 from the carrier gas supply system 610 to the aerosol generator 600. Terminating the cooling gas supply involves terminating the cooling gas feed 626 from the cooling gas supply system 612 to the aerosol cooler 604.

Referring now to FIG. 59, a flow diagram is shown including another embodiment of a sequence of steps for batch termination operations. FIG. 59 is the same as FIG. 58, except that a step of terminating cooling liquid flow has been added after the step of deactivating the ultrasonic transducers. With reference to FIGS. 49 and 59, the sequence of steps as shown in FIG. 59 would be appropriate, for example, when the ultrasonic transducers in the aerosol generator 600 are being cooled by the supply of the cooling liquid feed 632 from the cooling liquid supply system 630. Terminating the cooling liquid flow involves terminating the supply of the cooling liquid feed 632 from the cooling liquid supply system 630.

Referring now to FIG. 60, a flow diagram is shown of another embodiment of a sequence of steps for batch termination operations. FIG. 60 is the same as FIG. 58, except that steps are included concerning the cooling of end caps on the aerosol heater. FIG. 60 shows a step of commencing cooling of end caps occurring substantially simultaneously with reducing the temperature in the aerosol heater. The commencement of cooling end caps is similar to that discussed previously with respect to batch initiation operations. The circulation of a cooling liquid through the end caps is established to prevent terminal portions of the aerosol heater from becoming too hot, which could otherwise occur since carrier gas is no longer flowing through the aerosol heater. The next step, as shown in FIG. 60, is to terminate cooling of the end caps. This involves terminating the circulation of the cooling liquid in the end caps at a time when there is no longer a danger of excessive heat build-up in the terminal portions of the aerosol heater.

The sequences of steps for batch initiation operations and batch termination operations as shown in FIGS. 53–60 are only preferred processing sequences for various embodiments. The present invention, however, is not limited to the specific embodiments shown in FIGS. 53–60 or to the specific order of the sequence of steps as shown in FIGS. 53–60, except that during batch initiation operations, certain steps must occur prior to activation of the ultrasonic transducers and during batch termination operations, certain steps must occur after deactivation of the ultrasonic transducers. For example, with reference to FIG. 53, activation of the ultrasonic transducers must ordinarily be the last step of those shown, but the preceding steps may be reordered in any convenient manner. For example, the temperature of the aerosol heater could be increased prior to establishing circulation of the precursor liquid. With reference to FIG. 54, again the step of activating the ultrasonic transducers must ordinarily be the last step of those shown, but the preceding steps may be reordered in any convenient manner. For example, the first pressure test could follow the step of establishing precursor liquid circulation. Also, the steps of commencing the carrier gas supply and the cooling gas supply need not occur substantially simultaneously. Referring now to FIG. 55, the step of activating the ultrasonic transducers must ordinarily be the last step, except that the step of commencing supply of the cooling liquid could occur after activation of the ultrasonic transducers. Also, other steps could be reordered in any convenient manner. For example, commencing the cooling liquid supply could occur at a later point in the sequence. Referring now to FIG. 56, the step of activating the ultrasonic transducers must ordinarily be the last step, except that the step of terminating the heating of the precursor liquid could follow activation of the ultrasonic transducers. Also, other steps could be reordered in any convenient manner. Referring now to FIG. 57, the step of activating the ultrasonic transducers must ordinarily be the last step, except that the step of terminating the cooling of the end caps could occur after the step of activating the ultrasonic transducers. The other steps could be reordered in any convenient manner. Referring now to FIG. 58, the step of deactivating the ultrasonic transducers must ordinarily occur prior to the subsequent listed steps. The subsequent steps could, however, be reordered as convenient. For example, the step of reducing the heater temperature could follow the step of terminating the precursor liquid supply. Referring now to FIG. 59, those steps shown as following deactivation of the ultrasonic transducers must ordinarily follow that step, except that the step of terminating the cooling liquid flow could occur prior to deactivation of the ultrasonic transducers. Other steps could be reordered as convenient. For example, the precursor liquid supply could be terminated prior to reducing the heater temperature. Referring now to FIG. 60, deactivation of the ultrasonic transducers must ordinarily occur prior to the other listed steps. The other steps may, however, be reordered as convenient. For example, the step of commencing to cool the end caps could occur prior to reducing the temperature in the aerosol heater, and the step of terminating the precursor liquid could occur prior to any of the steps of terminating the cooling of the end caps, commencing the cooling of the end caps, or reducing the heater temperature. Also, other reordering of the steps is also possible besides those specifically noted above.

As described previously, the intermediate operations typically include steady state or quasi-steady state manufacture of particles. As noted, however, it may be desirable to have periodic planned, or unplanned, interruptions of the steady state or quasi-steady state conditions to correct a problem identified with particle manufacture or for periodic maintenance or removal of accumulated particulate product. When the manufacture is interrupted during the intermediate operations, initiating the interruption is somewhat analogous to batch termination operations and resuming production following the interruption is somewhat analogous to batch initiation operations. Therefore, the prior discussions concerning batch termination operations and batch initiation operations are relevant to temporary interruptions occurring during intermediate operations, suitably modified to fit the particular situation. For example, when interrupting production during intermediate operations, it will be necessary to deactivate the ultrasonic transducers, and typically also to temporarily terminate the supply of carrier gas to the aerosol generator and of cooling gas to the aerosol cooler. Circulation of precursor liquid and of cooling liquid to the generator, if used, could also be temporarily terminated. Furthermore, it may be desirable to lower the temperature in the furnace below the operating temperature present during particle manufacture. When commencing production at the end of an interruption, the system would be conditioned to bring it up to temperature, if necessary, and the flows of all the fluid streams would be reinitiated and the ultrasonic transducers again activated.

As noted previously, a significant aspect of the present invention is the automation of one or more operations during the batch processing. In that regard, any of the steps occurring during the batch initiation operations, intermediate operations or batch termination operations can be automatically controlled at the direction of the electronic processor. Although it is only necessary, within the scope of the present invention, that at least one operation be automated, it is preferred that substantially all of the operations be automated. In that regard, any or all of the steps shown in any of FIGS. 53–60 may be automatically controlled at the direction of the electronic processor, including transitions between steps. Furthermore, preferably, transitions between the batch initiation operations, the intermediate operations and the batch termination operations are automatically controlled at the direction of the electronic processor.

It should be recognized that FIGS. 53–60 show various embodiments for the sequence of steps occurring during the batch processing of the present invention. The present invention, however, is not limited to the specific embodiments exemplified. For example, any of the steps shown in any one of FIGS. 53–60 may be combined, in any combination, with any other step or sequence of steps of any other embodiments of FIGS. 53–60, so long as the combination is not inconsistent with the description of the invention provided herein. Furthermore, any of the features in any one of FIGS. 31, 32, 34, 35, 36, 37, 49, 51, and 52 may be combined, in any combination, with any of the other features shown in those figures, so long as the combination is not inconsistent with the description of the invention provided herein. Also, various embodiments for the precursor liquid supply system are shown in FIGS. 38–41. The invention is not limited to these specific embodiments. Furthermore, any feature shown in any one of FIGS. 38–41 may be combined, in any combination, with other features shown in any of those Figures in the precursor liquid supply system, so long as the combination is not inconsistent with the description of the invention provided herein. Moreover, FIGS. 42, 43, 44, 45, 46, 47, 48, 50 and 51 show specific embodiments for the carrier gas supply system, the cooling gas supply system, the aerosol heater, the end caps, and the cooling liquid supply system. The invention is not, however, limited to these specific embodiments. Furthermore, any of the disclosed embodiments of the liquid supply system, carrier gas supply system, cooling gas supply system, cooling liquid supply system, aerosol heater, and aerosol generator may be combined in any combination into the aerosol manufacture facility of the present invention.

EXAMPLES

The following examples are provided to aid in understanding of the present invention, and are not intended to in any way limit the scope of the present invention.

Example 1

This example demonstrates preparation of multi-phase particles of either neodymium titanate or barium titanate with various metals.

A titanate precursor solution is prepared for each of barium titanate and neodymium titanate. The barium titanate precursor solution is prepared by dissolving barium nitrate in water and then, with rapid stirring, adding titanium tetraisopropoxide. A fine precipitate is formed. Sufficient nitric acid is added to completely dissolve the precipitate. Precursor solutions of various metals are prepared by dissolving the metal salt in water. The neodymium titanate precursor solution is prepared in the same way except using neodymium nitrate.

The titanate precursor solution and the metal precursor solution are mixed in various relative quantities to obtain the desired relative quantities of titanate and metal components in the final particles. The mixed solutions are aerosolized in an ultrasonic aerosol generator with transducers operated at 1.6 MHz and the aerosol is sent to a furnace where droplets in the aerosol are pyrolized to form the desired multi-phase particles. Air or nitrogen is used as a carrier gas, with tests involving copper and nickel also including hydrogen in an amount of 2.8 volume percent of the carrier gas.

Results are summarized in Table 2.

Example 2

A variety of materials are made, with some materials being made with and some being made without droplet classification prior to the furnace. Various single phase and multi-phase (or composite) particles are made as well as several coated particles. Tables 3 through 8 tabulate various of these materials and conditions of manufacture.

TABLE 2

| Composite | Metal Precursor(s) | Temperature °C. | Carrier Gas |
|---|---|---|---|
| 75/25 Pd/BaTiO$_3$ | nitrate | 1000 | N$_2$ |
| Ag:Pd/BaTiO$_3$[(1)] | nitrate | 600–1100 | air |
| 75/25 Ag:Pd/BaTiO$_3$ | nitrate | 1000 | air |
| 75/25 Ni/BaTiO$_3$ | nitrate | 1200 | N$_2$ + H$_2$ |
| 75/25 Ni/Nd$_2$TiO$_7$ | nitrate | 1200 | N$_2$ + H$_2$ |
| 75/25 Cu/BaTiO$_3$ | nitrate | 1200 | N$_2$ + H$_2$ |
| 50/50 Pt/BaTiO$_3$ | chloroplatinic acid | 1100 | air |

[(1)]70:30 Ag:Pd alloy, BaTiO$_3$ varied from 5 to 90 weight percent of the composite.
[(2)]30:70 Ag:Pd alloy.

TABLE 3

Phosphors

| Material | Precursor[(4)] | Reactor Temp °C. | Carrier Gas |
|---|---|---|---|
| Y$_2$O$_3$:Eu dopant | Yttrium nitrate, chloride or acetate and europium nitrate[(1)(2)] | 500–1100 | Air |
| CaTiO$_3$ | Titanium tetraisopropoxide and calcium nitrate[(1)] | 600–800 | Air, N$_2$, O$_2$ |
| CaTiO$_3$ | "Tyzor"[(3)] and calcium nitrate, titanium tetraisopropoxide and calcium nitrate[(1)] | 600–800 | Air, N$_2$, O$_2$ |
| CaS | Calcium carbonate and thioacetic acid, various dopants as metal salts[(1)] | 800–1100 | N$_2$ |
| MgS | Magnesium carbonate and thioacetic acid, various dopants as metal salts[(1)] | 800–1100 | N$_2$ |
| SrS | Strontium carbonate and thioacetic acid, various dopants as metal salts[(1)] | 800–1100 | N$_2$ |
| BaS | Barium carbonate and thioacetic acid, various dopants as metal salts[(1)] | 800–1100 | N$_2$ |
| ZnS | Zinc nitrate and thiourea, various dopants as metal salts[(1)] | 800–950 | N$_2$ |
| ZnS | Zinc nitrate and thiourea, MnCl$_2$ as dopant[(1)] | 950 | N$_2$ |
| Ca$_x$Sr$_{1-x}$S | Metal carbonates or hydroxides and thioacetic acid, various dopants as metal salts[(1)] | 800–1100 | N$_2$ |
| Mg$_x$Sr$_{1-x}$S | Metal carbonates or hydroxides and thioacetic acid, various dopants as metal salts[(1)] | 800–1100 | N$_2$ |
| ZnS | Zn$_x$(OH)$_y$(CO$_3$)$_2$ particles in colloidal suspension, various dopants as metal salts, thioacetic acid | 800–950 | N$_2$ |
| ZnO:Zn[(4)] | Zinc nitrate[(1)] | 700–900 | N$_2$ + H$_2$ Mixture |

[(1)]In aqueous solution
[(2)]Urea addition improves densification of particles
[(3)]Metal organic sold by DuPont
[(4)]Some Zn reduced to Zn during manufacture, the amount of reduction being controllable.

TABLE 4

Pure Metals

| Material | Precursor | Temperature °C. | Carrier Gas |
|---|---|---|---|
| Pd | nitrate | 900–1500 | N$_2$ |
| Ag | nitrate | 900–1400 | air |
| Ni | nitrate | 700–1400 | N$_2$ + H$_2$ |
| Cu | nitrate | 700–1400 | N$_2$ + H$_2$ |
| Pt | chloroplatinic acid (H$_2$PtCl$_6$.H$_2$O) | 900–1500 | air |
| Au | chloride | 500–1100 | air |

TABLE 5

Metal Alloys

| Material | Precursors | Temperature °C. | Carrier Gas |
|---|---|---|---|
| 70/30 Pd/Ag | nitrates | 900–1400 | N$_2$ |
| 70/30 Ag/Pd | nitrates | 900–1500 | N$_2$ |
| 50/50 Ni/Cu | nitrates | 1100 | N$_2$ + H$_2$ |
| 50/50 Cu/Ni | nitrates | 1200 | N$_2$ + H$_2$ |
| 70/30 Cu/Zn | nitrates | 1000 | N$_2$ + H$_2$ |
| 90/10 Cu/Sn | nitrates | 1000 | N$_2$ + H$_2$ |
| 50/50 Pt/Pd | chloroplatinic acid palladium nitrate | 1100 | N$_2$ |

TABLE 6

Coated Particles

| Material | Core Precursor(s) | Coating Precursor(s) | Coating Method | Reactor Temp °C. | Carrier Gas |
|---|---|---|---|---|---|
| PbO coating on $Fe_3O_4$ core | iron sulfate in aqueous solution | $Pb(NO_3)_2$ in aqueous solution | PVD | 900 | $H_2 + N_2$ mixture |
| Pb coating on $Fe_3O_4$ core | iron sulfate in aqueous solution | lead nitrate in aqueous solution | PVD | 900 | $H_2 + N_2$ mixture |
| PbO coating on $RuO_2$ core | Ruthenium nitrosyl nitrate in aqueous solution | $Pb(NO_3)_2$ in aqueous solution | PVD | 1100 | $N_2$ |
| $SiO_2$ coating on Pd core | Palladium nitrate in aqueous solution | $SiCl_4$ | CVD | 1100–1300 | $N_2$ |
| $TiO_2$ coating on Pd core | Palladium nitrate in aqueous solution | $TiCl_4$ | CVD | 1100—1300 | $N_2$ |

TABLE 7

Composites

| Material | Precursor(s) | Reactor Temp °C. | Carrier Gas |
|---|---|---|---|
| $PbO/Fe_3O_4$ | Colloidal suspension of $Fe_3O_4$ particles in aqueous solution of $Pb(NO_3)_2$ | 500–800 | Air |
| $Pd/SiO_2$[1] | 60 nm $SiO_2$ particles suspended in aqueous solution of $Pd(NO_3)_2$ | 900–1100 | $N_2$ |
| $Pd/SiO_2$[2] | 200 nm $SiO_2$ particles suspended in aqueous solution of $Pd(NO_3)_2$ | 1100 | $N_2$ |
| $Pd/BaTiO_3$ | $Pd(NO_3)_2Ba(NO_3)_2$ and $Ti(NO_3)_4$ in aqueous solution | 1100 | $N_2$ |
| $Pd/TiO_2$[4] | $Pd(NO_3)_2$ and $Ti(OiPr)_4$[3] in aqueous solution | 1100 | $N_2$ |
| $Pd/Al_2O_3$[6] | $Pd(NO_3)_2$ and $Al(OsecBu)_2$[5] in aqueous solution | 1100 | $N_2$ |
| $Pd/TiO_2$[7] | $Pd(NO_3)_2$ in aqueous solution slurried with 0.25 micron $TiO_2$ particles | 1100 | $N_2$ |
| $Ag/TiO_2$[8] | $AgNO_3$ aqueous solution with suspended 0.25 micron $TiO_2$ particles | 900 | $N_2$ |
| $Pt/TiO_2$[9] | $K_2PtCl_4$ aqueous solution with suspended 0.25 micron $TiO_2$ particles | 1100 | $N_2$ |
| $Ag/TiO_2$[10] | $AgNO_3$ aqueous solution with colloidal $TiO_2$ particles | 900 | $N_2$ |
| $Au/TiO_2$[11] | Colloidal Au and $TiO_2$ particles in aqueous liquid. | 900 | $N_2$ |

[1]Morphology of particles changes from intimately mixed $Pd/SiO_2$ to $SiO_2$ coating over Pd as reactor temperature is increased.
[2]Coating of Pd on $SiO_2$ particles.
[3]Titanium tetraisopropoxide.
[4]Metal dispersed on high surface area $TiO_2$ support.
[5]$Al[OCH(CH_3)C_2H_5]_3$.
[6]Metal dispersed on high surface area $Al_2O_3$ support.
[7]Pd coating on $TiO_2$ particles.
[8]Ag coating on $TiO_2$ particles.
[9]Pt coating on $TiO_2$ particles.
[10]$TiO_2$ coating on Ag particles.
[11]$TiO_2$ coating on Au particles.

While various embodiments of the present invention have been described in detail, it is apparent that modifications and adaptations to those embodiments will occur to those skilled in the art. It is to be expressly understood, however, that such modifications and adaptations are within the scope of the present invention, as set forth in the claims below. Further, it should be recognized that any feature of any embodiment disclosed herein can be combined with any other feature of any other embodiment in any combination.

What is claimed is:

1. An aerosol method for making particles, involving recirculation of a precursor liquid that tends to concentrate over time, the method comprising:

generating, in an aerosol generation facility, an aerosol stream including droplets, comprising a precursor liquid, dispersed in a carrier gas;

the aerosol generation facility including an aerosol generator where the droplets are formed, a carrier gas supply system supplying the carrier gas to the aerosol generator and a precursor liquid supply system supplying the precursor liquid to the aerosol generator, the precursor liquid including a liquid vehicle and a precursor material;

after the generating step, removing at least a portion of the liquid vehicle from the droplets and forming the particles in the aerosol stream;

during the generating step, the precursor liquid supplied to the aerosol generator being separated into at least two portions, a first portion exiting the aerosol generator in the droplets of the aerosol stream and a second portion exiting the aerosol generator as precursor liquid effluent, at least a portion of which is returned to the precursor liquid supply system and recycled to the aerosol generator;

during the generating step, additional liquid vehicle being added to at least one of the carrier gas supply system, the precursor liquid supply system and the aerosol generator, to at least partially compensate for a tendency of the precursor liquid to become more concentrated in the precursor material over time.

2. The method of claim 1, wherein, during the step of generating the aerosol stream, the concentration of the precursor material in the precursor liquid supplied to the aerosol generator varies by no more than about 20 percent relative to a maximum concentration of the precursor material in the precursor liquid supplied to the aerosol generator.

3. The method of claim 1, wherein, during the step of generating the aerosol stream, the concentration of the precursor material in the precursor liquid supplied to the aerosol varies by no more than about 10 percent relative to the maximum concentration of the precursor material in the precursor liquid supplied to the aerosol generator.

4. The method of claim 1, wherein, during the step of generating the aerosol stream, the concentration of the precursor material in the precursor liquid supplied to the aerosol varies by no more than about 5 percent relative to the maximum concentration of the precursor material in the precursor liquid supplied to the aerosol generator.

5. The method of claim 1, wherein the additional liquid vehicle is added in the form of a vapor to the carrier gas supply system.

6. The method of claim 5, wherein the liquid vehicle comprises water and adding the additional liquid vehicle to the carrier gas supply system comprises humidifying the carrier gas to the aerosol generator.

7. The method of claim 6, wherein the step of humidifying the carrier gas comprises heating the carrier gas prior to introducing the carrier gas into the aerosol generator.

8. The method of claim 1, wherein the additional liquid vehicle is added to the aerosol generator.

9. The method of claim 1, wherein the additional liquid vehicle is added to the precursor liquid supply system.

10. The method of claim 1, further comprising automatically monitoring at least one property of the precursor liquid at some location in the aerosol generation facility and automatically controlling the quantity of the additional liquid vehicle being added based, at least in part, on the at least one monitored property.

11. The method of claim 10, wherein the step of automatically controlling comprises automatically determining a concentration of the precursor material in the precursor liquid at the location and automatically controlling the quantity of the additional liquid vehicle being added based, at least in part, on the determined concentration.

12. The method of claim 11, wherein the step of determining the concentration comprises automatically monitoring, at the location, at least one property of the precursor liquid and, using the at least one measured property, automatically determining the concentration of the precursor material.

13. The method of claim 12, wherein the at least one property includes density.

14. The method of claim 10, wherein the location is within the precursor liquid supply system.

15. The method of claim 10, wherein the location is within the precursor liquid supply system in a vessel from which the precursor liquid is withdrawn for supply to the aerosol generator or within a stream of the precursor liquid withdrawn from the vessel.

16. The method of claim 15, wherein the additional liquid vehicle is added to the vessel.

17. The method of claim 16, further comprising actively mixing the precursor liquid in the supply vessel.

18. The method of claim 17, wherein the mixing comprises recirculating the precursor liquid contained in the supply vessel, comprising withdrawing a side stream from one portion of the vessel and reintroducing the side stream into a second portion of the vessel.

19. The method of claim 18, wherein the first portion and the second portion are adjacent opposing ends of the vessel.

20. The method of claim 19, wherein the first portion is adjacent the bottom of the vessel and the second portion is adjacent the top of the vessel.

21. The method of claim 15, further comprising automatically monitoring the level of the precursor liquid in the vessel, and automatically controlling the quantity of the additional liquid vehicle being added to the aerosol generation system based, at least in part, on the monitored level.

22. The method of claim 1, wherein the liquid supply system comprises a first vessel in fluid communication with a second vessel, each of the first and second vessels containing a portion of the precursor liquid, the first vessel supplying the precursor liquid to the second vessel, the second vessel supplying the precursor liquid to the aerosol generator.

23. The method of claim 22, wherein the second vessel is pressurized and the first vessel is substantially not pressurized.

24. The method of claim 23, wherein a check valve is located between the first vessel and the second vessel to prevent backflow from the second vessel to the first vessel.

25. The method of claim 22, wherein the first vessel has a larger capacity than the second vessel.

26. The method of claim 22, wherein the capacity of the second vessel is no larger than about 50 percent of the capacitor of the first vessel.

27. The method of claim 22, wherein the additional liquid vehicle is added to the second vessel during the generating step.

28. The method of claim 22, further comprising, prior to the generating step, preparing a batch of the precursor liquid in the first vessel.

29. The method of claim 28, wherein the method is operated in batch mode with a batch size substantially equal to the batch of the precursor liquid prepared in the first vessel.

30. The method of claim 28, wherein the batch of the precursor liquid is larger than about 300 liters.

31. The method of claim 22, further comprising automatically monitoring the level of the precursor liquid in the second vessel and automatically controlling the transfer of the precursor liquid from the first vessel to the second vessel based. At least in part, on the monitored level of the precursor liquid in the second vessel.

32. The method of claim 22, wherein at least a portion of the precursor liquid effluent from the aerosol generator is received in the second vessel for recycle to the aerosol generator.

33. The method of claim 1, wherein the volumetric recycle ratio in the precursor liquid supplied to the aerosol generator is larger than about 6.

34. The method of claim 1, wherein the volumetric recycle ratio is larger than about 8.

35. The method of claim 33, wherein the volumetric recycle ratio is larger than about 10.

36. The method of claim 1, wherein the precursor material is in particulate form, and the precursor liquid comprises a suspension of the particulate precursor material in the liquid vehicle.

37. The method of claim 1, wherein the precursor liquid comprises the precursor material dissolved in the liquid vehicle.

38. The method of claim 1, wherein the precursor material is a first precursor material and the precursor liquid comprises at least a second precursor material, different than the first precursor material, with at least one of the first precursor material and the second precursor material being dissolved in the liquid vehicle.

* * * * *

UNITED STATES PATENT AND TRADEMARK OFFICE
CERTIFICATE OF CORRECTION

PATENT NO. : 6,685,762 B1
DATED : February 3, 2004
INVENTOR(S) : Brewster et al.

It is certified that error appears in the above-identified patent and that said Letters Patent is hereby corrected as shown below:

Column 11,
Line 19, delete the word "ofthe", and insert therefor -- of the --.

Column 42,
Line 49, delete the word "ofthe", and insert therefor -- of the --.

Column 53,
Line 39, after the word "gas" insert -- prior to supplying the carrier gas --.

Column 54,
Line 46, delete the word "capacitor", and insert therefor -- capacity --.
Line 63, delete ". At", and insert therefor -- , at --.

Signed and Sealed this

Sixth Day of April, 2004

JON W. DUDAS
*Acting Director of the United States Patent and Trademark Office*